(12) United States Patent (10) Patent No.: US 8,714,662 B2
Isono (45) Date of Patent: May 6, 2014

(54) HYDRAULIC BRAKE SYSTEM

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/393,095

(22) PCT Filed: Aug. 31, 2009

(86) PCT No.: PCT/JP2009/065196
§ 371 (c)(1),
(2), (4) Date: Feb. 28, 2012

(87) PCT Pub. No.: WO2011/024309
PCT Pub. Date: Mar. 3, 2011

(65) Prior Publication Data
US 2012/0160619 A1 Jun. 28, 2012

(51) Int. Cl.
*B60T 8/44* (2006.01)
(52) U.S. Cl.
USPC ........................................ 303/114.1
(58) Field of Classification Search
USPC ............. 303/113.4, 114.1, 116.1, 116.2, 155; 188/358
See application file for complete search history.

(56) References Cited

U.S. PATENT DOCUMENTS

| 6,425,644 | B2 * | 7/2002 | Kawahata et al. | 303/122 |
| 6,957,870 | B2 * | 10/2005 | Kagawa et al. | 303/113.4 |
| 8,376,473 | B2 * | 2/2013 | Isono et al. | 303/114.1 |
| 2007/0046099 | A1 * | 3/2007 | Matsuura et al. | 303/152 |

FOREIGN PATENT DOCUMENTS

| JP | 2007 55588 | 3/2007 |
| JP | 2007 112162 | 5/2007 |
| JP | 2007 196824 | 8/2007 |
| JP | 2008 24098 | 2/2008 |

OTHER PUBLICATIONS

English translation of the International Preliminary Report on Patentability issued Feb. 29, 2012 in patent application No. PCT/JP2009/065196 filed Aug. 31, 2009.
International Search Report Issued Dec. 1, 2009 in PCT/JP09/65196 Filed Aug. 31, 2009.

* cited by examiner

*Primary Examiner* — Christopher Schwartz
(74) *Attorney, Agent, or Firm* — Oblon, Spivak, McClelland, Maier & Neustadt, L.L.P.

(57) ABSTRACT

A hydraulic brake system includes a braking state switching device which selectively realizes: a high-pressure-source-pressure dependent braking state in which a brake force is generated with a magnitude that depends on a pressure of brake fluid supplied from a high-pressure-source device; and an operation-force/high-pressure-source-pressure dependent braking state in which a brake force can be generated with a magnitude that depends on both of the pressure of the brake fluid supplied from the high-pressure-source device and a brake operation force of a driver which is applied to a brake operating member and that is larger than the magnitude of a brake force which can be generated in the high-pressure-source-pressure dependent braking state. The brake system may be equipped with a high-pressure-source device having a relatively small capacity, thereby allowing the high-pressure-source device to be compact and low-cost.

15 Claims, 14 Drawing Sheets

F: OPERATION FORCE
$P_O$: OUTPUT PRESSURE
$P_{TH}$: PREDETERMINED THRESHOLD PRESSURE

F: OPERATION FORCE
Pc: CONTROLLED HIGH-PRESSURE-SOURCE PRESSURE
P$_{TH}$: PREDETERMINED THRESHOLD PRESSURE

HYDRAULIC BRAKE SYSTEM

TECHNICAL FIELD

The present invention relates to a hydraulic brake system with which a vehicle is equipped.

BACKGROUND ART

Among the hydraulic brake systems installed on the vehicles, for example, like a system disclosed in the following Patent Document 1, there is a brake system generating a hydraulic brake force on the basis of not an operation force which a driver applies to a brake operating member but a pressure of brake fluid which is generated by a high-pressure-source device including a hydraulic pump etc.
Patent Document 1: JP-A-2008-24098

DISCLOSURE OF THE INVENTION

(A) Summary of the Invention

In the hydraulic brake systems generating the brake force on the basis of the pressure of the brake fluid which is generated by the high-pressure-source device (hereinafter, this pressure is referred to as a "high-pressure-source pressure" where appropriate), an available brake force generally depends on a degree of the high-pressure-source pressure. Therefore, the high-pressure-source device having a larger capacity is required in order to obtain a larger brake force. This is one of reasons which cause the high-pressure-source device to be large and expensive. However, this is merely one instance. There are left plenty of room for improving the hydraulic brake system. That is, it is expected that modification of the hydraulic brake system improves utility of the hydraulic brake system. In the light of the state described above, It is therefore an object of the invention to provide a hydraulic brake system with a high utility.

To achieve the object, the hydraulic brake system of the present invention is characterized in including a braking state switching device which selectively realizes: (a) a high-pressure-source-pressure dependent braking state in which a brake force is generated with a magnitude that depends on a pressure of the brake fluid supplied from the high-pressure-source device; and (b) an operation-force/high-pressure-source-pressure dependent braking state in which the brake force can be generated with a magnitude that depends on both of the pressure of the brake fluid supplied from the high-pressure-source device and a brake operation force of a driver which is applied to a brake operating member and that is larger than the magnitude of the brake force which can be generated in the high-pressure-source-pressure dependent braking state.

According to the brake system of the present invention, a brake force is obtained which is larger than the brake force that can be generated by the pressure of the brake fluid supplied from the high-pressure-source device. Therefore, the brake system of the present invention may be equipped with a high-pressure-source device having a relatively small capacity, thereby allowing the high-pressure-source device to be compact and low-cost. In these respects, the hydraulic brake system of this invention becomes a system with a high utility.

(B) Forms of Claimable Invention

There will be exemplified and explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

In the following forms, the form (1) corresponds to claim 1, the form (11) corresponds to claim 2, the form (12) corresponds to claim 3, the form (13) corresponds to claim 4, the form (14) corresponds to claim 5, the form (15) corresponds to claim 6, the form (21) corresponds to claim 7, the form (22) corresponds to claim 8, the form (41) corresponds to claim 9, the form (42) corresponds to claim 10, the form (61) corresponds to claim 11, the form (62) corresponds to claim 12, the form (81) corresponds to claim 13, the form (82) corresponds to claim 14, and the form (84) corresponds to claim 15, respectively.

<<A: Basic Form>>

(1) A hydraulic brake system comprising:

a brake device provided for a wheel;

a cylinder device operable to supply to the brake device a brake fluid which is pressurized;

a brake operating member which is operated by a driver;

a high-pressure-source device which supplies the brake fluid in high pressure;

a high-pressure-source-pressure control device which controls a pressure of the brake fluid supplied from the high-pressure-source device on the basis of the operation of the brake operating member; and a braking state switching device which selectively realizes (a) a high-pressure-source-pressure dependent braking state in which a brake force is generated with a magnitude that depends on a controlled high-pressure-source pressure which is a pressure of the brake fluid pressurized by the high-pressure-source device and controlled by the high-pressure-source-pressure control device; and (b) an operation-force/high-pressure-source-pressure dependent braking state in which a brake force is generated with a magnitude that depends on both of the controlled high-pressure-source pressure and a brake operation force which is a driver's force applied to the brake operating member and that is larger than a magnitude of a high-pressure-source dependent maximum brake force which is a maximum brake force that can be generated in the high-pressure-source-pressure dependent braking state.

The hydraulic brake system according to this form can obtain, with utilizing the brake operation force by the driver, a brake force which is larger than the maximum brake force that can be generated depending on a pressure of the brake fluid supplied from the high-pressure-source device. For instance, it is possible to generate the brake force depending on only the pressure of the brake fluid supplied from the high-pressure-source device when a normal brake force is required, and possible to obtain the large brake force depending on not only the pressure of the brake fluid supplied from the high-pressure-source device but also the brake operation force when a large brake force is required in a brake fade, an emergency brake, and so on. In order to obtain the brake force depending only on the pressure of the brake fluid supplied from the high-pressure-source device even when a large brake force is required, a high capacity is required in the high-pressure-source device, thereby causing the high-pressure-source device to be large and expensive. By the system according to this form, it is possible that even the system having a high-pressure-source device with a relatively small capacity obtains, with utilizing the brake operation force, the brake force with a magnitude which can not be obtained depending only on the pressure of the brake fluid supplied from the high-pressure-source device. This contributes to making the hydraulic brake system compact and low-cost. According to this form, a hydraulic brake system with a high utility is realized.

<<B: Forms in which the Braking State is Switched on the Basis of a Structure of the Cylinder Device>>

(11) The hydraulic brake system according to the form (1),
wherein the cylinder device includes:
a housing having a shape like a tube whose front end portion is closed;
a pressurizing piston disposed in the housing such that a pressurizing chamber in which the brake fluid to be supplied to the brake device is pressurized is defined on a front side of the pressurizing piston;
an input piston disposed on a rear side of the pressurizing piston such that a rear end portion of the input piston is connected to the brake operating member;
an input chamber which is disposed on a rear side of the pressurizing piston and to which the controlled high-pressure-source pressure is applied; and
a cylinder-device-actuation switching mechanism which functions as the braking state switching device and which realizes: (a) a high-pressure-source-pressure dependent pressurizing state, in the high-pressure-source-pressure dependent braking state, in which a transmission of the brake operation force from the input piston to the pressurizing piston is prohibited and in which pressurization of the brake fluid in the pressurizing chamber in accordance with the controlled high-pressure-source pressure is permitted; and (b) an operation-force/high-pressure-source-pressure dependent pressurizing state, in the operation-force/high-pressure-source-pressure dependent braking state, in which the transmission of the brake operation force from the input piston to the pressurizing piston is permitted and in which the pressurization of the brake fluid in the pressurizing chamber in accordance with both of the brake operation force and the high-pressure-source pressure is permitted.

The cylinder device according to this form is a cylinder device which can be called a so-called master-cylinder device with a hydraulic booster. Because, in the high-pressure-source-pressure dependent pressurizing state, the cylinder device according to this form can generate the brake force not directly depending on a brake operation by the driver, it is a favorable cylinder device for hybrid vehicles etc. which can obtain a regenerative brake force. The hydraulic brake system according to this form is a system which selectively realizes the above high-pressure-source pressure dependent braking state and the above operation-force/high-pressure-source-pressure dependent braking state depending on a configuration of the cylinder device itself.

(12) The hydraulic brake system according to the form (11),
wherein the cylinder-device-actuation switching mechanism is configured to switch an actuation state of the cylinder device from the high-pressure-source-pressure dependent pressurizing state to the operation-force/high-pressure-source-pressure dependent pressurizing state, when an operation-force indicating parameter which indicates the brake operation force has become larger than a predetermined threshold.

(13) The hydraulic brake system according to the form (11),
wherein the cylinder-device-actuation switching mechanism is configured to switch an actuation state of the cylinder device from the high-pressure-source-pressure dependent pressurizing state to the operation-force/high-pressure-source-pressure dependent pressurizing state, when one of the controlled high-pressure-source pressure and an output pressure which is a pressure of the brake fluid outputted from the pressurizing chamber has become higher than a predetermined pressure.

(14) The hydraulic brake system according to the form (11),
wherein the cylinder-device-actuation switching mechanism is configured to switch an actuation state of the cylinder device from the high-pressure-source-pressure dependent pressurizing state to the operation-force/high-pressure-source-pressure dependent pressurizing state, when a difference between the controlled high-pressure-source pressure and a high-pressure-source pressure which is a pressure of the brake fluid supplied by the high-pressure-source device has become smaller than a predetermined difference.

(15) The hydraulic brake system according to the form (11),
wherein the cylinder device includes an input-piston-forward-movement permitting mechanism which permits, in the high-pressure-source-pressure dependent pressurizing state, the input piston to move forward within a predetermined forward movement distance against an elastic force, and
wherein the cylinder-device-actuation switching mechanism is configured to switch an actuation state of the cylinder device from the high-pressure-source-pressure dependent pressurizing state to the operation-force/high-pressure-source-pressure dependent pressurizing state, when the input piston has moved forward by the predetermined forward movement distance in the high-pressure-source-pressure dependent pressurizing state.

The above four forms are forms in which, relating to conditions of the switch from the high-pressure-source pressure dependent braking state to the operation-force/high-pressure-source-pressure dependent braking state, limitations are added, respectively. In the every form, it is able to effectively conduct the switch of a pressurizing state of the cylinder device from the high-pressure-source pressure dependent braking state to the operation-force/high-pressure-source-pressure dependent braking state, when a magnitude of the hydraulic brake force increases to certain degree, that is, becomes equal or close to a magnitude of the above high-pressure-source dependent maximum brake force.

The operation-force indicating parameter according to the first form of the above four forms is not especially limited. The above output pressure, the controlled high-pressure-source pressure, a pressure of the above input chamber, and so on may become the operation-force indicating parameter in the system which is configured to determine the hydraulic brake force and the above controlled high-pressure-source pressure etc. on the basis of the brake operation force. If the above high-pressure-source pressure is set within a certain range and the controlled high-pressure-source pressure is determined on the basis of the brake operation force, a difference between the high-pressure-source pressure and the controlled high-pressure-source pressure may become the operation-force indicating parameter. Moreover, if an operation amount of the brake operating member relates to the brake operation force, the operation amount may also become the operation-force indicating parameter. Especially, as explained later, if the cylinder device is configured such that the operation of the brake operating member is limited due to a limit of an actuation of a so-called stroke simulator when the brake operation force is at a certain magnitude, a phenomenon of the operation limit may also become the operation-force indicating parameter.

The controlled high-pressure-source pressure and the output pressure according to the second form of the above four forms indicate the hydraulic brake force in the high-pressure-source-pressure dependent pressurizing state. Therefore, the second form is considered as a form in which, on the basis of the hydraulic brake force, the switch from the high-pressure-source-pressure dependent pressurizing state to the operation-force/high-pressure-source-pressure dependent pressurizing state is conducted. The second form uses one of the controlled high-pressure-source pressure and the output pressure as a parameter. Therefore, a predetermined pressure which is a threshold for the switch may be set to a proper value depending on which one of the controlled high-pressure-source pressure and the output pressure is used as the parameter.

In general, the high-pressure-source-pressure control device is configured to decrease the high-pressure-source pressure generated by the high-pressure-source device to a pressure under the high-pressure-source pressure and configured to output the pressure. Therefore, the third form of the above four forms is considered as a form in which the switch of the pressurizing state is conducted when the controlled high-pressure-source pressure becomes approximately close to the actual high-pressure-source pressure at a moment. According to the hydraulic brake system according to the third form, it is possible to securely conduct the switch from the high-pressure-source-pressure dependent pressurizing state to the operation-force/high-pressure-source-pressure dependent pressurizing state when the controlled high-pressure-source pressure is close to a limit at a moment.

The fourth form of the above four forms is a form which is effective where the cylinder device has a so-called stroke simulator. The above input-piston-forward-movement permitting mechanism functions as the stroke simulator. It is possible to configure the stroke simulator such that a forward movement of the input piston is prohibited by a mechanical stopper and so on, when the operation amount of the operating member becomes a predetermined operation amount, that is, a magnitude of the brake operation force becomes a predetermined value in the high-pressure-source-pressure dependent pressurizing state. In other words, it is possible to configure the stroke simulator such that an operation limit is provided for the brake operation. In short, the fourth form is a form in which the switch from the high-pressure-source-pressure dependent pressurizing state to the operation-force/high-pressure-source-pressure dependent pressurizing state is conducted at the operation limit in the cylinder device having such a stroke simulator. According to the fourth form, operational feeling in the brake operation in the switch becomes favorable. Incidentally, whether the forward movement of the input piston has been prohibited, that is, whether the stroke simulator has been in the above operation limit may be judged by that, for example, an operation amount sensor detecting the operation amount of the brake operating member and an operation force sensor detecting the brake operation force are provided and then the operation force detected by the operation force sensor varies even though the operation amount detected by the operation amount sensor does not vary.

(16) The hydraulic brake system according to any one of the forms (11)-(15), wherein the cylinder-device-actuation switching mechanism is configured to selectively realize (a) the high-pressure-source-pressure dependent pressurizing state, (b) the operation-force/high-pressure-source-pressure dependent pressurizing state, and (c) an operation-force dependent pressurizing state in which the transmission of the brake operation force from the input piston to the pressurizing piston is permitted and in which a pressurization of the brake fluid in the pressurizing chamber by the brake operation force is permitted, in a condition that the high-pressure-source device can not supply the brake fluid in high pressure.

This form is a form in which the hydraulic brake force can be generated depending only on the force of the driver applied to the brake operating member in conditions such as a failure of the high-pressure-source device and an electrical failure of the system. According to this form, the switch from the high-pressure-source-pressure dependent pressurizing state to the operation-force/high-pressure-source-pressure dependent pressurizing state is conducted depending on a configuration of the cylinder device itself. According to this form, a system superior in a view of a fail-safe is realized.

<B-1: Forms Related to an Intermediate Piston Lock Type Cylinder Device>

(21) The Hydraulic Brake System According to any One of the Forms (11)-(16), wherein the cylinder device includes an intermediate piston which has a main body and a flange formed on a circumference of the main body and which is disposed in the housing such that a first input chamber and a second input chamber each of which functions as the input chamber are defined respectively on a front side of the main body and on a rear side of the flange and such that there is defined an opposing chamber which is located on a front side of the flange with the flange interposed between the opposing chamber and the second input chamber and which is opposed to the second input chamber, wherein the cylinder device is configured such that the input piston transmits the brake operation force to the intermediate piston from a rear side of the intermediate piston, and wherein the cylinder-device-actuation switching mechanism is configured to realize: (a) the high-pressure-source-pressure dependent pressurizing state by prohibiting a forward movement of the intermediate piston as a result of hermetically closing the opposing chamber and by permitting application of the controlled high-pressure-source pressure to the first input chamber; and (b) the operation-force/high-pressure-source-pressure dependent pressurizing state by permitting the forward movement of the intermediate piston as a result of establishing communication between the opposing chamber and a reservoir and by permitting application of the controlled high-pressure-source pressure to the second input chamber while hermetically closing the first input chamber.

This form is a form in which, relating to a fundamental structure of the cylinder device, a limitation is added. The cylinder device constituted above has the intermediate piston which is disposed such that two input chambers are defined in the front side and the rear side of the intermediate piston respectively and the rear side is connected to the input piston. According to this form, the high-pressure-source-pressure dependent pressurizing state is realized in a state in which the forward movement of the intermediate piston is prohibited. In the light of this, hereinafter, for the sake of convenience, the cylinder device having the above fundamental structure is called an intermediate piston lock type cylinder device. In the cylinder device according to this form, the first input chamber is hermetically closed and the forward movement of the intermediate piston is permitted in the operation-force/high-pressure-source-pressure dependent pressurizing state. Accordingly, the brake fluid in the first input chamber is pressurized via the intermediate piston by the controlled high-pressure-source pressure inputted into the second input chamber and the brake operation force applied to the input piston. Therefore, the brake fluid in the pressurizing chamber is pressurized depending on the pressure of the brake fluid in the first input chamber. Incidentally, the first input chamber and the second input chamber may communicate with each other in the high-pressure-source-pressure dependent pressurizing state. In this case, it is desirable that an area of the intermediate piston which defines the first input chamber and to which a pressure of the first input chamber is applied is approximately equal to an area of the intermediate piston which defines the second input chamber and to which a pressure of the second input chamber is applied. In other words, it is desirable that an area of a front end of the main body of the intermediate piston is approximately equal to an area of a rear end of the flange.

(22) The Hydraulic Brake System According to the Form (21), wherein the cylinder-device-actuation switching mechanism includes i) an opposing chamber open/close valve provided on a passage through which the opposing chamber and the reservoir communicate with each other and a first input chamber open/close valve provided on a passage through which the first input chamber and the high-pressure-source device communicate with each other, and wherein the cylinder-device-actuation switching mechanism is configured to selectively realize the high-pressure-source-pressure dependent pressurizing state and the operation-force/high-pressure-source-pressure dependent pressurizing state by operations of the opposing chamber open/close valve and the first input chamber open/close valve.

This form is a form in which, relating to a concrete structure of the cylinder-device-actuation switching mechanism, a limitation is added, that is, a concrete structure for selectively realizing the high-pressure-source-pressure dependent pressurizing state and the operation-force/high-pressure-source-pressure dependent pressurizing state in the intermediate piston lock type cylinder device. According to this form, the pressurizing state of the cylinder device can be switched by a simple mechanism.

(23) The Hydraulic Brake System According to the Form (22), wherein each of the opposing chamber open/close valve and the first input chamber open/close valve is an electromagnetic open/close valve, and wherein the cylinder-device-actuation switching mechanism includes a control valve device which controls the opposing chamber open/close valve and the first input chamber open/close valve.

(24) The hydraulic brake system according to the form (23), wherein the control valve device is configured to switch a state of the opposing chamber open/close valve from a close state to an open state and switch a state of the first input chamber open/close valve from an open state to a close state, when an operation-force indicating parameter which indicates the brake operation force has become larger than a predetermined threshold

(25) The hydraulic Brake System According to the Form (23), wherein the control valve device is configured to switch a state of the opposing chamber open/close valve from a close state to an open state and switch a state of the first input chamber open/close valve from an open state to a close state, when one of the controlled high-pressure-source pressure and an output pressure which is a pressure of the brake fluid outputted from the pressurizing chamber has become higher than a predetermined pressure.

(26) The Hydraulic Brake System According to the Form (23), wherein the control valve device is configured to switch a state of the opposing chamber open/close valve from a close state to an open state and switch a state of the first input chamber open/close valve from an open state to a close state, when a difference between the controlled high-pressure-source pressure and a high-pressure-source pressure which is a pressure of the brake fluid supplied by the high-pressure-source device has become smaller than a predetermined difference.

(27) The Hydraulic Brake System According to the Form (23), wherein the cylinder device includes an input-piston-forward-movement permitting mechanism which permits the input piston to move forward within a predetermined forward movement distance against an elastic force in the high-pressure-source-pressure dependent pressurizing state, and wherein the control valve device is configured to switch a state of the opposing chamber open/close valve from a close state to an open state and switch a state of the first input chamber open/close valve from an open state to a close state, when the input piston has moved forward by the predetermined forward movement distance in the high-pressure-source-pressure dependent pressurizing state.

The above five forms are forms in which the above two open/close valves are electromagnetic open/close valves and are controlled by the control valve device, respectively. The conditions for opening and closing the valves are respectively explained above in detail, so explanations of them are dispensed with unless needed, in the interest of brevity.

(28) The Hydraulic Brake System According to any One of the Forms (23)-(27), wherein the control valve device is configured to switch a state of the opposing chamber open/close valve from an open state to a close state and switch a state of the first input chamber open/close valve from a close state to an open state in a switch from the operation-force/high-pressure-source-pressure dependent pressurizing state to the high-pressure-source-pressure dependent state on condition that the intermediate piston is returned to a position where the intermediate piston was located before the switch from the high-pressure-source-pressure dependent pressurizing state to the operation-force/high-pressure-source-pressure dependent pressurizing state.

This form is a form in which, relating to a manner relating to the switch from the operation-force/high-pressure-source-pressure dependent pressurizing state to the high-pressure-source-pressure dependent pressurizing state, a limitation is added. Where the first input chamber is hermetically closed in the operation-force/high-pressure-source-pressure dependent pressurizing state, even though the brake operation is released, for example, after the rearward movement of the intermediate piston is stopped at the initial position, there occurs a phenomenon that the pressure of the first input chamber does not decrease and the hydraulic brake force does not decrease in accordance with the brake operation. In the above form, the phenomenon is used as a condition for the switch from the operation-force/high-pressure-source-pressure dependent pressurizing state to the high-pressure-source-pressure dependent pressurizing state. According to this form, the switch to the high-pressure-source-pressure dependent pressurizing state is conducted securely and smoothly. Concretely, whether the intermediate piston is returned to the initial position may be judged by that, for example, the output pressure, the pressure in the first input chamber, and the like does not change even though a parameter indicating the brake operation, such as the brake operation force, changes.

(29) The Hydraulic Brake System According to the Form (22), wherein each of the opposing chamber open/close valve and the first input chamber open/close valve is a mechanical open/close valve which operates on the basis of a pilot pressure that is inputted thereto and is one of the controlled high-pressure-source pressure and an output pressure which is a pressure of the brake fluid outputted from the pressurizing chamber, and wherein the opposing chamber open/close valve is configured to switch from a close state to an open state and the first input chamber open/close valve is configured to switch from an open state to a close state, when said one of the controlled high-pressure-source pressure and the output pressure which is the pilot pressure has become higher than a predetermined pressure.

(30) The Hydraulic Brake System According to the Form (22), wherein each of the opposing chamber open/close valve and the first input chamber open/close valve is a mechanical open/close valve that operates on the basis of a difference between two pilot pressures which are inputted thereto, one of which is a high-pressure-source pressure that is a pressure of the brake fluid supplied by the high-pressure-source device, and the other of which is the controlled high-pressure-source pressure, and wherein the opposing chamber open/close valve is configured to switch from a close state to an open state and the first input chamber open/close valve is configured to switch from an open state to a close state, when the difference between the high-pressure-source pressure and the controlled high-pressure-source pressure has become smaller than a predetermined difference.

These two forms are forms in which the above two open/close valves are mechanical open/close valves, respectively. According to these forms, using the mechanical open/close valves realizes a relatively low-cost hydraulic brake system. Incidentally, a meaning of each of parameters on which are depended in opening or closing of the open/close valves is similar to that explained above, so an explanation of them is dispensed here.

(31) The Hydraulic Brake System According to any One of the Forms (22)-(30), wherein the opposing chamber open/close valve and the first input chamber open/close valve are integrated into one valve device.

According to this form, it is possible to make the cylinder-device-actuation switching mechanism relatively simple.

(32) The Hydraulic Brake System According to any One of the Forms (21)-(31), wherein the cylinder-device-actuation switching mechanism is configured to selectively realize (a) the high-pressure-source-pressure dependent pressurizing state, (b) the operation-force/high-pressure-source-pressure dependent pressurizing state, and (c) an operation-force dependent pressurizing state in which the transmission of the brake operation force from the input piston to the pressurizing piston is permitted and in which the pressurization of the brake fluid in the pressurizing chamber by the brake operation force is permitted, under a condition that the high-pressure-source device can not supply the brake fluid in high pressure, and wherein the cylinder-device-actuation switching mechanism is configured to realize the operation-force dependent pressurizing state by permitting the forward movement of the intermediate piston as a result of establishing the communication between the opposing chamber and the reservoir and by allowing the intermediate piston to touch to the pressurizing piston as a result of establishing communication between the first input chamber and the reservoir.

This form is a form in which, relating to a concrete structure of the cylinder-device-actuation switching mechanism of the intermediate piston lock type cylinder device for making the cylinder-device-actuation switching mechanism have a function to realize the above operation-force dependent pressurizing state, a limitation is added. According to this form, the operation-force dependent pressurizing state is realized by a simple mechanism. According to this form, in the operation-force dependent pressurizing state, the brake operation force is transmitted to the pressurizing piston with the intermediate piston contacting with the pressurizing piston because a decrease of a volume of the first input chamber is permitted. In the cylinder device according to this form, it is possible to make the volume of the first input chamber as small as the pressurizing piston contacts to the intermediate piston when the cylinder device is not actuated, that is, the operating member is not operated. This enables, in the failure condition, pressurizing the brake fluid in the pressurizing chamber by the operation force applied to the operating member immediately after the operating member is moved. Therefore, according to the cylinder device, it is possible to secure an operation range of the brake operating member, namely, an operation stroke sufficiently in the failure condition.

More concretely about the cylinder-device-actuation switching mechanism, for example, if the cylinder-device-actuation switching mechanism is configured such that the high-pressure-source-pressure control device communicates with the reservoir in the electrical failure condition, the above first input chamber open/close valve can be used as a means for establishing the communication between the first input chamber and the reservoir. Additionally, the above opposing chamber open/close valve can be used as a means for establishing the communication between the opposing chamber and the reservoir. Incidentally, because a pressure in the opposing chamber rises in accordance with the brake operation force, it may be provided a mechanism which uses not the opposing chamber open/close valve but a relief valve etc., that is, a pressure dependent communication mechanism which can establish the communication between the opposing chamber and the reservoir when the pressure in the opposing chamber exceeds a predetermined pressure. In addition, if the pressure dependent communication mechanism is provided, it is desirable that there is also provided a volume dependent communication mechanism which establishes a communication between the opposing chamber and the reservoir when the volume of the opposing chamber becomes less than a predetermined volume, that is, when the intermediate piston moves forward a predetermined amount. The provision of the volume dependent communication mechanism can eliminate a loss of the brake operation force due to a pressure remaining in the opposing chamber in the operation-force dependent pressurizing state.

(33) The Hydraulic Brake System According to any One of the Forms (21)-(32), wherein the input piston is fitted into a rear end portion of the intermediate piston such that there is defined an internal chamber whose volume is changed by a relative movement of the input piston and the intermediate piston, and wherein the cylinder device has an elastic-force applying mechanism which applies, to the input piston and the intermediate piston, an elastic force which generates in accordance with the relative movement of the input piston and the intermediate piston that decreases a volume of the internal chamber and whose direction opposes to a direction of the relative movement.

This form is a form in which the intermediate piston lock type cylinder device is configured to have a function of a so-called stroke simulator in the high-pressure-source pressure dependent pressurizing state. In other words, this form is one concrete form having the above input-piston-forward-movement permitting mechanism. For instance, the above elastic-force applying mechanism may be configured such that springs are disposed in the internal chamber so as to apply the elastic force of the springs to the input piston and the intermediate piston in directions that the volume of the internal chamber increases. The cylinder device having the thus configured elastic-force applying mechanism is a compact cylinder device because springs constituting the stroke simulator are disposed in the internal chamber which is a dead space. Additionally, if two springs are disposed in series and one of them is not permitted to increase its elastic deformation in a process of the relative movement of the input piston and the intermediate piston, it is possible to realize a stroke simulator having a characteristic regarding an operation reaction force in which an operation-reaction-force inclination is small in an early stage of the operation of the brake operating member and becomes large after the operation is proceeded to a certain stage.

(34) The Hydraulic Brake System According to this Form (33), wherein the cylinder-device-actuation switching mechanism has an internal-chamber-communication switching mechanism which realizes a state in which the internal chamber and the reservoir communicate with each other when the forward movement of the intermediate piston is not permitted and which realizes a state in which the internal chamber and the reservoir do not communicate with each other when the forward movement of the intermediate piston is permitted.

The communication between the internal chamber and the reservoir is shut by the above internal-chamber-communication switching mechanism, thereby closing the internal chamber hermetically, which prohibits the relative movement of the input piston and the intermediate piston. This permits the input piston and the intermediate piston to unitedly move forward. According to this form, because the internal chamber is hermetically closed immediately after the forward movement of the intermediate piston is permitted, the operation stroke is effectively utilized in the operation-force dependent pressurizing state and the operation-force/high-pressure-source-pressure dependent pressurizing state.

By the way, the cylinder device according to this form has a structure in which the input piston and the intermediate piston are fitted together. Therefore, it is possible to reduce number of high pressure seals which slidably contact with the input piston. Concretely, one high pressure seal may be disposed between the intermediate piston and the input piston, and another one between the input piston and the housing. Therefore, friction resistance against the movement of the input piston in the high-pressure-source-pressure dependent state is relatively low, thereby enabling an influence of the friction resistance on operational feeling in the brake operation to be minor.

(35) The Hydraulic Brake System According to any One of the Forms (21)-(34), wherein an area of the intermediate piston which defines the first input chamber and to which a pressure of the first input chamber is applied is larger than an area of the pressurizing piston which defines the first input chamber and to which the pressure of the first input chamber is applied.

In short, this form is a form in which the area of a front end of the intermediate piston is larger than the area of a rear end of the pressurizing piston. When the switch from the high-pressure-source-pressure dependent pressurizing state to the operating-force/high-pressure-source-pressure dependent pressurizing state is conducted, the first input chamber is hermetically closed after the brake fluid is supplied thereto. When the brake operating member is operated in this state, an amount of the forward movement of the pressurizing piston is larger than an amount of the forward movement of the intermediate piston. Therefore, according to this form, it is possible to make relatively large a change of the output pressure with respect to a change of the operation amount of the brake operating member in the operating-force/high-pressure-source-pressure dependent pressurizing state. From the opposite point of view, it is possible to secure a larger operation stroke in the operating-force/high-pressure-source-pressure dependent pressurizing state.

<B-2: Forms Related to an Input Piston Free Type Cylinder Device>

(41) The Hydraulic Brake System According to any One of the Forms (11)-(16), wherein the pressurizing piston has a blind hole whose opening is on a rear end of the pressurizing piston, includes a main body and a flange formed on a circumference of the main body, and is disposed such that the pressurizing chamber and the input chamber are defined on a front side of the main body and on a rear side of the flange respectively and such that there is defined an opposing chamber which is located on a front side of the flange with the flange interposed between the opposing chamber and the input chamber and which is opposed to the input chamber, wherein the input piston is fitted into the blind hole of the pressurizing piston such that an inter-piston chamber is defined on a front side of the input piston by the input piston and the pressurizing piston, wherein the cylinder device includes a chamber communication passage which permits communication between the opposing chamber and the inter-piston chamber such that one of a volume change of the opposing chamber and a volume change of the inter-piston chamber which are caused by a forward and a rearward movement accommodates the other, and wherein the cylinder-device-actuation switching mechanism is configured to realize: (a) the high-pressure-source-pressure dependent pressurizing state by permitting a relative movement of the pressurizing piston and the input piston as a result of opening the chamber communication passage and by permitting an application of the controlled high-pressure-source pressure to the input chamber; and (b) the operation-force/high-pressure-source-pressure dependent pressurizing state by permitting the application of the controlled high-pressure-source pressure to the input chamber and by permitting forward movements of the pressurizing piston and the input piston with restraining the relative movement thereof as a result of hermetically closing the inter-piston chamber by closing the chamber communication passage and establishing communication between the opposing chamber and a reservoir.

This form is a form which has a fundamental structure different from that explained above. In the cylinder device according to this form, it is considered that a reaction force chamber is formed by the opposing chamber and the inter-piston chamber when the chamber communication passage is opened. When the opposing chamber and the inter-piston chamber communicate with each other, in accordance with the forward movement of the pressurizing piston, a volume of the inter-piston chamber increases, and a volume of the opposing chamber decreases by the increased volume of the inter-piston chamber. On the other hand, in accordance with the rearward movement of the pressurizing piston, the volume of the opposing chamber decreases and the volume of inter-piston chamber increases by the decreased volume of the inter-piston chamber. In other words, the volume increase or decrease of one of the two chambers becomes equal to the volume decrease or increase of the other chamber. Therefore, the input piston can move freely relative to the pressurizing piston. In the light of having such a function, hereinafter the cylinder device having the above fundamental structure is called an input piston free type cylinder device.

In the cylinder device having the above structure, a relative movement of the input piston and the pressurizing piston is permitted while the input piston does not contact to the pressurizing piston. A supply of a pressure of the brake fluid into the input chamber in this state realizes the high-pressure-source-pressure dependent pressurizing state. On the other hand, in the operation-force/high-pressure-source-pressure dependent pressurizing state, the inter-piston chamber is hermetically closed, which restrains the relative movement of the input piston and the pressurizing piston. Therefore, the transmission of the brake operation force from the input piston to the pressurizing piston is permitted. In addition, the opposing chamber is opened in this state, thereby permitting the forward movement of the pressurizing piston and the input piston, which realizes the operation-force/high-pressure-source-pressure dependent pressurizing state. Here, the restraint of the relative movement does not mean only prohibiting the relative movement. If the inter-piston chamber is pressurized by an elastic force, that is, the input piston and the pressurizing piston elastically support each other via the inter-piston chamber, the relative movement in accordance with the elastic force is permitted. According to this form, in such a case, it is also interpreted that the relative movement is restrained.

In the cylinder device according to this form, the input piston is inserted in the blind hole provided on the pressurizing piston. Therefore, regarding high pressure seals which are needed to be slidably contacted with the input piston so as to define each of the chambers, one seal is disposed between an inner surface of the blind hole of the pressurizing piston and an outer surface of the input piston, and another one is disposed between the outer surface of the input piston and a part of the housing holding the input piston slidably. Therefore, friction resistance against the movement of the input piston in the high-pressure-source-pressure dependent state is relatively low, thereby enabling an influence of the friction resistance on operational feeling in operating the operating member, that is, operational feeling in the brake operation to be minor.

(42) The Hydraulic Brake System According to the Form (41), wherein the cylinder-device-actuation switching mechanism includes i) an opposing chamber open/close valve provided on a passage through which the opposing chamber and the reservoir communicate with each other and ii) a chamber communication open/close valve provided on the chamber communication passage, and wherein the cylinder-device-actuation switching mechanism is configured to selectively realize the high-pressure-source-pressure dependent pressurizing state and the operation-force/high-pressure-source-pressure dependent pressurizing state by operations of the opposing chamber open/close valve and the chamber communication open/close valve.

This form is a form in which, relating to a concrete structure of the cylinder-device-actuation switching mechanism, that is, a concrete structure for selectively realizing the high-pressure-source-pressure dependent pressurizing state and the operation-force/high-pressure-source-pressure dependent pressurizing state in the input piston free type cylinder device, a limitation is added. According to this form, a pressurizing state of the cylinder device can be switched by a simple mechanism.

(43) The Hydraulic Brake System According to the Form (42), wherein each of the opposing chamber open/close valve and the chamber communication open/close valve is an electromagnetic open/close valve, and wherein the cylinder-device-actuation switching mechanism includes a control valve device (48) which controls the opposing chamber open/close valve and the chamber communication open/close valve.

(44) The Hydraulic Brake System According to the Form (43), wherein the control valve device is configured to switch a state of the opposing chamber open/close valve from a close state to an open state and switch a state of the chamber communication open/close valve from an open state to a close state, when an operation-force indicating parameter which indicates the brake operation force has become larger than a predetermined threshold.

(45) The Hydraulic Brake System According to the Form (43), wherein the control valve device is configured to switch a state of the opposing chamber open/close valve from a close state to an open state and switch a state of the chamber communication open/close valve from an open state to a close state, when one of the controlled high-pressure-source pressure and an output pressure which is a pressure of the brake fluid outputted from the pressurizing chamber has become higher than a predetermined pressure.

(46) The Hydraulic Brake System According to the Form (43), wherein the control valve device is configured to switch a state of the opposing chamber open/close valve from a close state to an open state and switch a state of the chamber communication open/close valve from an open state to a close state, when a difference between the controlled high-pressure-source pressure and a high-pressure-source pressure which is a pressure of the brake fluid supplied by the high-pressure-source device has become smaller than a predetermined difference.

(47) The Hydraulic Brake System According to the Form (43), wherein the cylinder device includes an input-piston-forward-movement permitting mechanism which permits the input piston to move forward within a predetermined forward movement distance against an elastic force in the high-pressure-source-pressure dependent pressurizing state, and wherein the control valve device is configured to switch a state of the opposing chamber open/close valve from a close state to an open state and switch a state of the chamber communication open/close valve from an open state to a close state, when the input piston has moved forward by the predetermined forward movement distance in the high-pressure-source-pressure dependent pressurizing state.

The above five forms are forms in which the above two open/close valves are electromagnetic open/close valves and are controlled by the control valve device, respectively. The conditions for opening or closing the valves are respectively explained above in detail, so explanations of them are dispensed with unless needed, in the interest of brevity

(48) The Hydraulic Brake System According to the Form (42), wherein each of the opposing chamber open/close valve and the chamber communication open/close valve is a mechanical open/close valve which operates on the basis of a pilot pressure that is inputted thereto and is one of the controlled high-pressure-source pressure and an output pressure which is a pressure of the brake fluid outputted from the pressurizing chamber, and wherein the opposing chamber open/close valve is configured to switch from a close state to an open state and the chamber communication open/close valve is configured to switch from an open state to a close state, when the one of the controlled high-pressure-source pressure and the output pressure which is the pilot pressure has become higher than a predetermined pressure.

(49) The Hydraulic Brake System According to the Form (42), wherein each of the opposing chamber open/close valve and the chamber communication open/close valve is a mechanical open/close valve that operates on the basis of a difference between two pilot pressures which are inputted thereto, one of which is the high-pressure-source pressure that is the pressure of the brake fluid supplied by the high-pressure-source device, and the other of which is the controlled high-pressure-source pressure, and wherein the opposing chamber open/close valve is configured to switch from a close state to an open state and the chamber communication open/close valve is configured to switch from an open state to a close state, when the difference between the high-pressure-source pressure and the controlled high-pressure-source pressure has become smaller than a predetermined difference.

These two forms are forms in which the above two open/close valves are mechanical open/close valves, respectively. According to these forms, using the mechanical open/close valves realizes a relatively low-cost hydraulic brake system. Incidentally, a meaning of each of parameters on which are depended in opening or closing of the open/close valves is similar to that explained above, so explanations of them are dispensed here.

(50) The Hydraulic Brake System According to any One of the Forms (42)-(49), wherein the opposing chamber open/close valve and the chamber communication open/close valve are integrated into one valve device.

According to this form, it is possible to make the cylinder-device-actuation switching mechanism relatively simple.

(51) The Hydraulic Brake System According to any One of the Forms (41)-(50), wherein the cylinder-device-actuation switching mechanism is configured to selectively realize (a) the high-pressure-source-pressure dependent pressurizing state, (b) the operation-force/high-pressure-source-pressure dependent pressurizing state, and (c) an operation-force dependent pressurizing state in which the transmission of the brake operation force from the input piston to the pressurizing piston is permitted and in which the pressurization of the brake fluid in the pressurizing chamber by the brake operation force is permitted, under a condition that the high-pressure-source device can not supply the brake fluid in high pressure, and wherein the cylinder-device-actuation switching mechanism is configured to realize the operation-force dependent pressurizing state by permitting the forward movement of the input piston and the pressurizing piston with the input piston touching the pressurizing piston as a result of, with the opposing chamber and the inter-piston chamber communicating with each other, establishing communication between these chambers and the reservoir.

This form is a form in which, relating to a concrete structure of the cylinder-device-actuation switching mechanism of the input piston free type cylinder device for making the cylinder-device-actuation switching mechanism have a function to realize the above operation-force dependent pressurizing state, a limitation is added. According to this form, the operation-force dependent pressurizing state is realized by a simple mechanism. According to this form, in the operation-force dependent pressurizing state, the brake operation force is transmitted to the pressurizing piston with the intermediate piston contacting with the pressurizing piston because a decrease of a volume of the inter-piston chamber is permitted. According to this form, the contact of the input piston to the pressurizing piston is not limited in a direct contact of the input piston to the pressurizing piston. It also means that the input piston indirectly contacts to the pressurizing piston via some rigid body.

In the cylinder device according to this form, one reaction force chamber is formed in a state in which the inter-piston chamber and the opposing chamber communicate with each other via the chamber communication passage, whereby the volume of the inter-piston chamber is set at a relatively small capacity. That is, it is possible to make a distance between a front end of the input piston and a bottom of the blind hole relatively short. Accordingly, it is possible to make short a distance which is necessary for the input piston to move forward so as to contact to the pressurizing piston in the operation-force dependent pressurizing state, whereby, according to this form, it is possible in the failure condition etc. to make favorable operational feeling in the brake operation by reducing a play due to the distance necessary for the input piston to contact to the pressurizing piston.

More concretely about the cylinder-device-actuation switching mechanism, for example, if the cylinder-device-actuation switching mechanism have the above chamber communication open/close valve and the above opposing chamber open/close valve, opening the chamber communication open/close valve and closing the opposing chamber open/close valve realizes the operation-force dependent pressurizing state. By the way, in a state in which the opposing chamber and the inter-piston chamber communicate with each other, it is considered that one reaction force chamber is formed by these chambers. Incidentally, because a pressure in the reaction force chamber rises in accordance with the brake operation force, instead of using the opposing chamber open/close valve, it may be provided a mechanism which uses a relief valve and the like, that is, a pressure dependent communication mechanism which can establish the communication between the opposing chamber and the inter-piston chamber, and the reservoir, when the pressure in the reaction force chamber exceeds a predetermined pressure. In addition, if the pressure dependent communication mechanism is provided, it is desirable that there is also provided a volume dependent communication mechanism which establishes communication between the reaction force chamber and the reservoir when the volume of the inter-piston chamber is less than a predetermined volume, that is, when the input piston moves forward a predetermined amount to the pressurizing piston. The provision of the volume dependent communication mechanism can eliminate a loss of the brake operation force due to a pressure remaining in the reaction force chamber in the operation-force dependent pressurizing state.

(52) The Hydraulic Brake System According to any One of the Forms (41)-(51), wherein the cylinder device has an elastic-force dependent pressurizing mechanism which pressurizes at least one of the inter-piston chamber and the opposing chamber on the basis of an elastic force.

This form is a form in which the input piston free type cylinder device is configured to have a function of a so-called stroke simulator in the high-pressure-source pressure dependent pressurizing state. In other words, this form is one concrete form having the above input-piston-forward-movement permitting mechanism. According to the above elastic-force dependent pressurizing mechanism, it is possible to apply an operation reaction force in accordance with an amount of the forward movement of the input piston, that is, the operation amount of the operating member in order to give the driver operational feeling of the operating member in the high-pressure-source-pressure dependent pressurizing state. In other words, the elastic-force dependent pressurizing mechanism has an elastic member whose elastic deformation increases as the input piston moves forward, and is considered a mechanism which increases the operation reaction force as the operation amount of the operating member increases. From the opposite point of view, it is possible to consider the elastic-force dependent pressurizing mechanism as a mechanism which permits the forward movement of the input piston in accordance with the operation reaction force, that is, a mechanism which permits the operation of the operating member whose operation amount is in accordance with the operation reaction force. In the cylinder device according to this form, it is not necessary to dispose an elastic member like a spring constituting the stroke simulator out of the cylinder device, but it is possible to dispose the stroke simulator in the cylinder device. This makes the cylinder device be compact.

The elastic-force dependent pressurizing mechanism can be configured to pressurize the reaction force chamber from at lease one of the housing side, the pressurizing piston side, and the input piston side. In other words, it can be possible to employ one of a configuration in which the opposing chamber is pressurized from the housing side, a configuration in which the inter-piston chamber is pressurized from the pressurizing piston side, and a configuration in which the inter-piston chamber is pressurized from the input piston side. The form employing one of the former two configurations is considered as a form which has the stroke simulator in the housing, and the form employing the latter one configuration is considered as a form which has the stroke simulator in the input piston.

The elastic-force dependent pressurizing mechanism may be configured such that the reaction force chamber is pressurized by elastic force of springs. In this case, if two springs are used and one of them is not permitted to increase its elastic deformation in a process of the forward movement of the input piston to the pressurizing piston, it is possible to realize a stroke simulator having a characteristic regarding the operation reaction force in which an operation-reaction-force incli- nation is small in an early stage of the operation of the brake operating member and becomes large after the operation is proceeded to a certain stage.

<B-3: Forms Related to a Front-Side-of-Input-Piston Pressurizing Type Cylinder Device>

(61) The hydraulic brake system according to any one of the forms (11)-(16), wherein the input piston includes a main body and a flange formed on a circumference of the main body, and the input piston is disposed such that a first input chamber and a second input chamber each of which functions as the input chamber are defined on a front side of the main body and on a rear side of the flange respectively and such that there is defined an opposing chamber which is located on a front side of the flange with the flange interposed between the opposing chamber and the second input chamber and which is opposed to the second input chamber, and wherein the cylinder-device-actuation switching mechanism is configured to realize: (a) the high-pressure-source-pressure dependent pressurizing state by restraining a forward movement of the input piston as a result of hermetically closing the opposing chamber and by permitting application of the controlled high-pressure-source pressure to the first input chamber and the second input chamber; and (b) the operation-force/high-pressure-source-pressure dependent pressurizing state by releasing the restraint of the forward movement of the input piston as a result of establishing communication between the opposing chamber and a reservoir and by hermetically closing the first input chamber while permitting application of the controlled high-pressure-source pressure to the second input chamber.

This form is a form in which the cylinder device has a fundamental structure which is different from the two kinds of fundamental structures explained above. In the cylinder device according to this form, in the high-pressure-source-pressure pressurizing state, the above opposing chamber is hermetically closed, thereby restraining the forward movement of the input piston. In addition, the pressure supplied from the high-pressure-source device is inputted in the input chamber provided in the front side of the input piston. By the pressure, the pressurizing piston pressurizes the brake fluid in the pressurizing chamber. In the light of such a fundamental structure, for the sake of convenience, the cylinder device having the fundamental structure according to this form is called a front-side-of-input-piston pressurizing type cylinder device. Here, the restraint of the forward movement of the input piston means not only the prohibition of the forward movement of the input piston but also a forward movement of the input piston to a certain degree against the pressure in the opposing chamber. For example, explained in the later, if the cylinder device has a function of a stroke simulator which permits the forward movement of the input piston, the forward movement of the input piston permitted by the function should be also interpreted as the restraint of the forward movement of the input piston. However, it is required that, in the high-pressure-source-pressure dependent pressurizing state, the brake operation force transmitted by the input piston is cancelled by an anti-force generated by the pressure of the opposing chamber and does not function as a force pressurizing the first input chamber. Incidentally, in the high-pressure-source-pressure dependent pressurizing state, it is desirable that an area of the input piston which defines the first input chamber and to which a pressure of the first input chamber is applied is equal to an area of the input piston which defines the second input chamber and to which a pressure of the second input chamber is applied. In other words, it is desirable that an area of a front end of the main body of the input piston is equal to an area of a rear end of the flange. According to such a structure, the input piston is not moved forward or rearward by the controlled high-pressure-source pressure in the high-pressure-source-pressure dependent pressurizing state.

In the above cylinder device, the first input chamber is hermetically closed and the forward movement of the input piston is permitted in the operating-force/high-pressure-source-pressure dependent pressurizing state. Therefore, the brake fluid of the first input chamber is pressurized by the controlled high-pressure-source pressure inputted into the second input chamber and the brake operation force applied to the input piston. The brake fluid of the pressurizing chamber is pressurized depending on the pressurized pressure of the first input chamber

(62) The Hydraulic Brake System According to the Form (61),
wherein the cylinder-device-actuation switching mechanism includes i) an opposing chamber open/close valve provided on a passage through which the opposing chamber and the reservoir communicate with each other and ii) a first input chamber open/close valve provided on a passage through which the first input chamber and the high-pressure-source device communicate with each other, and
wherein the cylinder-device-actuation switching mechanism is configured to selectively realize the high-pressure-source-pressure dependent pressurizing state and the operation-force/high-pressure-source-pressure dependent pressurizing state by operations of the opposing chamber open/close valve and the first input chamber open/close valve.

This form is a form in which, relating to a concrete structure of the cylinder-device-actuation switching mechanism, that is, a concrete structure for selectively realizing the high-pressure-source-pressure dependent pressurizing state and the operation-force/high-pressure-source-pressure dependent pressurizing state by the intermediate piston lock type cylinder device, a limitation is added. According to this form, it is possible to switch a pressurizing state of the cylinder device with a simple mechanism.

(63) The Hydraulic Brake System According to the Form (62),
wherein each of the opposing chamber open/close valve and the first input chamber open/close valve is an electromagnetic open/close valve, and
wherein the cylinder-device-actuation switching mechanism includes a control valve device which controls the opposing chamber open/close valve and the first input chamber open/close valve.

(64) The Hydraulic Brake System According to the Form (63),
wherein the control valve device is configured to switch a state of the opposing chamber open/close valve from a close state to an open state and switch a state of the first input chamber open/close valve from an open state to a close state, when an operation-force indicating parameter which indicates the brake operation force has become larger than a predetermined threshold.

(65) The Hydraulic Brake System According to the Form (63),
wherein the control valve device is configured to switch a state of the opposing chamber open/close valve from a close state to an open state and switch a state of the first input chamber open/close valve from an open state to a close state, when one of the controlled high-pressure-source pressure and an output pressure which is a pressure of the brake fluid outputted from the pressurizing chamber has become larger than a predetermined pressure.

(66) The Hydraulic Brake System According to the Form (63),
wherein the control valve device is configured to switch a state of the opposing chamber open/close valve from a close state to an open state and switch a state of the first input chamber open/close valve from an open state to a close state, when a difference between the controlled high-pressure-source pressure and a high-pressure-source pressure which is a pressure of the brake fluid supplied by the high-pressure-source device has become smaller than a predetermined difference.

(67) The Hydraulic Brake System According to the Form (63),
wherein the cylinder device includes an input-piston-forward-movement permitting mechanism which permits the input piston to move forward within a predetermined forward movement distance against an elastic force in the high-pressure-source-pressure dependent pressurizing state, and
wherein the control valve device is configured to switch a state of the opposing chamber open/close valve from a close state to an open state and switch a state of the first input chamber open/close valve from an open state to a close state, when the input piston has moved forward by the predetermined forward movement distance in the high-pressure-source-pressure dependent pressurizing state.

The above five forms are forms in which the above two open/close valves are electromagnetic open/close valves and are controlled by the control valve device, respectively. The conditions for opening or closing the valves are respectively explained above in detail, so explanation of them are dispensed with unless needed, in the interest of brevity

(68) The Hydraulic Brake System According to the Form (62),
wherein each of the opposing chamber open/close valve and the first input chamber open/close valve is a mechanical open/close valve which operates on the basis of a pilot pressure that is inputted thereto and is one of the controlled high-pressure-source pressure and an output pressure which is a pressure of the brake fluid outputted from the pressurizing chamber, and
wherein the opposing chamber open/close valve is configured to switch from a close state to an open state and the first input chamber open/close valve is configured to switch from an open state to a close state, when said one of the controlled high-pressure-source pressure and the output pressure has become higher than a predetermined pressure.

(69) The Hydraulic Brake System According to the Form (62),
wherein each of the opposing chamber open/close valve and the first input chamber open/close valve is a mechanical open/close valve that operates on the basis of a difference between two pilot pressures which are supplied thereto, one of which is a high-pressure-source pressure which is a pressure of the brake fluid supplied by the high-pressure-source device, and the other of which is the controlled high-pressure-source pressure, and
wherein the opposing chamber open/close valve is configured to switch from a close state to an open state and the first input chamber open/close valve is configured to switch from an open state to a close state, when the difference between the high-pressure-source pressure and the controlled high-pressure-source pressure has become smaller than a predetermined difference.

These two forms are forms in which the above two open/close valves are mechanical open/close valves, respectively. According to these forms, using the mechanical open/close valves realizes a relatively low-cost hydraulic brake system.

Incidentally, a meaning of each of parameters on which are depended in opening or closing of the open/close valves is similar to that explained above, so explanations of them are dispensed here.

(70) The Hydraulic Brake System According to any One of the Forms (62)-(69), wherein the opposing chamber open/close valve and the first input chamber open/close valve are integrated into one valve device.

This form makes the cylinder-device-actuation switching mechanism relatively simple.

(71) The Hydraulic Brake System According to any One of the Forms (61)-(70), wherein the cylinder-device-actuation switching mechanism is configured to selectively realize (a) the high-pressure-source-pressure dependent pressurizing state, (b) the operation-force/high-pressure-source-pressure dependent pressurizing state, and (c) an operation-force dependent pressurizing state in which the transmission of the brake operation force from the input piston to the pressurizing piston is permitted and in which the pressurization of the brake fluid in the pressurizing chamber by the brake operation force is permitted, under a condition that the high-pressure-source device can not supply the brake fluid in high pressure, and wherein the cylinder-device-actuation switching mechanism is configured to realize the operation-force dependent pressurizing state by releasing the restraint of the forward movement of the intermediate piston as a result of establishing the communication between the opposing chamber and the reservoir and by allowing the input piston to touch to the pressurizing piston as a result of establishing communication between the first input chamber and the reservoir.

This form is a form in which, relating to a concrete structure of intermediate piston lock type cylinder device for making the cylinder-device-actuation switching mechanism have a function to realize the above operation-force dependent pressurizing state, a limitation is added. According to this form, the operation-force dependent pressurizing state is realized by a simple mechanism. According to this form, the brake operation force is transmitted to the pressurizing piston with the input piston contacting with the pressurizing piston because a decrease of a volume of the first input chamber in the operation-force dependent pressurizing state is permitted.

More concretely about the cylinder-device-actuation switching mechanism, for example, if the cylinder-device-actuation switching mechanism is configured such that the high-pressure-source-pressure control device communicates with the reservoir in the electrical failure condition, the above first input chamber open/close valve may be used as a means for establishing the communication between the first input chamber and the reservoir. Additionally, the above opposing chamber open/close valve may be used as a means for establishing the communication between the opposing chamber and the reservoir. Incidentally, because a pressure in the opposing chamber rises in accordance with the brake operation force, it may be provided a mechanism which uses not the opposing chamber open/close valve but a relief valve etc., that is, a pressure dependent communication mechanism which can establish the communication between the opposing chamber and the reservoir when the pressure in the opposing chamber exceeds a predetermined pressure. In addition, if the pressure dependent communication mechanism is provided, it is desirable that there is also provided a volume dependent communication mechanism which establishes a communication between the opposing chamber and the reservoir when the volume of the opposing chamber becomes less than a predetermined volume, that is, when the input piston moves forward a predetermined amount. The provision of the volume dependent communication mechanism can eliminate a loss of the brake operation force due to a pressure remaining in the opposing chamber in the operation-force dependent pressurizing state.

(72) The Hydraulic Brake System According to any One of the Forms (61)-(71), wherein the cylinder-device-actuation switching mechanism has i) an internal chamber which is provided inside the main body and which communicates with the opposing chamber, and ii) an elastic-force dependent pressurizing mechanism which pressurizes the internal chamber on the basis of an elastic force.

This form is a form in which the front-side-of-input-piston pressurizing type cylinder device is configured to have a function of a so-called stroke simulator in the high-pressure-source pressure dependent pressurizing state. In other words, this form is one concrete form having the above input-piston-forward-movement permitting mechanism. Concretely, the above elastic-force dependent pressurizing mechanism may be configured by that: a tube shaped space is provided in the input piston; an auxiliary piston is disposed in the space so as to define the internal chamber; and there is disposed, in the chamber, a spring which biases the auxiliary piston. The cylinder device having the thus configured elastic-force dependent pressurizing mechanism is a compact cylinder device because the spring constituting the stroke simulator is disposed in the inside of the input piston which is a dead space. Additionally, if two springs are disposed in series and one of them is not permitted to increase its elastic deformation in a process of the movement of the input piston, it is possible to realize a stroke simulator having a characteristic regarding the operation reaction force in which an operation-reaction-force inclination is small in an early stage of the operation of the brake operating member and becomes large after the operation is proceeded to a certain stage.

(73) The Hydraulic Brake System According to any One of the Forms (61)-(72), wherein an area of the input piston which defines the first input chamber and to which a pressure of the first input chamber is applied is larger than an area of the pressurizing piston which defines the first input chamber and to which the pressure of the first input chamber is applied.

In short, this form is a form in which an area of a front end of the input piston is larger than an area of a rear end of the pressurizing piston. When the switch from the high-pressure-source-pressure dependent pressurizing state to the operating-force/high-pressure-source-pressure dependent pressurizing state is conducted, the first input chamber is hermetically closed. When the brake operating member is operated in this state, an amount of the forward movement of the pressurizing piston is larger than an amount of the forward movement of the input piston. Therefore, according to this form, it is possible to make relatively large a change of the output pressure with respect to a change of the operation amount of the brake operating member in the operating-force/high-pressure-source-pressure dependent pressurizing state. From the opposite point of view, it is possible to secure a larger operation stroke in the operating-force/high-pressure-source-pressure dependent pressurizing state.

<<C: Forms in which the Braking State is Switched by Switching a Supply Source of the Brake Fluid to the Brake Device>>

(81) The Hydraulic Brake System According to the Form (1), wherein the cylinder device is configured to be constantly able to supply, to the brake device, the brake fluid which is pressurized according to both of the brake operation force and the controlled high-pressure-source pressure applied into the cylinder device, and the hydraulic brake system is configured to supply the brake fluid from the high-pressure-source device to the brake device via the high-pressure-source-pressure control device not via the cylinder device, and wherein the braking state switching device includes a switching valve device which realizes: (a) a high-pressure-source-device supplying state, in the high-pressure-source-pressure dependent braking state, in which the supply of the brake fluid from the cylinder device to the brake device is shut and a supply of the brake fluid from the high-pressure-source device to the brake device is permitted; and (b) a cylinder-device supplying state, in the operation-force/high-pressure-source-pressure dependent braking state, in which the supply of the brake fluid from the cylinder device to the brake device is permitted and the supply of the brake fluid from the high-pressure-source device to the brake device is prohibited.

The hydraulic brake system according to this form is a system configured such that the cylinder device is configured to always realize the operating-force/high-pressure-source-pressure dependent pressurizing state and such that the high-pressure-source-pressure dependent braking state and the operating-force/high-pressure-source-pressure dependent braking state are selectively realized by switching a supply source of the brake fluid for the brake device to the high-pressure-source device or the cylinder device. In the system according to this form, the communication between the cylinder device functioning as a master cylinder and the brake device is shut off in the high-pressure-source-pressure dependent braking state. In this state, the pressure of the brake fluid supplied from the high-pressure-source device via the high-pressure-source-pressure control device is inputted to the brake device, and the hydraulic brake force is generated on the basis of the operation of the operating member. In the light of this, hereinafter, the system according to this form is called a master-cut type brake-by-wire system.

(82) The Hydraulic Brake System According to the Form (81), wherein the cylinder device includes:

a housing having a shape like a tube whose front end portion is closed;

a pressurizing piston disposed in the housing such that a pressurizing chamber in which the brake fluid to be supplied to the brake device is pressurized is defined on a front side of the pressurizing piston;

an input piston which is connected to the brake operating member at a rear end portion of the input piston and which is connected to the pressurizing piston so as to be constantly enabled to transmit the brake operation force to the pressurizing piston; and an input chamber which is disposed on a rear side of the pressurizing piston and to which the controlled high-pressure-source pressure is applied.

This form is a form in which, relating to the cylinder device that can be employed in the above master-cut type brake-by-wire system, a limitation is added. According to this form, it is possible to always realize the operation-force/high-pressure-source-pressure dependent pressurizing state by a relatively simple structure. In addition, in the cylinder device according to this form, the operating-force dependent pressurizing state is realized in a state in which the high-pressure-source device can not supply the brake fluid in high pressure. Therefore, the hydraulic brake system according to this form is a system configured relatively simple.

(83) The Hydraulic Brake System According to the Form (82), wherein the cylinder device includes:

an intermediate piston which has a shape like a tube whose rear end is opened, which is disposed in the housing such that a front end of the intermediate piston touches to the pressurizing piston and an input chamber is defined on a rear side of the intermediate piston, and into which the input piston is fitted from the rear side of the intermediate piston such that an internal chamber is defined in the intermediate piston, an elastic-force applying mechanism which applies, to the input piston and the intermediate piston, an elastic force which is a force generated in accordance with a relative movement of the input piston and the intermediate piston that decreases a volume of the internal chamber and whose direction is against a direction of the relative movement.

This form is a form in which the cylinder device has a so-called stroke simulator. According to this form, the brake force is transmitted to the pressurizing piston via the elastic-force applying mechanism. The above elastic-force applying mechanism may be configured such that, for example, there is disposed, in the internal chamber, a spring whose elastic force is applied to the input piston and the intermediate piston in directions that a volume of the internal chamber increases. The cylinder device having the thus configured elastic-force applying mechanism is a compact cylinder device because the spring constituting the stroke simulator is disposed in the internal chamber, which is a dead space. Additionally, if two springs are disposed in series and one of them is not permitted to increase its elastic deformation in a process of the relative movement of the input piston and the intermediate piston, it is possible to realize a stroke simulator having a characteristic regarding the operation reaction force in which an operation-reaction-force inclination is small in an early stage of the operation of the brake operating member and becomes large after the operation is proceeded to a certain stage. Incidentally, this form is considered as a form in which the cylinder device has an input-piston-forward-movement permitting mechanism (referred in the followings).

(84) The Hydraulic Brake System According to the Forms (82) or (83), wherein the cylinder device is configured such that an output pressure which is a pressure of the brake fluid outputted from the pressurizing chamber is not lower than the controlled high-pressure-source pressure all the time.

According to this form, the hydraulic brake force is not decreased in the switch from the high-pressure-source-pressure dependent braking state to the operating-force/high-pressure-source-pressure dependent braking state. Accordingly, sufficient braking force is secured in the switch. Incidentally, if the cylinder device is configured such that the output pressure in the high-pressure-source-pressure dependent braking state is equal to the controlled high-pressure-source pressure, a sudden change of the hydraulic brake force in the switch is prevented so as to conduct the switch smoothly. In other words, it is possible to reduce a deterioration of operational feeling in operating the brake operating member in the switch as much as possible.

(85) The Hydraulic Brake System According to any One of the forms (81)-(84), wherein the switching valve device is configured to realize the cylinder-device supplying state instead of the high-pressure-source-device supplying state, when an operation-force indicating parameter which indicates the brake operation force has become larger than a predetermined threshold

(86) The Hydraulic Brake System According to any One of the Forms (81)-(84), wherein the switching valve device is configured to realize the cylinder-device supplying state in substitution for the high-pressure-source-device supplying state, when one of the controlled high-pressure-source pressure and an output pressure which is a pressure of the brake fluid outputted from the pressurizing chamber has become higher than a predetermined pressure.

(87) The Hydraulic Brake System According to any One of the forms (81)-(84), wherein the switching valve device is configured to realize the cylinder-device supplying state in substitution for the high-pressure-source-device supplying state, when a difference between the controlled high-pressure-source pressure and a high-pressure-source pressure which is a pressure of the brake fluid supplied by the high-pressure-source device has become smaller than a predetermined difference.

(88) The Hydraulic Brake System According to any One of the Forms (81)-(84), wherein the cylinder device includes:

a housing having a shape like a tube whose front end portion is closed;

a pressurizing piston disposed in the housing such that a pressurizing chamber in which the brake fluid to be supplied to the brake device is pressurized is defined on a front side of the pressurizing piston;

an input piston which is connected to the brake operating member at a rear end portion of the input piston and which is connected to the pressurizing piston so as to be constantly enabled to transmit the brake operation force to the pressurizing piston;

an input chamber disposed on a rear side of the pressurizing piston and to which the controlled high-pressure-source pressure is applied;

an input-piston-forward-movement permitting mechanism which permits the input piston to move forward within a predetermined forward movement distance against an elastic force, and wherein the switching valve device is configured to realize the cylinder-device supplying state instead of the high-pressure-source-device supplying state, when the input piston has moved forward by the predetermined forward movement distance.

These four forms are forms in which, relating to a timing of the switch from the high-pressure-source-pressure dependent braking state to the operating-force/high-pressure-source-pressure dependent braking state, limitations are added, respectively. Concretely, these are forms in which, relating to conditions for the switch from the high-pressure-source-device supplying state to the cylinder-device supplying state, limitations are added, respectively. The conditions for the switch are respectively explained above in detail, so explanations of them are dispensed here.

The switching valve device may be constituted by mainly electromagnetic open/close valves, which may be controlled by a control valve device. Instead, the switching valve device may include a mechanical open/close valve as a main component which is actuated by pilot pressure such as the output pressure, the controlled high-pressure-source pressure, and the high-pressure-source pressure etc.

BEST MODE FOR CARRYING OUT THE INVENTION

There will be described in detail some embodiments according to the claimable invention with reference to the drawings. It is to be understood, however, that the claimable invention is not limited to the details of the following embodiments and modified embodiments but may be embodied with various changes and modifications on the basis of knowledge of those skilled in the art.

1. First Embodiment

<<Configuration of Vehicle>>

Figure 1:
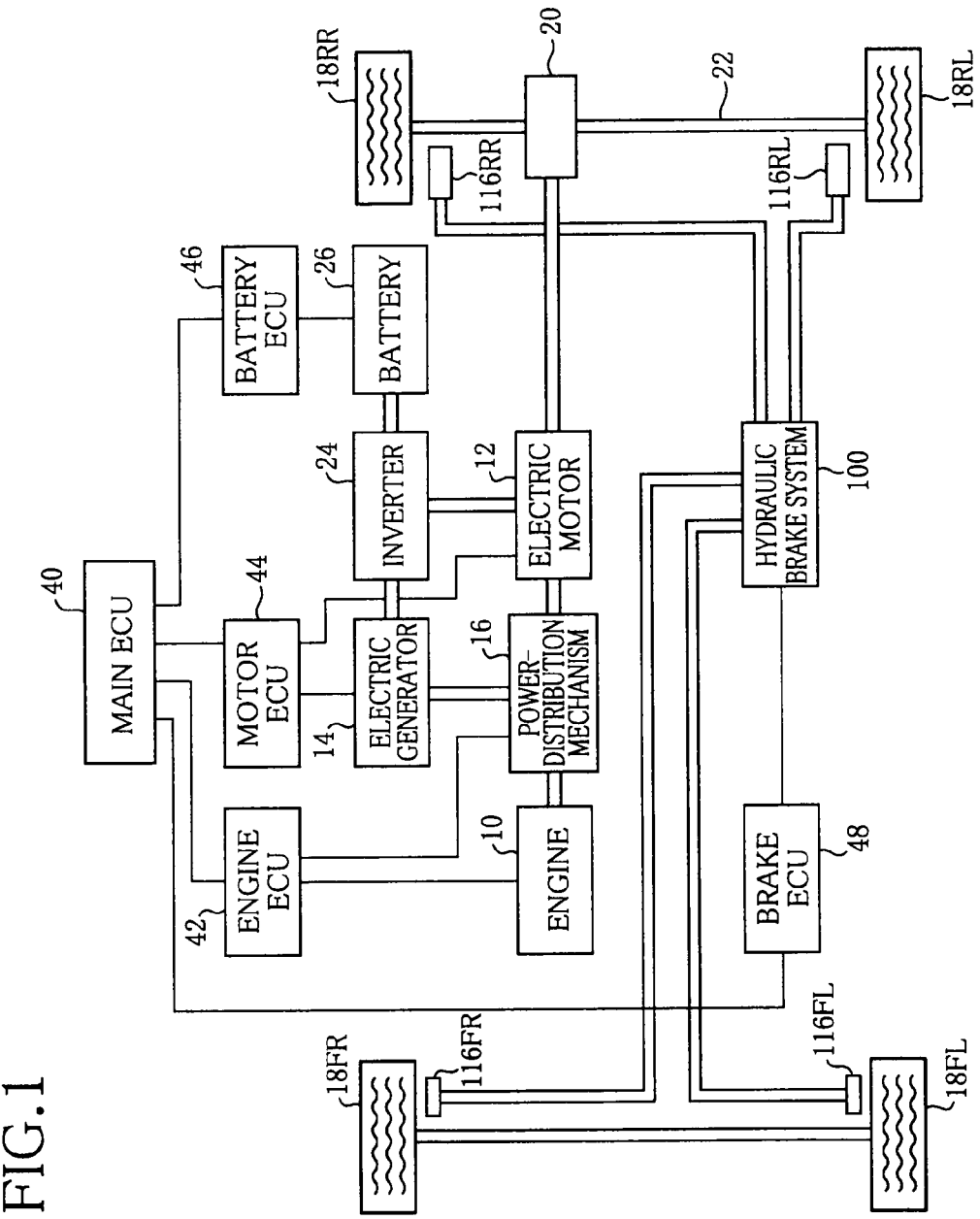
FIG. 1 is a schematic view of a drive system and a brake system of a hybrid vehicle equipped with a hydraulic brake system according to a first embodiment of the claimable invention.

FIG. 1 schematically illustrates a drive system and a brake system of a hybrid vehicle which is equipped with a hydraulic brake system of a first embodiment. The vehicle is equipped with an engine 10 and an electric motor 12 as sources of power and an electric generator 14 which generates electricity by an output power of the engine 10. The engine 10, the electric motor 12, and the electric generator 14 are connected with one another by a power-distribution mechanism 16. By controlling the power-distribution mechanism 16, the power of the engine 10 is divided into a power for driving the electric generator 14 and a power for rotating drive wheels among four wheels 18, and the power of the electric motor 12 is transmitted to the drive wheels. In other words, the power-distribution mechanism 16 functions as a speed-change mechanism with respect to a driving power which is transmitted to the drive wheels 18 via a speed reducer 20 and a drive shaft 22. While some of component elements such as the wheels 18 are collectively described, a suitable one of suffixes "FL", "FR", "RL", "RR" respectively indicative of a front left wheel, a front right wheel, a rear left wheel, and a rear right wheel is attached to the numerals of a component element where it is needed to indicate which one of the four wheels the component element corresponds to. According to the description of the suffixes, the drive wheels of the vehicle are the wheel 18RL and the wheel 18RR.

The electric motor 12 is an alternating current (AC) synchronous motor and is driven by AC electricity. The vehicle is equipped with an inverter 24 which can change electricity of direct current to electricity of alternating current and vice versa. Therefore, by controlling the inverter 24, electricity of alternating current generated by the electric generator 14 is changed into electricity of direct current which is charged in a battery 26, and electricity of direct current charged in the battery 26 is changed into electricity of alternating current for driving the electric motor 12. The electric generator 14 is configured as an alternating current (AC) synchronous motor like the electric motor 12. Accordingly, it may be considered that the vehicle of the present embodiment has two AC synchronous motors. One of them is the electric motor 12 used to mainly output the driving power and the other of them is the electric generator 14 used to mainly generate electricity by the output power of the engine 10.

The electric motor 12 can also generate (regenerate) electricity by utilizing rotations of the wheels 18RL and 18RR in the vehicle running. In regenerating electricity, the electric motor 12 connected to the wheels 18RL and 18RR generates a resistance force for restraining a rotation of the electric motor 12 while generating electricity. Therefore, it is possible to utilize the resistance force as a brake force to brake the vehicle. That is, the electric motor 12 is utilized as a means of a regenerative brake which brakes the vehicle with regenerating electricity. Thus, the vehicle is braked by controlling the regenerative brake together with an engine brake and a hydraulic brake described below. On the other hand, the electric generator 14 generates electricity mainly by the output power of the engine 10 and also functions as an electric motor which runs by electricity supplied from the battery 26 via the inverter 24.

In the vehicle, the above controls of the brakes and other controls relating to the vehicle are executed by a plurality of electronic control units (ECU). Among a plurality of ECUs, a main ECU 40 has a function for supervising the executions of these controls. For instance, the hybrid vehicle can run by a drive of the engine 10 and a drive of the electric motor 12 which are synthetically controlled by the main ECU 40. More specifically, the main ECU 40 determines a ratio between the output power of the engine 10 and the output power of the electric motor 12. On the basis of the ratio, the main ECU 40 sends to an engine ECU 42 which controls the engine 10 and a motor ECU 44 which controls the electric motor 12 and the electric generator 14, commands regarding their controls.

A battery ECU 46 which controls the battery 26 is also connected to the main ECU 40. The battery ECU 46 monitors a state of an electric charge of the battery 26 and sends a charge-request command to the main ECU 40 when the electric charge is short. When the main ECU 40 receives the charge-request command, the main ECU 40 sends, to the motor ECU 44, a command for the electric generator 14 to generate electricity so as to charge the battery 26.

A brake ECU 48 is also connected to the main ECU 40. The vehicle is equipped with a brake operating member (hereinafter, referred to as an "operating member" where appropriate) which is operated by the driver. The brake ECU 48 determines a target brake force on the basis of at least one of a brake operation amount (hereinafter, referred to as an "operation amount" where appropriate) which is an amount of the operation of the operating member and a brake operation force (hereinafter, referred to as an "operation force" where appropriate) which is a force that is applied to the operating member by the driver, and sends the target brake force to the motor ECU 44. The motor ECU 44 controls the regenerative brake on the basis of the target brake force and sends, to the main ECU 40, an executed value, that is, a value of the regenerative brake force which is being generated. In the main ECU 40, the regenerative brake force is subtracted from the target brake force, and a target hydraulic brake force which should be generated in a hydraulic brake system 100 mounted on the vehicle is determined on the basis of the subtracted value. The main ECU 40 sends the target hydraulic brake force to the brake ECU 48, and then, in a normal condition, the brake ECU 48 controls the hydraulic brake system 100 such that a hydraulic brake force which is generated by the hydraulic brake system 100 becomes equal to the target hydraulic brake force.

<<Configuration of Hydraulic Brake System>>

The hydraulic brake system 100 provided in the hybrid vehicle configured as described above will be explained with reference to FIG. 2. In the following description, the terms "forward" and "rearward" are used to indicate the leftward direction and the rightward direction in FIG. 2, respectively. In addition, the terms "front side", "front end", "forward movement", "rear side", "rear end", "rearward movement", etc. are similarly used. Incidentally, in the following explanation, characters enclosed in square brackets [ ] represent sensors etc. in the drawings.

Figure 2:
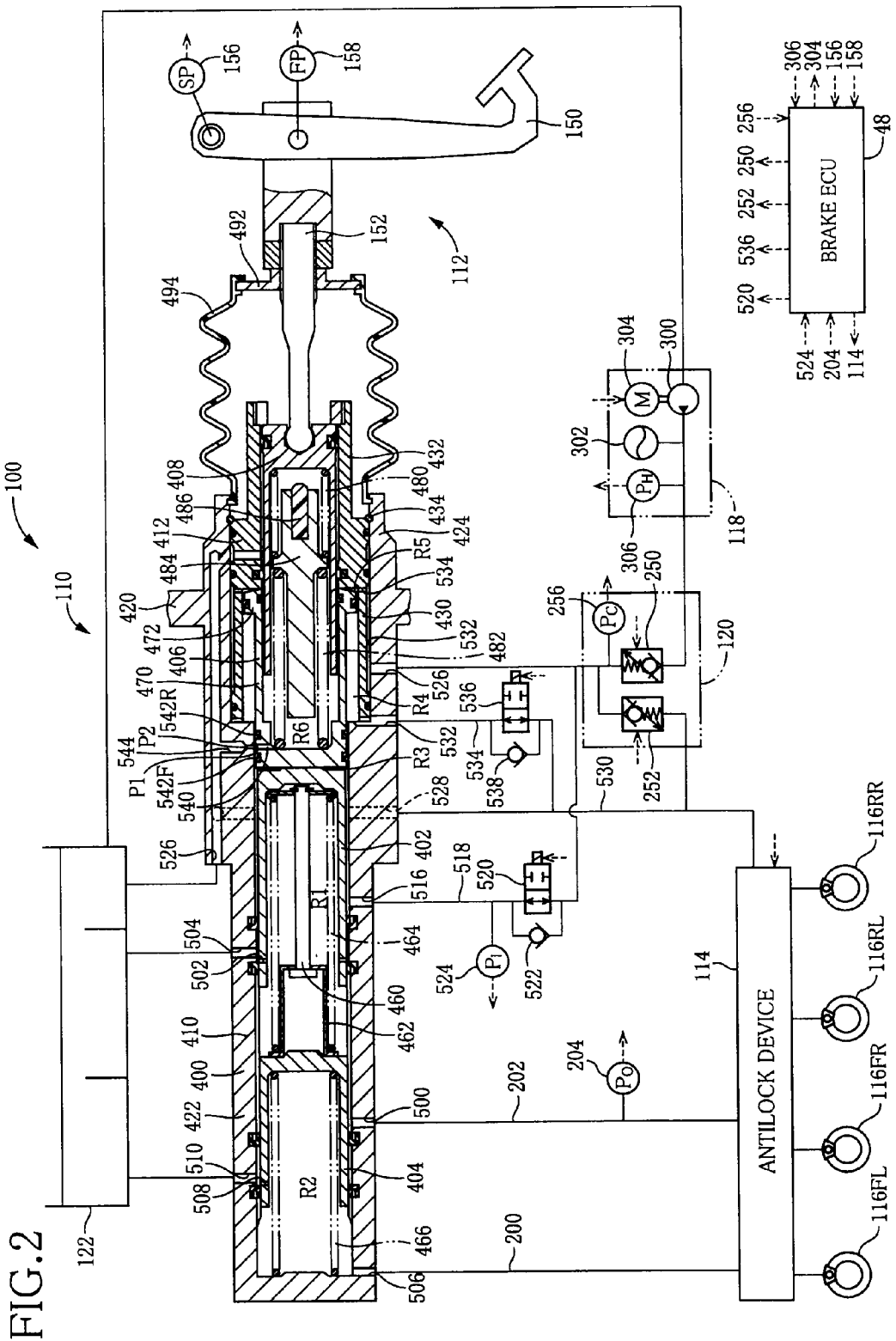
FIG. 2 is a view of a hydraulic brake system according to the first embodiment.

FIG. 2 schematically represents the hydraulic brake system 100 provided in the vehicle. The hydraulic brake system 100 has a cylinder device 110 for pressurizing the brake fluid. The driver in the vehicle can actuate the cylinder device 110 by operating an operating device 112 which is connected to the cylinder device 110. The cylinder device 110 pressurizes the brake fluid by its actuation. The pressurized brake fluid is supplied to each of brake devices 116 provided for the respective wheels via an antilock device 114 which is connected to the cylinder device 110. The brake devices 116 respectively generate forces which restrains the rotations of the wheels 18, namely, hydraulic brake forces on the basis of a pressure of the pressurized brake fluid (hereinafter, referred to as an "output pressure" where appropriate).

The hydraulic brake system 100 has an external high-pressure-source device 118 for intensifying the pressure of the brake fluid. The external high-pressure-source device 118 is connected to the cylinder device 110 via a pressure-intensifying/reducing device 120. The pressure-intensifying/reducing device 120 reduces the pressure of the brake fluid which is highly intensified by the external high-pressure-source device 118 (hereinafter, referred to as a "high-pressure-source pressure" where appropriate) to a pressure which should be applied to the cylinder device 110. Therefore, the pressure-intensifying/reducing device 120 is controlled by the brake ECU 48 to control the pressure inputted to the cylinder device 110 so as to be intensified and reduced. Hereinafter, this pressure is referred to as a "controlled high-pressure-source pressure" where appropriate. The pressure-intensifying/reducing device 120 and a part of the brake ECU 48 that controls the pressure-intensifying/reducing device 120 constitute a high-pressure-source-pressure control device which controls the pressure of the brake fluid from the high-pressure-source device 118 on the basis of the operation of the operating member. The hydraulic brake system 100 also has a reservoir 122 which stores the brake fluid under the atmospheric pressure. The reservoir 122 is connected to each of the cylinder device 110, the pressure-intensifying/reducing device 120, and the external high-pressure-source device 118.

The operating device 112 includes a brake pedal 150 as the operating member and an operation rod 152 connected to the brake pedal 150. The brake pedal 150 is pivotally held on a body of the vehicle. The operation rod 152 is connected at a rear end portion thereof to the brake pedal 150 and at a front end portion thereof to the cylinder device 110. The operation device 112 has an operation amount sensor [SP] 156 for detecting the operation amount of the brake pedal 150 and an operation force sensor [FP] 158 for detecting the operation force. The operation amount sensor 156 and the operation force sensor 158 are connected to the brake ECU 48. Therefore, the brake ECU 48 determines the target brake force on the basis of values detected by the sensors.

The brake devices 116 are connected to the cylinder device 110 via fluid passages 200, 202. The fluid passages 200, 202 are fluid passages for supplying, to the brake devices 116, the brake fluid which is pressurized to the output pressure by the cylinder device 110. An output pressure sensor [$P_O$] 204 is provided on the fluid passage 202. Though detailed description about the brake devices 116 is abbreviated, each of them includes a brake caliper, a wheel cylinder (brake cylinder) provided in the brake caliper, a pair of brake pads, and a brake disc which rotates together with the corresponding wheel. Each of the fluid passages 200, 202 is connected to the brake cylinder of the corresponding brake device 116 via the antilock device 114. More specifically, the fluid passage 200 is connected to the brake devices 116FL, 116FR for the front wheels and the fluid passage 202 is connected to the brake devices 116RL, 116RR for the rear wheels. The brake cylinders press the brake pads onto the brake disks on the basis of the output pressure of the brake fluid pressurized by the cylinder device 110. Owing to the thus generated friction, there is generated, in each of the brake devices 116, the hydraulic brake force which restrains the rotation of the corresponding wheel. Thus, the vehicle is braked.

The antilock device 114 is a common device and, in short, has four pairs of open/close valves respectively corresponding to the wheels. One of a pair of open/close valves is an open/close valve for pressurizing the brake fluid and is put in an open state when the wheel is not locked, and the other of them is an open/close valve for depressurizing the brake fluid and is put in a close state when the wheel is not locked. The antilock device 114 is configured such that, in order to release the lock of the wheel, the open/close valve for pressurizing the brake fluid shuts off a flow of the brake fluid from the cylinder device 110 to the brake device 116 and the open/close valve for depressurizing the brake fluid permits a flow of the brake fluid from the brake device 116 to the reservoir, when the wheel is locked.

The external high-pressure-source device 118 is provided on a fluid passage extending from the reservoir 122 to the pressure-intensifying/reducing device 120. The high-pressure-source device 118 includes a hydraulic pump 300 which intensifies the pressure of the brake fluid and an accumulator 302 which stores the brake fluid whose pressure is intensified. Incidentally, the hydraulic pump 300 is driven by a motor 304. The high-pressure-source device 118 has a high-pressure-source pressure sensor [$P_H$] 306 for detecting the high-pressure-source pressure described above. The brake ECU 48 monitors a value detected by the high-pressure-source pressure sensor 306, and the hydraulic pump 300 is controlled to be driven on the basis of the detected value, whereby the high-pressure-source device 118 constantly supplies, to the pressure-intensifying/reducing device 120, the brake fluid having a pressure not lower than a predetermined pressure.

The pressure-intensifying/reducing device 120 includes an electromagnetic pressure-intensifying linear valve 250 which intensifies the controlled high-pressure-source pressure and an electromagnetic pressure-reducing linear valve 252 which reduces the controlled high-pressure-source pressure. The pressure-intensifying linear valve 250 is provided on a fluid passage extending from the high-pressure-source device 118 to the cylinder device 110 while the pressure-reducing linear valve 252 is provided on a fluid passage extending from the reservoir 122 to the cylinder device 110. Incidentally, a part of the fluid passage extending from the pressure-intensifying linear valve 250 to the cylinder device 110 and a part of the fluid passage extending from the pressure-reducing linear valve 252 to the cylinder device 110 are integrated into one fluid passage which is connected to the cylinder device 110. In addition, a controlled high-pressure-source pressure sensor [$P_C$] 256 for detecting the controlled high-pressure-source pressure is provided on the integrated fluid passage. The brake ECU 48 controls the pressure-intensifying/reducing device 120 on the basis of a value detected by the controlled high-pressure-source pressure sensor 256.

The pressure-intensifying linear valve 250 is kept in a close state in a state in which electric current is not supplied thereto, that is, a coil of the pressure-intensifying linear valve 250 is not energized. By supplying electric current to the pressure-intensifying linear valve 250, that is, by energizing the coil of the pressure-intensifying linear valve 250, the valve 250 is opened at a valve-opening pressure which is determined in accordance with the supplied electric current. Incidentally, the pressure-intensifying linear valve 250 is configured such that the larger the supplied electric current is, the higher the valve-opening pressure is. On the other hand, the pressure-reducing linear valve 252 is kept in an open state in a state in which electric current is not supplied thereto. In a normal condition, that is, a condition in which electric current can be supplied to the system, the pressure-reducing linear valve 252 is put in a close state by the maximum electric current in a predetermined range that is supplied to the valve 252. When the electric current supplied to the pressure-reducing linear valve 252 is decreased, the pressure-reducing linear valve 252 is opened at a valve-opening pressure which is determined in accordance with the supplied electric current. Incidentally, the pressure-reducing linear valve 252 is configured such that the smaller the supplied electric current is, the lower the valve-opening pressure is.

<<Construction of Cylinder Device>>

As shown in FIG. 2, the cylinder device 110 includes a housing 400 which is a casing of the cylinder device 110, a first pressurizing piston 402 and a second pressurizing piston 404 which pressurize the brake fluid to be supplied to the brake devices 116, an intermediate piston 406 to which a pressure inputted from the high-pressure-source device 118 is applied, and an input piston 408 to which the operation of the driver is inputted via the operating device 112. Incidentally, FIG. 2 illustrates a state in which the cylinder device 110 is not under actuation, that is, the operation of the brake is not conducted. Like common cylinder devices, the cylinder device 110 is configured such that, inside the cylinder device 110, there are formed several fluid chambers inside which the brake fluid is accommodated and several fluid passages which connect one chamber to another chamber or exteriors are formed. Several seals are disposed between components of the cylinder device 110 so as to secure hermetical closeness of the fluid chambers and the fluid passages. Because these seals are common products, considering brief description of the specification, an explanation of the seals is dispensed unless needed.

The housing 400 is constituted mainly by two members, concretely, a first housing member 410 and a second housing member 412. The first housing member 410 has, on the whole, a shape like a tube whose front end portion is closed and has a flange 420 formed on a circumference of a rear end portion thereof. The first housing member 410 is mounted on the body of the vehicle at the flange 420. The first housing member 410 is sectioned into two portions having mutually different inner diameters, concretely, a front small-diameter portion 422 located in a front side and having the smallest inner diameter and a rear large-diameter portion 424 located in a rear side and having the largest inner diameter.

The second housing member 412 has a shape like a tube that has: a front large-diameter portion 430 located in a front side and having a large outer diameter; and a rear small-diameter portion 432 located in a rear side and having a small outer diameter. The second housing member 412 is fitted into the rear large-diameter portion 424 of the first housing member 410 such that a front end portion of the front large-diameter portion 430 is in contact with a stepping face which is formed between the front small-diameter portion 422 and the rear large-diameter portion 424 of the first housing member 410. The first housing member 410 and the second housing member 412 are fastened with each other by a lock ring 434 which is embedded on an inner face of the rear end portion of the first housing member 410.

Each of the first pressurizing piston 402 and the second pressurizing piston 404 has a shape like a tube whose rear end portion is closed. In addition, each of the first pressurizing piston 402 and the second pressurizing piston 404 is slidably fitted into the front small-diameter portion 422 of the first housing member 410. The first pressurizing piston 402 is disposed behind the second pressurizing piston 404. Between the first pressurizing piston 402 and the second pressurizing piston 404, there is defined a first pressurizing chamber R1 for pressurizing the brake fluid which is supplied to each of the brake devices 116RL, RR respectively provided for the two rear wheels. On a front side of the second pressurizing piston 404, there is defined a second pressurizing chamber R2 for pressurizing the brake fluid which is supplied to each of the brake devices 116FL, FR respectively provided for the two front wheels. In addition, the distance that the first pressurizing piston 402 and the second pressurizing piston 404 are separated from each other is limited so as to fall within a predetermined range by a headed pin 460 mounted on a rear end portion of the first pressurizing piston 402 to extend forward and a pin-retaining tube 462 fixed on a rear end face of the second pressurizing piston 404. In the first pressurizing chamber R1 and the second pressurizing chamber R2, compression coil springs (hereinafter, each of them referred to as "return springs" where appropriate) 464, 466 are disposed, respectively. By the springs, the first pressurizing piston 402 and the second pressurizing piston 404 are biased in such a direction that the pistons 402, 404 separate away from each other and the second pressurizing piston 404 is biased such a direction that it moves rearward.

The intermediate piston 406 is shaped so as to have: a body portion 470 shaped like a tube whose front end portion is closed and whose rear end portion is opened; and a flange portion 472 provided on the rear end portion of the body portion 470. The intermediate piston 406 is disposed behind the first pressurizing piston 402. A front portion of the body portion 470 is slidably fitted into a rear side of an inner face of the front small-diameter portion 422 of the first housing member 410, and the flange portion 472 is slidably fitted into an inner face of the front large-diameter portion 430 of the second housing member 412.

On a front side of the intermediate piston 406 and between the intermediate piston 406 and the rear end portion of the first pressurizing piston 402, there is defined a fluid chamber R3 into which the brake fluid can be supplied from the high-pressure-source device 118, that is, the pressure can be inputted from the high-pressure-source device 118. Hereinafter, the fluid chamber R3 is referred to as a "first input chamber R3" where appropriate. It is noted that, in FIG. 2, the first input chamber R3 is illustrated in an almost squeezed state. There is also a space inside the housing 400 which is defined between an inner face of the second housing member 412 and an outer face of the body portion 470 of the intermediate piston 406. This space is defined by a front end face of the flange portion 472 of the intermediate piston 406 and by the stepping face formed between the front small-diameter portion 422 and the rear large-diameter portion 424 of the first housing member 410, whereby there is formed a ring-shaped fluid chamber (hereinafter, referred to as an "opposing chamber" where appropriate) R4. In addition, on a rear side of the flange portion 472, there is defined a fluid chamber (hereinafter, referred to as a "second input chamber" where appropriate) R5 by the flange portion 472 and a stepping face of the second housing member 412, whose volume increases in accordance with a forward movement of the intermediate piston 406 and into which the pressure is inputted from the high-pressure-source device 118. It is noted that, in FIG. 2, the second input chamber R5 is illustrated in an almost squeezed state. Incidentally, the above opposing chamber R4 is a chamber which is opposed to the second input chamber R5 with the flange portion 472 of the intermediate piston 406 interposed therebetween.

The input piston 408 is shaped in a tube whose front end portion is opened and whose rear portion is closed. The input piston 408 is inserted into the housing 400 from a rear end side thereof with slidably contacting with the inner face of the second housing member 412. The input piston 408 is also inserted into the intermediate piston 406 so as to be movable forward and rearward relative to the intermediate piston 406 while slidably contacting with an inner face of the intermediate piston 406. Inside of the intermediate piston 406 and the input piston 408 constituted thus, there is defined a fluid chamber (hereinafter, referred to as an "internal chamber" where appropriate) R6 whose volume is changed by a relative movement of the intermediate piston 406 and the input piston 408. In addition, a rearward movement of the intermediate piston 406 is limited by an abutting contact of the flange portion 472 with the stepping face which is formed between the front large-diameter portion 430 and the rear small-diameter portion 432 of the second housing member 412.

In the internal chamber R6, two compression coil springs, namely, a first reaction force spring 480 and a second reaction force spring 482 are disposed between an inner bottom face of the intermediate piston 406 and an inner bottom face of the input piston 408. The first reaction force spring 480 is disposed behind the second reaction force spring 482 in series. In addition, a floating seat 484 which is shaped like a rod having a flange is sandwiched between those reaction force springs 480, 482 and floatingly supported by them. The first reaction force spring 480 is supported at a front end portion thereof by a rear seat face of the floating seat 484 and supported at a rear end portion thereof by a rear end portion of the input piston 408. The second reaction force spring 482 is supported at a front end portion thereof by a front end portion of the intermediate piston 406 and supported at a rear end portion thereof by a front seat face of the floating seat 484. The thus disposed first reaction force spring 480 and second reaction force spring 482 bias the input piston 408 and the intermediate piston 406 in directions that the pistons 406, 408 separate away from each other, that is, in directions that a volume of the internal chamber R6 increases. Accordingly, the cylinder device 110 is equipped with an elastic-force applying mechanism which is constituted by the first reaction force spring 480 and the second reaction force spring 482, that is, a mechanism which applies, to the input piston 408 and the intermediate piston 406, an elastic force against the relative movement of the pistons 406, 408 in directions that the pistons 406, 408 approach each other by reaction forces of the springs 480, 482, that is, in directions that the volume of the internal chamber R6 decreases. A cushion rubber 486 is embedded in a rear end portion of the floating seat 484. Because the cushion rubber 486 abuts on a rear end face of the input piston 408, the floating seat 484 and the input piston 408 are limited so as not to move toward each other beyond a certain distance.

A front end portion of the operation rod 152 is connected to the rear end portion of the input piston 408 so as to transmit, to the input piston 408, the operation force applied to the brake pedal 150 and so as to move the input piston 408 forward and rearward in accordance with the operation amount of the brake pedal 150. Incidentally, the rearward movement of the input piston 408 is limited because the rear end portion thereof is stopped by a rear end portion of the rear small-diameter portion 432 of the second housing member 412. In addition, a round-shaped support disc 492 is fixed to the operation rod 152 and a boot 494 is provided between the support disc 492 and the housing 400 so as to protect a rear portion of the cylinder device 110 from dust.

The first pressurizing chamber R1 communicates with the fluid passage 202 connected to the antilock device 114 via a communication hole 500 whose opening is an output port while the first pressurizing chamber R1 communicates with the reservoir 122 via a communication hole 502 provided on the first pressurizing piston 402 and a communication hole 504 whose opening functions as a drain port such that it is allowed for the first pressurizing chamber R1 not to communicate with the reservoir 122. On the other hand, the second pressurizing chamber R2 communicates with the fluid passage 200 connected to the antilock device 114 via a communication hole 506 whose opening is an output port while the second pressurizing chamber R2 communicates with the reservoir 122 via a communication hole 508 provided on the second pressurizing piston 404 and a communication hole 510 whose opening functions as a drain port such that it is allowed for the second pressurizing chamber R2 not to communicate with the reservoir 122.

An outer diameter of the first pressurizing piston 402 is somewhat smaller than an inner diameter of the front small-diameter portion 422 of the first housing member 410. Between the first pressurizing piston 402 and the front small-diameter portion 422, there is formed a fluid passage 512 having a certain cross section area through which the brake fluid can flow. The input chamber R3 is allowed to communicate with exteriors through the fluid passage 512 and a communication hole 516 whose opening is a connection port. The communication hole 516 is connected to the pressure-intensifying/reducing device 120 via an external communication passage 518. In addition, an electromagnetic first-input-chamber open/close valve 520 and a check valve 522 are provided on the external communication passage 518, and a pressure sensor [$P_I$] 524 is provided on the external communication passage 518 for detecting a pressure of the input chamber R3 (hereinafter, referred to as an "input pressure" where appropriate).

A communication hole 526 whose opening is a drain port is provided on the first housing member 410 and is connected to the reservoir 122. A communication hole 528 whose opening is a connection port is connected to the communication hole 526 inside the first housing member 410. Furthermore, to the connection port of the communication hole 528, one end of an external communication passage 530 is connected and the other end thereof is connected to the pressure-reducing linear valve 252 of the pressure-intensifying/reducing device 120.

The opposing chamber R4 can communicate with exteriors through a communication hole 532 whose opening is a connection port. To the connection port, one end of an external communication passage 534 is connected and the other end thereof is connected to the external communication passage 530. Accordingly, the external communication passage 534 communicates with the reservoir 122. In addition, on the external communication passage 534, there is provided an electromagnetic opposing-chamber open/close valve 536 which opens or closes the external communication passage 534. The thus constituted cylinder device 110 is equipped with a mechanism including the external communication passage 534 and the opposing-chamber open/close valve 536, namely, a first communication-state switching mechanism which selectively realizes an opposing-chamber communication state in which the opposing chamber R4 and the reservoir 122 communicate with each other and an opposing-chamber not-communication state in which they do not communicate with each other. In addition, a check valve 538 is provided on the external communication passage 534 so as to prevent a pressure of the brake fluid in the opposing chamber R4 from decreasing below the atmospheric pressure.

On the intermediate piston 406, there is provided a communication hole 540 whose opening provided on an outer face of the intermediate piston 406 is a piston-side port P1. The communication hole 540 is connected to the internal chamber R6, that is, a communication passage (hereinafter, referred to as a "first communication passage" where appropriate) is formed by the communication hole 540. Besides, ring-shaped seals 542F, 542R are embedded on the outer face of the intermediate piston 406 and are respectively embedded in front and the rear of the communication hole 540 at relatively small interval. By the way, a communication passage 544 is formed inside a wall of the first housing member 410. One end of the communication passage 544 is connected to the communication hole 526 and the other end of the communication passage 544 is an opening provided on an inner face of a rear end portion of the front small-diameter portion 422. This opening is a housing-side port P2. The communication passage 526 and the communication passage 544 form one communication passage (hereinafter, referred to as a "second communication passage" where appropriate).

Even in an instance when the brake fluid having high pressure is supplied from the high-pressure-source device 118 via the pressure-intensifying/reducing device 120 to the first input chamber R3 and the second input chamber R5, the intermediate piston 406 is not moved forward or rearward. More specifically, an area of a front end of the body portion 470 which defines the first input chamber R3 and to which a pressure of the brake fluid in the first input chamber R3 is applied is almost equal to an area of a rear end of the flange portion 472 which defines the second input chamber R5 and to which a pressure of the brake fluid in the second input chamber R5 is applied. Therefore, a force in accordance with the pressure in the first input chamber R3 to move the intermediate piston 406 rearward and a force in accordance with the pressure in the second input chamber R5 to move the intermediate piston 406 forward are kept in equilibrium, thereby preventing the intermediate piston 406 from moving forward or rearward.

<<Actuation of Cylinder Device>>

The following explanation is regarding actuations of the cylinder device 110. For the sake of convenience, before an actuation in the normal condition is explained, an actuation in an electrical failure condition, that is, a condition in which the supply of electric current to the hydraulic brake system 100 is cut off is explained. In the electrical failure condition, the pressure-intensifying linear valve 250 and the pressure-reducing linear valve 252 are in the close state and the open state, respectively. The first-input-chamber open/close valve 520 is put in the open state, whereby the first input chamber R3 communicates with the reservoir 122 via the pressure-reducing linear valve 252, the communication hole 528, the external communication passage 526, and the external communication passage 530. The opposing-chamber open/close valve 536 is also put in the open state, whereby there is realized, by the first communication-state switching mechanism, the opposing-chamber communication state in which the opposing chamber R4 and the reservoir 122 communicate with each other.

In the electrical failure condition, when the driver starts pressing the brake pedal 150, the input piston 408 starts to move forward. In the start of pressing, the intermediate piston 406 is not yet moved forward and the piston-side port P1 and the housing-side port P2 are opposed to each other between the seals 542F and 542R. Accordingly, the piston-side port P1 and the housing-side port P2 communicate with each other, which realizes an internal chamber communication state in which the internal chamber R6 and the reservoir 122 communicate with each other. In this state, the input piston 408 is moved forward relative to the intermediate piston 406 while compressing the first reaction force spring 480 and the second reaction force spring 482, causing the brake fluid in the internal chamber R6 to outflow to the reservoir 122. As a result, a volume of the internal chamber R6 decreases.

Shortly after the input piston 408 has been moved forward, the intermediate piston 406 is moved forward by reaction forces of the first reaction force spring 480 and the second reaction force spring 482. When the seal 542R passes over the housing-side port P2 by the forward movement of the intermediate piston 406, the communication between the piston-side port P1 and the housing-side port P2 is shut off, which realizes an internal chamber not-communication state. Therefore, the volume change of the internal chamber R6 is prohibited, which prohibits the relative movement of the input piston 408 and the intermediate piston 406. This enables the input piston 408 and the intermediate piston 406 to be unitedly moved forward. The cylinder device 110 constituted as described above is equipped with a mechanism which includes the first communication passage, the second communication passage, the piston-side port P1, the housing-side port P2, and the seal 542F, 542R, namely, a second communication-state switching mechanism or an internal-chamber-communication switching mechanism which selectively realizes the internal chamber communication state in which the internal chamber R6 and the reservoir 122 communicate with each other and the internal chamber not-communication state in which they do not communicate with each other.

When the intermediate piston 406 is moved forward, the intermediate piston 406 moves the first pressurizing piston 402 while being held in an abutting contact with the first pressurizing piston 402. In addition, because the input piston 408 and the intermediate piston 406 are united in the internal chamber not-communication state, the operation force which is applied to the brake pedal 150 is directly transmitted to the first pressurizing piston 402. Consequently, the driver can push the first pressurizing piston 402 by the driver's own force. Thus, the first pressurizing piston 402 is moved forward, shutting off the communication between the first pressurizing chamber R1 and the reservoir 122, whereby the brake fluid in the first pressurizing chamber R1 is pressurized by the operation force applied to the brake pedal 150. The second pressurizing piston 404 is also moved forward in accordance with the pressurization in the first pressurizing chamber R1, shutting off the communication between the second pressurizing chamber R2 and the reservoir 122 in a manner similar to that described above with respect to the first pressurizing chamber R1, whereby the brake fluid in the second pressurizing chamber R2 is pressurized. Thus, an operation-force dependent pressurizing state is realized in which the brake fluid in the first pressurizing chamber R1 and the second pressurizing chamber R2 is pressurized by the operation force that is applied to the brake pedal 150, and a fluid pressure in accordance with the driver's operation force is inputted to the brake devices 116.

When the driver finishes the operation of the brake, that is, releases the application of the operation force to the brake pedal 150, the first pressurizing piston 402, the second pressurizing piston 404, and the intermediate piston 406 are respectively returned to their initial positions illustrated in FIG. 2 by the return springs 464, 466. When these pistons are respectively in their initial positions, the flange portion 472 abuts on the stepping face which is formed between the front large-diameter portion 430 and the rear small-diameter portion 432 of the second housing member 412. In addition, the input piston 408 is returned, together with the operation rod 152, to the initial position illustrated in FIG. 2 by the first reaction force spring 480 and the second reaction force spring 482. When the input piston 408 is in the initial position, the rear end portion thereof is stopped by the rear end portion of the rear small-diameter portion 432 of the second housing member 412.

The actuation of the cylinder device 110 in the normal condition is described below. In the normal condition, the opposing-chamber open/close valve 536 is energized so as to be in the close state. Therefore, the first communication-state switching mechanism realizes the opposing-chamber not-communication state in which the opposing chamber R4 and the reservoir 122 do not communicate with each other. Accordingly, the opposing chamber R4 is hermetically closed, and the forward movement of the intermediate piston 406 is prohibited. In this condition, even though the input piston 408 is moved forward by the brake operation, the internal chamber communication state in which the internal chamber R6 and the reservoir 122 communicate with each other is kept by the second communication-state switching mechanism because of the prohibition of the forward movement of the intermediate piston 406. Unlike in the above electrical failure condition, the forward movement of the input piston 408 relative to the intermediate piston 406 is allowed in the normal condition. When the input piston 408 is moved forward, the elastic force generated by the elastic-force applying mechanism, that is, the first reaction force spring 480 and the second reaction force spring 482, is applied to the input piston 408 as a resistance force. Therefore, the elastic force functions as an operation reaction force against the operation of the brake pedal 150.

Figure 3:
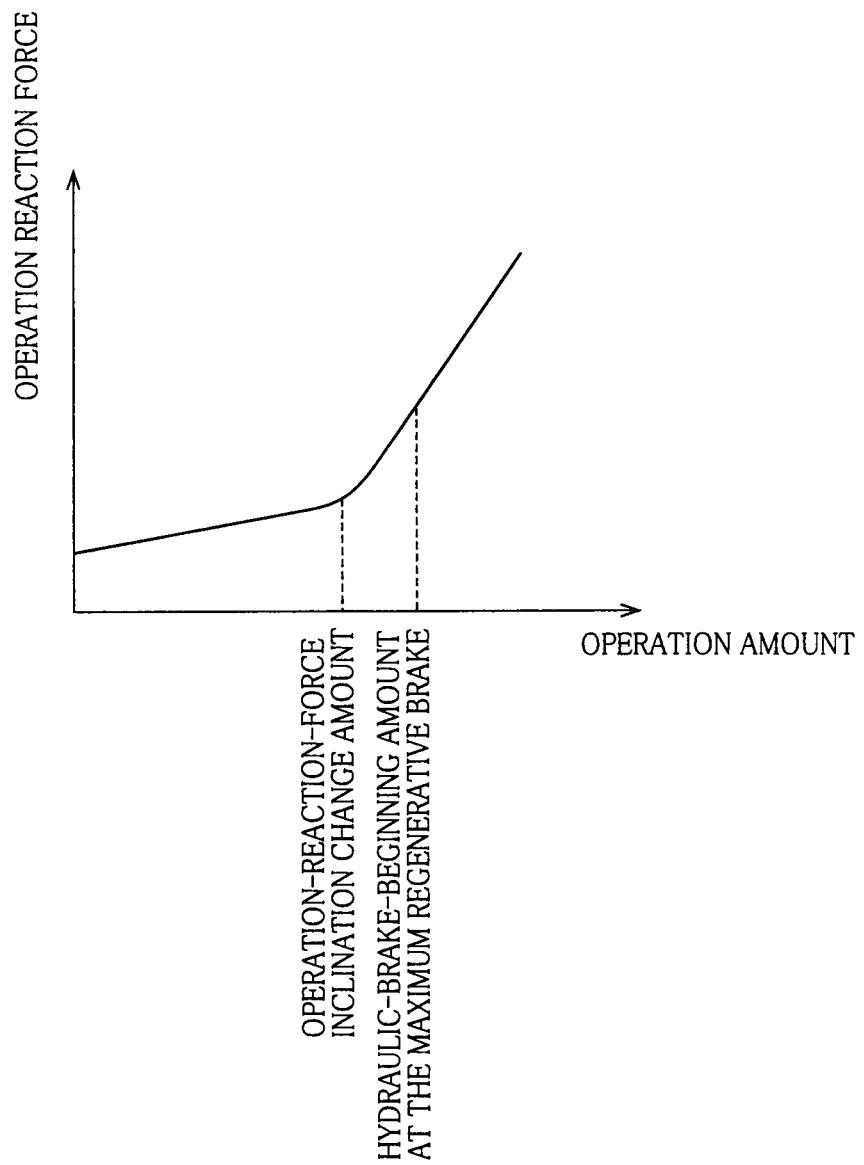
FIG. 3 is a graph which illustrates a relation between an operation amount of an operation member connected to a cylinder device and an operation reaction force applied from the cylinder device to the operation member, in the hydraulic brake system according to the first embodiment.

FIG. 3 is a graph which illustrates a change of the operation reaction force with respect to the amount of the forward movement of the input piston 408, namely, the operation amount of the brake pedal 150. Hereinafter, this change is referred to as an "operation reaction force" inclination where appropriate. In other words, FIG. 3 is a graph which describes a characteristic of the cylinder device 110 regarding the operation reaction force. It is understood from the graph that the operation reaction force increases, as the operation amount increases. Where the operation amount of the brake pedal 150 increases beyond a predetermined amount (hereinafter, referred to as an "operation-reaction-force inclination change amount" where appropriate), a change of the operation reaction force with respect to a change of the operation amount becomes large, that is, an inclination of the increase of the operation reaction force becomes large.

The change of the operation reaction force which has a characteristic shown in FIG. 3 is realized by that a pressurizing force of the first reaction force spring 480, which is one of the two reaction force springs 480, 482, is prohibited from increasing where the operation amount of the brake pedal 150 exceeds the operation-reaction-force inclination change amount, in other words, where a distance of the forward movement of the input piston 408 exceeds a predetermined distance. In the cylinder device 110, the first reaction force spring 480 is configured to have a spring constant much smaller than that of the second reaction force spring 482. Therefore, in a range in which the operation amount is relatively small, a change of the operation reaction force with respect to a change of the operation amount is considerably small. To be more specific, in the range in which the operation amount is relatively small, both of the first reaction force spring 480 and the second reaction force spring 482 are compressed. In contrast, where the operation amount exceeds the operation-reaction-force inclination change amount, the cushion rubber 486 abuts on the rear end portion of the input piston 408. Therefore, the first reaction force spring 480 can not elastically deform while the second reaction force spring 482 can elastically deform. According to such a mechanism, the inclination of the operation reaction force becomes large where the brake pedal 150 is operated beyond the predetermined amount. Such a characteristic makes operational feeling of the brake pedal 150 more favorable.

Moreover, when the brake pedal 150 is operated further, a front end portion of the floating seat 484 comes into abutting contact with a front end face of the intermediate piston 406. Consequently, the second reaction force spring 482 can not elastically deform. That is, in the cylinder device 110, there is set a predetermined forward movement distance at which the forward movement of the input piston 408 is prohibited. That is, in the brake operation, there is set an operation limit which is determined by the predetermined forward movement distance. Thus, the cylinder device 110 has a mechanism which includes the first reaction force spring 480, the second reaction force spring 482, the floating seat 484, and the cushion rubber 486, namely, an input-piston-forward-movement permitting mechanism which permits the forward movement of the input piston 408 within the predetermined forward movement distance against the elastic force.

As explained above, in the vehicle, a magnitude of the hydraulic brake force which the hydraulic brake system 100 should generate corresponds to a magnitude obtained by subtracting the regenerative brake force from the target brake force. In an extreme sense, as long as the regenerative brake force can meet the target brake force, the hydraulic brake force to be generated by the hydraulic brake system 100 is not required. The cylinder device 110 is configured to generate, in the normal condition, the operation reaction force in accordance with the operation amount of the brake pedal 150 without depending on the generated hydraulic brake force. In an extreme sense, the cylinder device 110 has a function of permitting the operation of the brake pedal 150 with the brake fluid not pressurized by the first pressurizing piston 402 and the second pressurizing piston 404. Therefore, the cylinder device 110 has a favorable stroke simulator for the hybrid vehicle.

When the brake fluid in the first pressurizing chamber R1 and the second pressurizing chamber R2 is pressurized by the first pressurizing piston 402 and the second pressurizing piston 404, respectively, so as to generate the hydraulic brake force in the middle of the brake operation, a pressure generated by the high-pressure-source device 118 may be inputted into the input chamber R3. To be more specific, the controlled high-pressure-source pressure controlled by the pressure-intensifying/reducing device 120 may be inputted into the input chamber R3 so as to generate the hydraulic brake force whose magnitude corresponds to the magnitude obtained by subtracting the regenerative brake force from the target brake force. Here, a maximum regenerative brake force which can be generated by the regenerative brake of the vehicle is defined as an available-maximum-regenerative brake force. Where it is assumed that the hydraulic brake force is generated after a time point when the target brake force exceeds the available-maximum-regenerative brake force, the operation amount of the brake pedal at the beginning of the generation of the hydraulic brake force is generally equal to a hydraulic-brake-beginning amount at the maximum regenerative brake in FIG. 3. In the hydraulic brake system 100, the hydraulic-brake-beginning amount at the maximum regenerative brake is predetermined to be a slightly larger than the above operation-reaction-force inclination change amount. Incidentally, even though the target brake force does not exceed the available-maximum-regenerative brake force, there is an instance in which the hydraulic brake force is required due to an amount of charge of the battery 26 etc. In this instance, the pressure from the high-pressure-source device 118 may be inputted into the input chamber R3 before the operation amount reaches the hydraulic-brake-beginning amount at the maximum regenerative brake.

When the pressure is inputted into the input chamber R3, the first pressurizing piston 402 is moved forward by the pressure without depending on the operation force applied to the brake pedal 150 and without depending on the operation amount. Consequently, the brake fluid in the first pressurizing chamber R1 is pressurized. According to that, the brake fluid in the second pressurizing chamber R2 is also pressurized by the second pressurizing piston 404. That is, a high-pressure-source-pressure dependent braking state is realized in which the brake fluid in the first pressurizing chamber R1 and the second pressurizing chamber R2 is pressurized by the pressure from the high pressure source, irrespective of the forward movement of the input piston 408. The brake force depending on the cylinder device 110, namely, the hydraulic brake force is determined by the pressure of the inputted brake fluid. The controlled high-pressure-source pressure is controlled by the high-pressure-source pressure control device and the pressure controlled at a required degree is inputted into the input chamber R3.

Even in the normal condition, when the operation of the brake is finished, the pressure-reducing linear valve 252 is put in the open state; the first pressurizing piston 402 and the second pressurizing piston 404 are respectively returned to their initial positions by the return springs 464, 466; and the input piston 408 is returned to the initial position by the first reaction force spring 480 and the second reaction force spring 482.

By the way, in the normal condition, there happens a case in which a large brake force is required in a brake fade, an emergency brake, and so on. In this case (hereinafter, referred to as a "large-brake-force required case" where appropriate), the hydraulic brake system 100 is configured to be able to generate a brake force larger than a maximum brake force which can be generated in the above high-pressure-source-pressure dependent braking state. Hereinafter, the maximum brake force is referred to as a "high-pressure-source dependent maximum brake force" where appropriate. In other words, the hydraulic brake system 100 is configured to be able to generate a brake force larger than the brake force which is generated when the high-pressure-source pressure generated by the high-pressure-source device 118 is directly inputted into the first input chamber R3 in the high-pressure-source-pressure dependent state. An operation in the large-brake-force required case is described below.

In the large-brake-force required case, the first-input-chamber open/close valve 520 is put in the close state and the opposing-chamber open/close valve 536 is put in the open state, that is, the first input chamber R3 is hermetically closed, and the opposing-chamber communication state is realized by the first communication-state switching mechanism, whereby the opposing chamber R4 communicates with the reservoir 122. Therefore, it becomes possible to move the intermediate piston 406 forward by the operation force of the driver in addition to a force depending on the controlled high-pressure-source pressure inputted into the second input chamber R5. The forward movement of the intermediate piston 406 pressurizes the brake fluid in the first pressurizing chamber R1 and the second pressurizing chamber R2 via the brake fluid confined in the first input chamber R3. That is, in the large-brake-force required case, the brake fluid in the first pressurizing chamber R1 and the second pressurizing chamber R2 can be pressurized by both of the controlled high-pressure-source pressure and the operation force applied to the brake pedal 150. This pressurization enables the output pressure from each of the first pressurizing chamber R1 and the second pressurizing chamber R2 to become higher than the output pressure in a state in which the input pressure that the high-pressure-source device 118 can generate at most is inputted into the first input chamber R3 in the above high-pressure-source-pressure dependent brake state. That is, an operation-force/high-pressure-source-pressure dependent braking state is realized in which there can be obtained a brake force larger than the high-pressure-source dependent maximum brake force. In other words, the thus constructed cylinder device 110 is equipped with a cylinder-device-actuation switching mechanism which selectively realizes the high-pressure-source-pressure dependent braking state and the operation-force/high-pressure-source-pressure dependent braking state by a control valve device including the first-input-chamber open/close valve 520 and the opposing-chamber open/close valve 536.

<<Concrete Way of Switching Braking State>>

Figure 4:
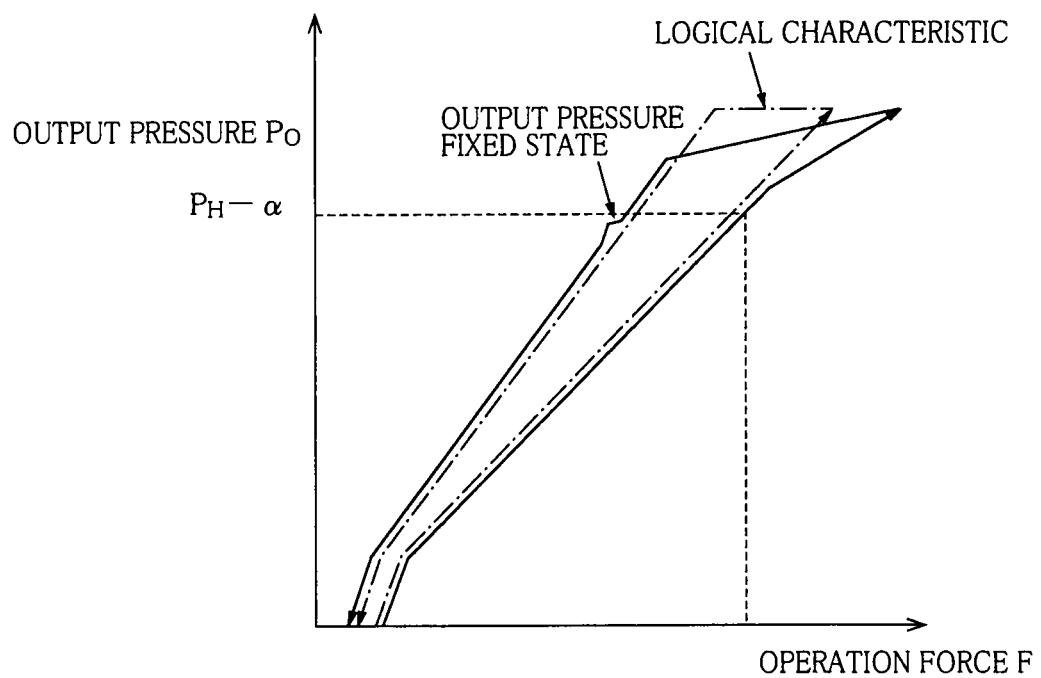
FIG. 4 is a graph which schematically illustrates a change of an output pressure from the cylinder device with respect to a change of a brake operation force, in the hydraulic brake system according to the first embodiment.

FIG. 4 is a graph which schematically describes a change of the output pressure $P_O$ with respect to a change of the operation force F of the brake pedal 150 operated by the driver in the normal condition. To make an explanation easier, the following explanation is conducted on condition that: there is no regenerative brake force; a target hydraulic brake force $P_{TAR}$ is determined in accordance with the operation force F of the driver; and the controlled high-pressure-source pressure $P_C$ is determined on the basis of the target hydraulic brake force $P_{TAR}$. The graph of FIG. 4 is also described on the condition. Incidentally, a long dashed short dashed line of the graph indicates a logical characteristic in the high-pressure-source dependent braking state.

In the hydraulic brake system 100, the brake fluid in the first pressurizing chamber R1 and the second pressurizing chamber R2 is pressurized by the input pressure $P_I$ which is the pressure of the first input chamber R3. On the other hand, the controlled high-pressure-source pressure $P_C$ is determined in accordance with the operation force F. Because the controlled high-pressure-source pressure $P_C$ is inputted into the first input chamber R3, the output pressure $P_O$ is roughly proportional to the operation force F in the high-pressure-source-pressure dependent braking state, that is, the high-pressure-source-pressure dependent pressurizing state, as indicated in the graph of FIG. 4. In addition, in the high-pressure-source-pressure dependent pressurizing state, the input pressure $P_I$ is equal to the controlled high-pressure-source pressure $P_C$ and the controlled high-pressure-source pressure $P_C$ does not become higher than the high-pressure-source pressure $P_H$. Therefore, when the controlled high-pressure-source pressure $P_C$ reaches to the high-pressure-source pressure $P_H$, the output pressure $P_O$ reaches to the highest level, that is, the hydraulic brake force reaches to the highest level. The hydraulic brake force on that occasion is the high-pressure-source dependent maximum brake force.

In the hydraulic brake system 100, in the high-pressure-source-pressure dependent pressurizing state, the input pressure $P_I$ is equal to the controlled high-pressure-source pressure $P_C$ and can be considered as an operation-force indicating parameter which indicates the operation force F. Therefore, where the input pressure $P_I$ is close to the high-pressure-source pressure $P_H$, a brake-force-generating state is switched from the high-pressure-source-pressure dependent braking state to the operation-force/high-pressure-source-pressure dependent braking state. Concretely, a margin pressure $\alpha_H$ for smoothly conducting the switch of the brake-force-generating state is predetermined, and the switch from the high-pressure-source-pressure dependent braking state to the operation-force/high-pressure-source-pressure dependent braking state is conducted where a difference between the high-pressure-source pressure $P_H$ and the input pressure $P_I$ becomes smaller than the margin pressure $\alpha_H$ as a predetermined difference.

In the operation-force/high-pressure-source-pressure dependent braking state, as described above, the first input chamber R3 is hermetically closed, and the intermediate piston 406 is moved forward by the operation force F and the controlled high-pressure-source pressure $P_C$ inputted into the second input chamber R5. In accordance with the forward movement, the brake fluid in the first pressurizing chamber R1 and the second pressurizing chamber R2 is pressurized. After a degree of the controlled high-pressure-source pressure $P_C$ is equal to a degree of the output pressure $P_H$, as illustrated in the graph of FIG. 4, the output pressure $P_O$ increases in accordance with the increase of the operation force F, and the hydraulic brake force accordingly increases. It is noted that, the input pressure $P_I$ detected in the operation-force/high-pressure-source-pressure dependent braking state, that is, the pressure of the first input chamber R3, increases in accordance with the increase of the output pressure $P_O$.

In a case where the operation force F decreases in the operation-force/high-pressure-source-pressure dependent braking state, the output pressure $P_O$ decreases in accordance with the decrease of the operation force F. In this case, the intermediate piston 406 moves rearward. After the intermediate piston 406 returned to the above initial position, the rearward movement of the intermediate piston 406 is prohibited. After this prohibition, because the first input chamber R3 is hermetically closed, the input pressure $P_I$ is fixed and the output pressure $P_O$ is fixed (output pressure fixed state which is indicated in FIG. 4), that is, the hydraulic brake force is not decreased.

In the light of the above explanations, in the hydraulic brake system 100, when the intermediate 406 has returned to the initial position, that is, to the position before the switch to the operation-force/high-pressure-source-pressure dependent pressurizing state, a switch from the operation-force/high-pressure-source-pressure dependent braking state to the high-pressure-source-pressure dependent braking state is conducted. To be more specific, the switch is conducted on the condition that a ratio of a change speed $dP_I$ of the input pressure $P_I$ with respect to a change speed $dP_{TAR}$ of the target hydraulic brake force $P_{TAR}$ is smaller than a predetermined threshold $\alpha_{TH}$ because the target hydraulic brake force $P_{TAR}$ is determined in accordance with the operation force F as explained above. In addition, it is set as another condition for the switch that the input pressure $P_I$ is higher than a pressure which is lower than the high-pressure-source pressure $P_H$ by $\alpha c$ (almost equal to $\alpha_H$), in order to conduct the switch at the same degree of the output pressure $P_O$ at which the switch from the high-pressure-source-pressure dependent pressurizing state to the operation-force/high-pressure-source-pressure dependent pressurizing state is conducted. When these conditions are kept for a predetermined time t (e.g., 30 milliseconds), the switch from the operation-force/high-pressure-source-pressure dependent pressurizing state to the high-pressure-source-pressure dependent pressurizing state is conducted.

Figure 5:
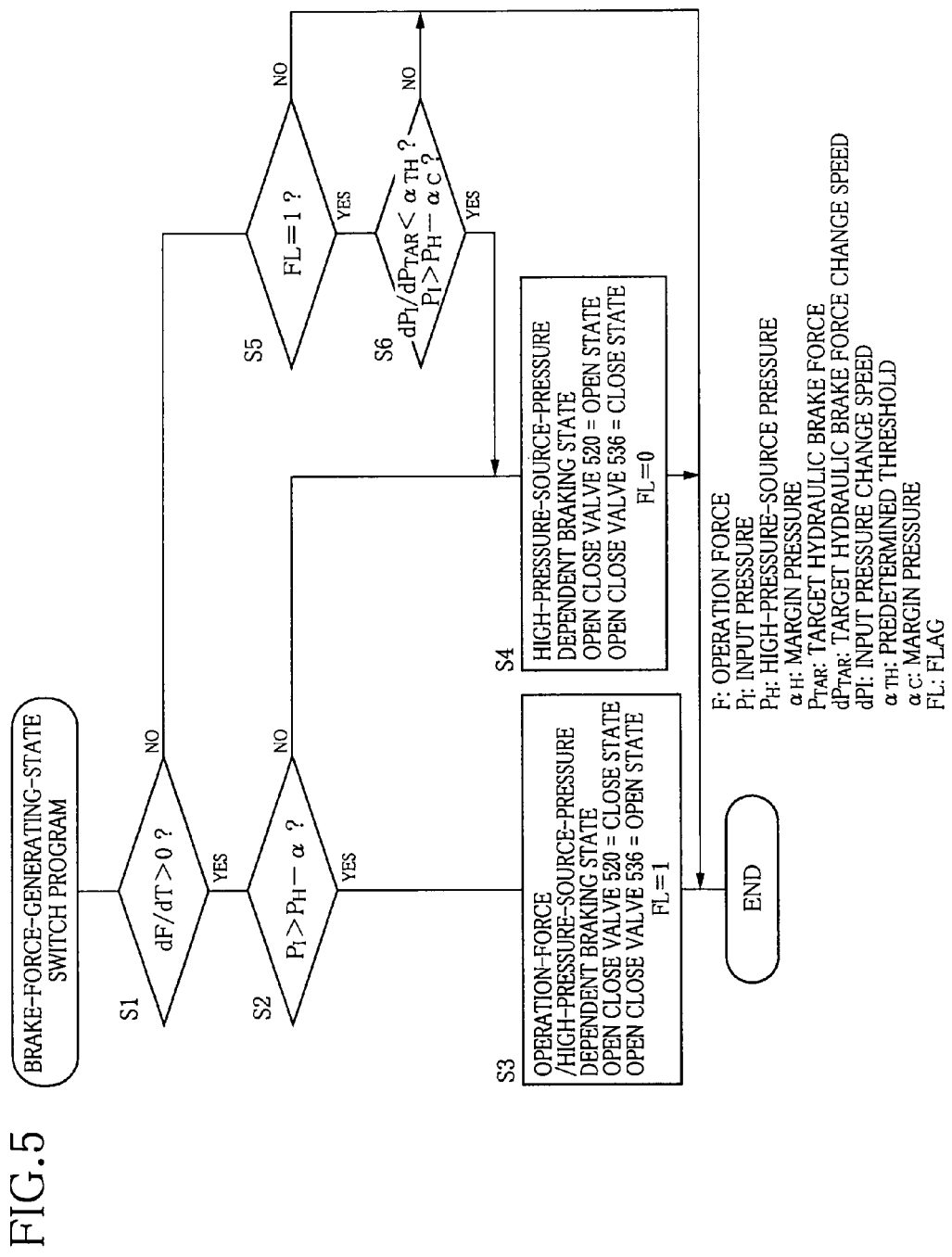
FIG. 5 is a flow chart of a control program which is executed in the hydraulic brake system according to the first embodiment and which is for a switch of a high-pressure-source-pressure dependent state and an operation-force/high-pressure-source-pressure dependent state.

The brake ECU 48 repeatedly executes a brake-force-generating-state switch program indicated by a flow chart of FIG. 5 at relatively short time intervals (e.g., time intervals ranging from several milliseconds to several tens of milliseconds). The switch of the brake-force-generating state is conducted on the basis of processing in accordance with the program. In the processing in accordance with the program, in step S1 ("step" is omitted where appropriate), it is judged, on the basis of a change speed dF/dT of the operation force F, whether the brake pedal 150 is operated so as to increase the operation force F or not, that is, whether the brake pedal 150 is being pressed or not. Where the brake pedal 150 is being pressed, it is judged in S2 whether the above condition for the switch from the high-pressure-source-pressure dependent braking state to the operation-force/high-pressure-source-pressure dependent braking state is satisfied or not. Where the above condition is satisfied, in S3, the first-input-chamber open/close valve 520 is put in the close state and the opposing-chamber open/close valve 536 is put in the open state so as to switch to the operation-force/high-pressure-source-pressure dependent braking state or keep the state. In addition, in S3, a flag FL for judging the brake-force-generating state is set to 1 which means the operation-force/high-pressure-source-pressure dependent braking state. On the other hand, where the above condition is not satisfied, in S4, the first-input-chamber open/close valve 520 is put in the open state and the opposing-chamber open/close valve 536 is put in the close state so as to keep the high-pressure-source-pressure dependent braking state, and the flag FL mentioned above is set to 0 which means the high-pressure-source-pressure dependent braking state.

Where it is judged in S1 that the brake pedal 150 is not being pressed the current brake-force-generating state is judged in S5. Where the brake-force-generating state is the high-pressure-source-pressure dependent braking state, that state is kept. Where the current brake-force-generating state is the operation-force/high-pressure-source-pressure dependent braking state, it is judged, in S6, whether the conditions for switching from this state to the high-pressure-source-pressure dependent braking state are satisfied. Where the conditions are satisfied, in S4, the first-input-chamber open/close valve 520 is put in the open state and the opposing-chamber open/close valve 536 is put in the close state to switch to the high-pressure-source-pressure dependent braking state, and the flag FL is set to 0. Where the conditions are not satisfied, the current state is kept.

<<Features of Hydraulic Brake System>>

The hydraulic brake system 100 switches an actuation state of the cylinder device from the high-pressure-source-pressure dependent pressurizing state to the operation-force/high-pressure-source-pressure dependent pressurizing state when the input pressure $P_I$ in the high-pressure-source-pressure dependent pressurizing state, namely, the controlled high-pressure-source pressure $P_C$ is approximately close to the value of the high-pressure-source pressure $P_H$ which is generated in the generation of the high-pressure-source dependent maximum brake force. Therefore, it is possible to effectively switch the actuation state of the cylinder device at around a limit of the controlled high-pressure-source pressure $P_C$ at a moment.

In the cylinder device 110 of the hydraulic brake system 100, though it is difficult to understand from FIG. 2, an area of the intermediate piston 406 which defines the first input chamber R3 and to which a pressure of the brake fluid in the first input chamber R3 is applied is larger than an area of the first pressurizing piston 402 which defines the first input chamber R3 and to which a pressure of the brake fluid in the first input chamber R3 is applied. In other words, an area of the front end of the intermediate piston 406 is larger than an area of a rear end of the first pressurizing piston 402. Therefore, in the operation of the brake pedal 150 in the operation-force/high-pressure-source-pressure dependent pressurizing state, the distance of the forward movement of the first pressurizing piston 402 is larger than that of the intermediate piston 406. As a result, the change of the output pressure $P_O$ with respect to the change of the operation amount of the brake pedal 150 in the operation-force/high-pressure-source-pressure dependent pressurizing state is comparatively large, thereby ensuring larger pedal stroke.

By the way, because the cylinder device 110 is configured such that the input piston 408 is fitted into the intermediate piston 406, the number of high pressure seals which slidably contact with the input piston 408 is decreased. To be more specific, two seals described in FIG. 2 are only the high pressure seals which slidably contact with the input piston 408. Therefore, in the high-pressure-source-pressure dependent pressurizing state, a friction resistance against the movement of the input piston 408 is relatively small, which reduces an influence that the friction resistance gives to operational feeling of the brake pedal 150, that is, an influence that is given to operational feeling in the brake operation.

In addition, in the cylinder device 110, when the brake pedal 150 is not operated, the volume of the first input chamber R3 is so small that the first pressurizing piston 402 and the intermediate piston 406 are about to touch to each other. Therefore, in the electrical failure condition, as soon as the brake pedal 150 is operated, the brake fluid in the first pressurizing chamber R1 and the second pressurizing chamber R2 is pressurized by the operation force applied to the brake pedal 150. Accordingly, an operation range of the brake pedal 150, namely, an operation stroke is sufficiently secured in the electrical failure condition.

In the cylinder device 110, the above mechanism is employed as a mechanism which realizes the internal chamber not-communication state. In other words, the cylinder device 110 is configured such that the two seals 542F, 542R are embedded on the intermediate piston 406, the piston-side port P1 is provided between these seals, and the communication between the piston-side port P1 and the housing-side port P2 is shut off on the basis of the movement of the intermediate piston 406. According to such a configuration, wherever the intermediate piston 406 is located in a range of its forward movement, the internal chamber R6 is hermetically closed by a small chamber which is defined by the inner face of the first housing member 410 and the two seals 542F, 542R. Consequently, the size of the cylinder device 110 in the movement direction of the intermediate piston 406 is decreased, whereby the cylinder device 110 is made compact in size.

Furthermore, in the cylinder device 110, the first reaction force spring 480 and the second reaction force spring 482 are disposed in the internal chamber R6 which is defined by the input piston 408 and the intermediate piston 406. Therefore, the stroke simulator is incorporated in the internal chamber R6, that is, a dead space in the cylinder device 110, thereby realizing a compact cylinder device.

First Modified Embodiment

Figure 6:
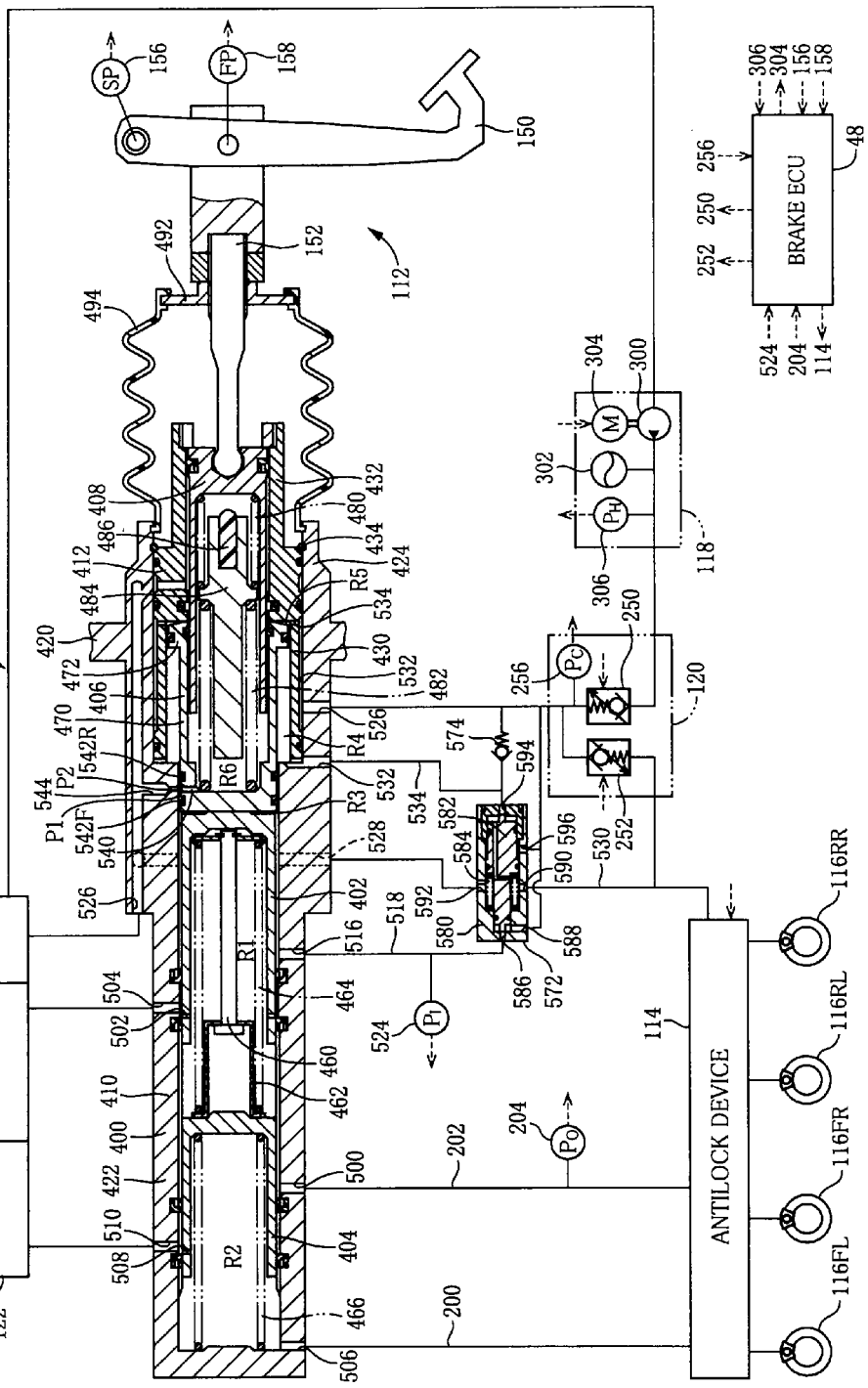
FIG. 6 is a view of a hydraulic brake system according to a first modified embodiment of the first embodiment.

A hydraulic brake system 560 illustrated in FIG. 6 employs a cylinder device 570 instead of the cylinder device 110 of the hydraulic brake system 100 of the first embodiment. The cylinder device 570 has roughly the same configuration as the cylinder device 110 of the first embodiment. In the following explanation regarding the modified embodiment, constructions and actuations different from those of the first embodiment are described.

In the cylinder device 570, a mechanical valve device 572 is employed instead of the first-input-chamber open/close valve 520 and the opposing-chamber open/close valve 536 in the cylinder device 110 of the first embodiment. This valve device 572 can be considered as a valve device into which the first-input-chamber open/close valve 520 that opens and closes the external communication passage 518 and the opposing-chamber open/close valve 536 that opens and closes the external communication passage 534 are integrated. Additionally, the valve device 572 also constitutes a part of the external communication passage 530 extending from the antilock device 114 to the reservoir 122. Besides, a relief valve 574 is provided on an external communication passage which branches from the external communication passage 534 and which is connected to the pressure-intensifying/reducing device 120.

The valve device 572 includes a housing 580 shaped like a tube whose inside is hollow, a piston 582 which is contained inside the housing 580 and which is shaped like a column, and a bias spring 584 which biases the piston 582 rearward. The housing 580 is constituted by three portions having mutually different inner diameters, that is, a front portion having a small inner diameter, a center portion having a large inner diameter, and a rear portion having an inner diameter slightly smaller than that of the center portion. The piston 582 is constituted by three portions having mutually different outer diameters and each portion is shaped so as to slidably contact with the corresponding inner face of the housing 580. That is, the piston 582 is shaped such that an outer diameter of a front portion is small, an outer diameter of a center portion is large, and an outer diameter of a rear portion is slightly smaller than that of the center portion, and these portions slidably contact with inner faces of the front portion, the center portion, and the rear portion of the housing 580, respectively. In a state that the thus shaped piston 582 is contained in the housing 580, a fluid chamber is formed between the inner face of the center portion of the housing 580 and the outer face of the front portion of the piston 582, and the bias spring 584 is contained in the fluid chamber. A front end portion of the bias spring 584 abuts on a stepping face formed between the front portion and the center portion of the housing 580, and a rear end portion of the bias spring 584 abuts on a stepping face formed between the front portion and the rear portion of the piston 582. Accordingly, the bias spring 584 biases the piston 582 rearward. Each of a front end portion and a rear end portion of the piston 582 has a projection. Each of these projections functions as a valve element to close a communication hole which, described below, functions as a valve seat. Additionally, inside the piston 582, there is provided a communication passage whereby the front end portion and the center portion of the piston 582 communicate with each other.

In the front end portion of the housing 580, a fluid chamber is defined by the front end portion of the piston 582 and the inner face of the housing 580. The fluid chamber can communicate with exteriors through a communication hole 586 and a communication hole 588 which are provided on the housing 580 and whose openings are connection ports, respectively. Each of these connection ports is connected to the external communication passage 518. That is, the external communication passage 518 includes these communication holes and the fluid chamber.

In the center portion of the housing 580, there is defined a fluid chamber in which the bias spring 584 is disposed. The fluid chamber can communicate with exteriors through a communication hole 590 and a communication hole 592 which are provided on the housing 580 and whose openings are drain ports, respectively. Each of these drain ports is connected to the external communication passage 530. That is, the external communication passage 530 includes these communication holes and the above fluid chamber. Therefore, the fluid chamber is always kept at the atmospheric pressure.

In a rear end portion of the housing 580, there is defined a fluid chamber by the rear end portion of the piston 582 and the housing 580. The fluid chamber can communicate with exteriors through a communication hole 594 which is provided on the housing 580 and whose opening is a connection port. To this connection port, the external communication passage 534 is connected. Additionally, to the fluid chamber, the external communication passage 530 is connected via the communication passage inside the piston 582 and the above fluid chamber defined in the center portion. In this way, the external communication passage 534 includes those communication holes and the communication passage, and is connected to the external communication passage 530 via the valve device 572.

In addition, between the rear portion of the piston 582 and the center portion of the housing 580, there is defined a fluid chamber having a certain cross section area because the outer diameter of the rear portion and the inner diameter of the center portion are slightly different from each other. The fluid chamber can communicate with exteriors through a communication hole 596 whose opening is a connection port. To this connection port, a communication passage which branches from the external communication passage 518 is connected. Therefore, the controlled high-pressure-source pressure is always introduced to the fluid chamber. In the thus constructed hydraulic brake system 560, an actuation of the cylinder device 570 in the electrical failure condition will be explained. In the failure condition, the piston 582 of the valve device 572 is positioned rearward by a reaction force of the bias spring 584. Where the piston 582 is in this position, the communication hole 586 is not closed by the projection formed on the front end portion of the piston 582 and the communication hole 594 is closed by the projection formed on the rear end portion of the piston 582. That is, the external communication passage 518 is opened, whereby the first input chamber R3 communicates with the reservoir 122. Additionally, the external communication passage 534 is closed, thereby shutting off the communication between the opposing chamber R4 and the reservoir 122.

When the brake pedal 150 is not operated, the relief valve 574 is closed. That is, the opposing-chamber not-communication state is realized and the opposing chamber R4 is hermetically closed. When the driver starts the operation of the brake pedal 150, the input piston 408 starts moving forward, and spring reaction forces of the first reaction force spring 480 and the second reaction force spring 482 increase. By the spring reaction forces, a force is applied to the intermediate piston 406 so as to move it forward, whereby the brake fluid in the opposing chamber R4 is pressurized by the flange portion 472 of the intermediate piston 406. When the pressure of the brake fluid in the pressurized opposing chamber R4 reaches a valve-opening pressure of the relief valve 574, the relief valve 574 opens, and then, the intermediate piston 406 moves forward while the brake fluid in the opposing chamber R4 outflows to the reservoir 122. The thus constructed cylinder device 570 has a mechanism including the relief valve 574, namely, a first communication-state switching mechanism which selectively realizes the opposing-chamber communication state in which the opposing chamber R4 and the reservoir 122 communicate with each other and the opposing-chamber not-communication state in which they do not communicate with each other. That is, the first communication-state switching mechanism may be considered as a pressure dependent communication mechanism which realizes the opposing-chamber communication state on the basis of a predetermined pressure of the relief valve 574.

The above valve-opening pressure of the relief valve 574 is set at a pressure of the opposing chamber R4 at a moment when the operation amount of the brake pedal 150 is at a predetermined amount while the input pressure of the first input chamber R3 is the atmospheric pressure. The predetermined amount is predetermined at a value beyond the hydraulic-brake-beginning amount at the maximum regenerative brake in FIG. 3. Therefore, in the cylinder device 570, when the brake pedal 150 is operated beyond the predetermined amount in the failure condition, the relief valve 574 opens, whereby the operation-force dependent pressurizing state is realized.

Provided that the opposing-chamber communication state is realized only by opening of the relief valve 574, in order to move the intermediate piston 406 forward by the operation force, it is necessary to conduct the operation against a operation reaction force whose magnitude is in accordance with a degree of a pressure that remains in the opposing chamber R4 and that is corresponding to the valve-opening pressure of the relief valve 574. This causes, in the electrical failure condition, such a loss that the operation force is used for something other than the pressurization by the first pressurizing piston 402 and the second pressurizing piston 404. In the light of this, the cylinder device 570 is equipped with a mechanism, namely, a volume dependent communication mechanism which realizes the opposing-chamber communication state when the intermediate piston 406 moves forward a predetermined distance, that is, a volume of the opposing chamber R4 reaches a predetermined volume.

A detailed explanation about the above volume dependent communication mechanism is as follows. When the seal 542R passes over the housing-side port P2 by the forward movement of the intermediate piston 406, a communication between the piston-side port P1 and the housing-side port P2 is terminated, whereby the internal chamber not-communication state is realized, and at the same time, the opposing chamber R4 communicates with the communication passage 544 having the housing-side port P2, namely, the second communication passage via a clearance formed between the intermediate piston 406 and the first housing member 410. In other words, when the intermediate piston 406 moves forward by the predetermined distance which is predetermined based on a position of the housing-side port P2 and a position of the seal 542R, whereby the volume of the opposing chamber R4 becomes smaller than the predetermined volume in accordance with the distance, the opposing chamber R4 communicates with the reservoir 122. In the opposing-chamber communication state which is realized by the thus constructed volume dependent communication mechanism, the pressure in the opposing chamber R4 is equal to the atmospheric pressure, whereby a reaction force in accordance with the pressure of the brake fluid in the opposing chamber R4 does not generate. Therefore, the operation force in a following operation is utilized with a little loss for the pressurizations by the first pressurizing piston 402 and the second pressurizing piston 404.

In the normal condition, when the operation amount of the brake pedal 150 is not beyond the above hydraulic-brake-beginning amount at the maximum regenerative brake, the pressure from the high-pressure-source device 118 is inputted into the first input chamber R3. That is, the pressure from the high-pressure-source device 118 is inputted into the first input chamber R3 because the valve device 572 is opened in the external communication passage 518 owing to the piston 582 positioning at the rearward side. When the pressure is inputted, the first pressurizing piston 402 moves forward not depending on the operation force applied to the brake pedal 150 and the operation amount, thereby pressurizing the brake fluid in the first pressurizing chamber R1. That is, there is realized a high-pressure-source-pressure dependent braking state in which the brake fluid in the first pressurizing chamber R1 and the second pressurizing chamber R2 is pressurized depending on the pressure from the high pressure source without depending on the forward movement of the input piston 408.

In the large-brake-force required case, when the operation amount increases and the controlled high-pressure-source pressure becomes close to the high-pressure-source pressure, thereby realizing a communication between a chamber in the valve device 572 whose pressure is the controlled high-pressure-source pressure and the external communication passage 518 through the communication hole 596. Therefore, the pressure of the chamber becomes high. The valve device 572 is configured to be actuated by the controlled high-pressure-source pressure as a pilot pressure. That is, when the controlled high-pressure-source pressure is relatively high, the piston 582 is moved forward against the reaction force of the bias spring 584. Therefore, the communication hole 586 is closed by the projection of the front end portion of the piston 582, thereby closing the communication hole 586 and shutting off the external communication passage 518. That is, the first input chamber R3 is hermetically closed. Additionally, because the communication hole 594 is not closed by the projection of the rear end portion of the piston 582, the external communication passage 534 is opened. Therefore, the opposing chamber R4 and the reservoir 122 communicate with each other without depending on the relief valve 574, whereby the forward movement of the intermediate piston 406 is allowed. Accordingly, it becomes possible to move the intermediate piston 406 forward by the operation force of the driver in addition to a force depending on the controlled high-pressure-source pressure inputted into the second input chamber R5. The forward movement of the intermediate piston 406 pressurizes the brake fluid in the first pressurizing chamber R1 and the second pressurizing chamber R2 via the brake fluid in the first input chamber R3 which is hermetically closed. That is, in large-brake-force required case, it is possible to move the intermediate piston 406 forward by both of the operation force of the driver and the pressure from the high-pressure-source device 118, and the operation-force/high-pressure-source-pressure dependent braking state is realized in which it is possible to obtain the brake force larger than the maximum brake force in high-pressure-source-pressure dependent braking state. Therefore, the thus constructed cylinder device 570 is equipped with a mechanism including the valve device 572, namely, a cylinder-device-actuation switching mechanism which selectively realizes the high-pressure-source-pressure dependent braking state and the operation-force/high-pressure-source-pressure dependent braking state.

Second Modified Embodiment

Figure 7:
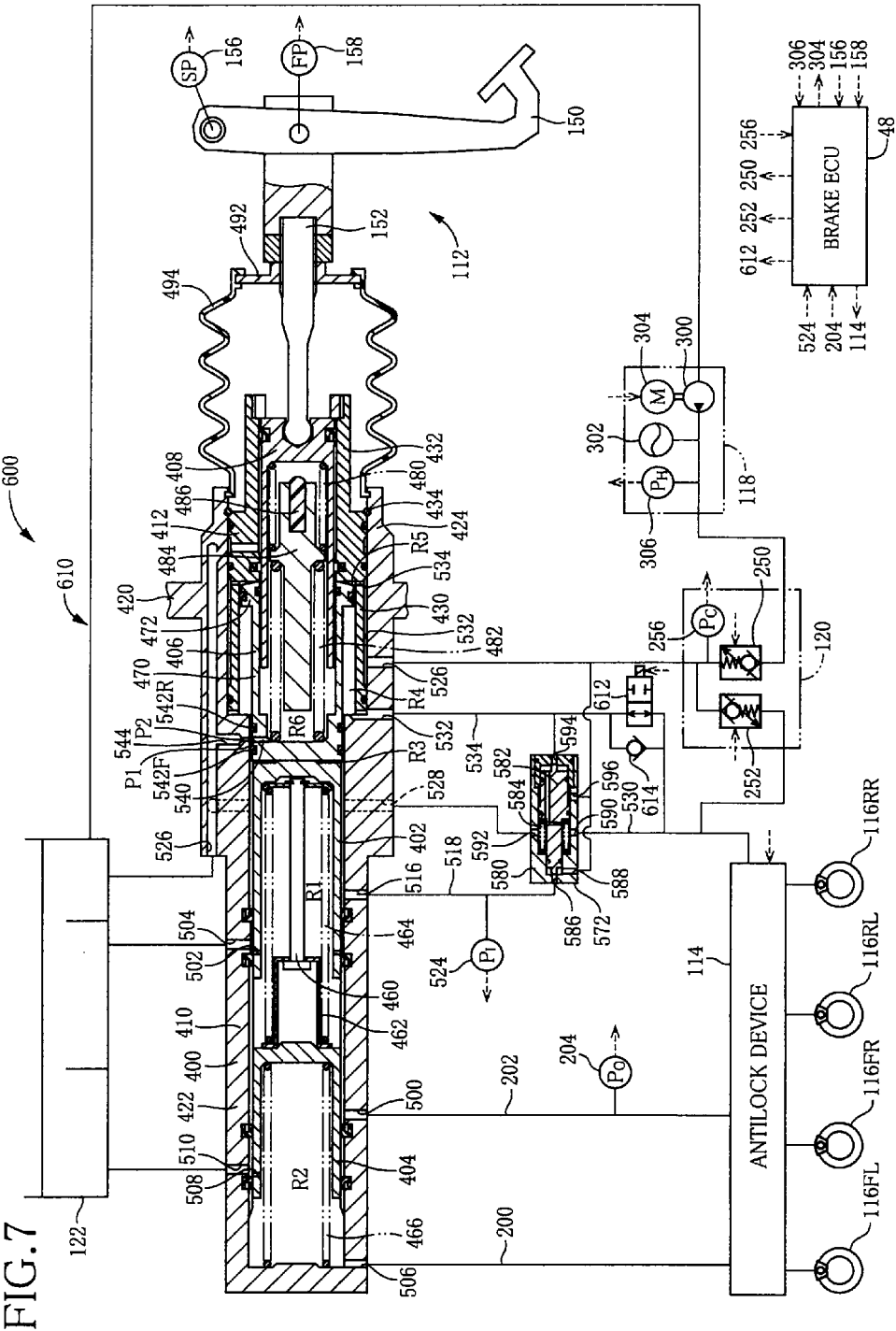
FIG. 7 is a view of a hydraulic brake system according to a second modified embodiment of the first embodiment.

A hydraulic brake system 600 illustrated in FIG. 7 employs a cylinder device 610 instead of the cylinder device 570 of the hydraulic brake system 560 of the first modified embodiment. The cylinder device 610 has roughly the same configuration as the cylinder device 570 of the first modified embodiment. In the following description about the modified embodiment, configurations and actuations different from those of the first modified embodiment will be described.

In the cylinder device 610, an electromagnetic open/close valve 612 and a check valve 614 are employed instead of the relief valve 574 of the cylinder device 570 of the first modified embodiment. Additionally, a fluid passage which branches from the external communication passage 534 equipped with these valves 612, 614 is connected to the external communication passage 530. The thus constructed cylinder device 610 is equipped with a mechanism including the open/close valve 612, namely, a first communication-state switching mechanism which selectively realizes the opposing-chamber communication state in which the opposing chamber R4 and the reservoir 122 communicate with each other and the opposing-chamber not-communication state in which they do not communicate with each other.

It will be explained an actuation of the cylinder device 610 in a state in which the hydraulic brake system 600 is in the electrical failure condition. In the electrical failure condition, the open/close valve 612 is not energized so as to be in an open state. Therefore, there is realized, by the first communication-state switching mechanism, the opposing-chamber communication state in which the opposing chamber R4 and the reservoir 122 communicate with each other. In this state, the cylinder device 610 will be actuated in a manner similar to that of the actuation of the cylinder device 110 of the first embodiment. That is, in accordance with the pressing operation of the brake pedal 150, the second communication-state switching mechanism is switched from in the internal chamber communication state to in the internal chamber not-communication state, whereby the input piston 408 and the intermediate piston 406 are united. Therefore, in the hydraulic brake system 600, the operation-force dependent pressurizing state is realized in which the brake fluid in the first pressurizing chamber R1 and the second pressurizing chamber R2 is pressurized by the operation force which is applied to the brake pedal 150.

In the normal condition, the open/close valve 612 is energized so as to be in an close state. That is, there is realized, by the first communication-state switching mechanism, the opposing-chamber not-communication state in which the opposing chamber R4 and the reservoir 122 do not communicate with each other. In this state, the cylinder device 610 will be actuated in a manner similar to that of the actuation of the cylinder device 570 of the first modified embodiment. That is, the pressure from the high-pressure-source device 118 is inputted into the first input chamber R3 before the operation amount of the brake pedal 150 exceeds the above hydraulic-brake-beginning amount at the maximum regenerative brake. That is, the high-pressure-source-pressure dependent braking state is realized in which the brake fluid in the first pressurizing chamber R1 and the second pressurizing chamber R2 is pressurized depending on the pressure from the high-pressure-source device 118, irrespective of the forward movement of the input piston 408.

In the large-brake-force required case, the piston 582 is moved forward in the valve device 572. Therefore, it becomes possible to move the intermediate piston 406 forward by the operation force of the driver in addition to a force depending on the controlled high-pressure-source pressure inputted into the second input chamber R5. Accordingly, the operation-force/high-pressure-source-pressure dependent braking state is realized in which it is possible to obtain the brake force with a magnitude larger than that of the maximum brake force in high-pressure-source-pressure dependent braking state. Accordingly, the thus constructed cylinder device 610 is equipped with a mechanism including the valve device 572 and the open/close valve 612, namely, a cylinder-device-actuation switching mechanism which selectively realizes the high-pressure-source-pressure dependent braking state and the operation-force/high-pressure-source-pressure dependent braking state.

Third Modified Embodiment

Figure 8:
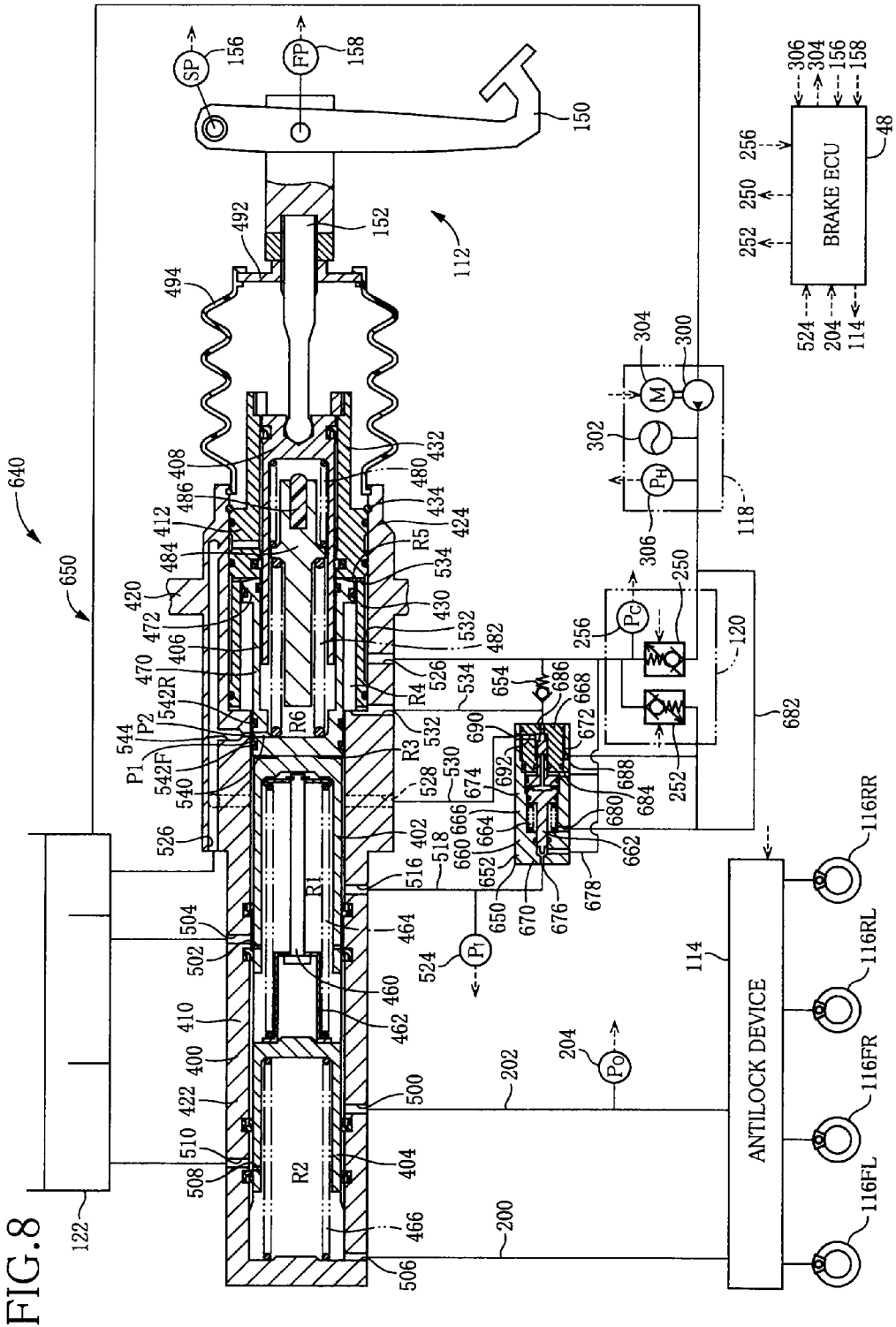
FIG. 8 is a view of a hydraulic brake system according to a third modified embodiment of the first embodiment.

A hydraulic brake system 640 illustrated in FIG. 8 employs a cylinder device 650 instead of the cylinder device 570 of the hydraulic brake system 560 of the first modified embodiment. The cylinder device 650 has roughly the same construction as the cylinder device 570 of the first modified embodiment. In the following description about the modified embodiment, constructions and actuations different from those of the first modified embodiment will be described. In the cylinder device 640, a pressure-difference type valve device 652 is employed instead of the valve device 572 employed in the system 560 of the first modified embodiment. This valve device 652 is considered, like the valve device 572, as a valve device into which two open/close valves, that is, the first-input-chamber open/close valve 520 that opens and closes the external communication passage 518 and the opposing-chamber open/close valve 536 that opens and closes the external communication passage 534, are integrated. Additionally, a relief valve 654 is provided on the external communication passage which branches from the external communication passage 534 and which is connected to the pressure-intensifying/reducing device 120.

The valve device 652 includes a housing 660 shaped like a tube whose inside is hollow, a piston 662 shaped like a column and contained inside the housing 660, and a bias spring 664 which pushes the piston 662 to move rearward. The housing 660 is mainly constituted by two portions, namely, a first housing member 666 and a second housing member 668.

The first housing member 666 has a shape like a tube whose front end portion is closed. The first housing member 666 is sectioned in three portions having mutually different inner diameters, namely, a front small-diameter portion 670 located in a front side and having the smallest inner diameter, a rear large-diameter portion 672 located in a rear side and having the largest inner diameter, and a center portion 674 located between the front small-diameter portion 670 and the rear large-diameter portion 672 and having an inner diameter of the middle of their inner diameters. The second housing member 668 has a shape like a tube whose front end portion is opened and a rear end portion is closed. The second housing member 668 is fitted into the rear large-diameter portion 672 with a front end face of the second housing member 668 abutting a stepping face formed between the center portion 674 and the rear large-diameter portion 672.

The piston 662 is constituted by three portions which have mutually different outer diameters and each of which is formed so as to slidably contact with an inner face of the housing 660. More specifically, the piston 662 is formed such that an outer diameter of a front portion is small, an outer diameter of a center portion is large, and an outer diameter of a rear portion is small. Accordingly, the front portion slidably contacts with an inner face of the front small-diameter portion 670 of the first housing member 666, the center portion slidably contacts with an inner face of the center portion 674 of the first housing member 666, and the rear portion slidably contacts with an inner face of the second housing member 668. In a state in which the thus shaped piston 662 is contained in the housing 660, a chamber is formed between the inner face of the center portion 674 of the first housing member 666 and the outer face of the front portion of the piston 662, and the bias spring 664 is contained in the chamber. A front end portion of the bias spring 664 is abutted on the stepping face formed between the front portion and the center portion of the first housing member 666, and a rear end portion of the bias spring 664 is abutted on the stepping face formed between the front portion and the center portion of the piston 662. As a result, the piston 662 is biased rearward. Incidentally, each of a front end portion and a rear end portion of the piston 662 has a projection. Each of these projections functions as a valve element to close a communication hole which, described below, functions as a valve seat. Additionally, inside the piston 662, there is provided a communication passage whereby the center portion of the piston 662 communicates with the rear portion thereof.

In a front end portion of the housing 660, a fluid chamber is defined by the front end portion of the piston 662 and an inner face of the first housing member 666. The fluid chamber can communicate with exteriors through a communication hole 676 and a communication hole 678 which are provided on the first housing member 666 and whose openings are connection ports, respectively. To each of those communication holes, the external communication passage 518 is connected. That is, the external communication passage 518 includes those communication holes and the fluid chamber.

In a center portion of the housing 660, there is defined a fluid chamber in which the bias spring 664 is disposed. The fluid chamber can communicate with exteriors through a communication hole 680 which is provided on the first housing member 666 and whose opening is a connection port. To this connection port, one end of an external communication passage 682 is connected and the other end thereof is connected to the external high-pressure-source device 118. Therefore, the fluid chamber is always kept at the high-pressure-source pressure.

A fluid chamber which is defined by a stepping face formed between the center portion and the rear portion of the piston 662 and a front end face of the second housing member 668 can communicate with exteriors through a communication hole 684 whose opening is a connection port. This connection port is connected to a communication passage which branches from the external communication passage 518. Therefore, the fluid chamber is always kept at the controlled high-pressure-source pressure.

In a rear end portion of the housing 660, there is defined a fluid chamber by the rear end portion of the piston 662 and the housing 660. The fluid chamber can communicate with exteriors through a communication hole 686 which is provided on the first housing member 666 and whose opening is a connection port. To this connection port, the external communication passage 534 is connected.

In addition, between an inner face of the rear large-diameter portion 672 of the first housing member 666 and an outer face of the second housing member 668, there is defined a fluid chamber which has a certain cross section area because an inner diameter of the rear large-diameter portion 672 and an outer diameter of the second housing member 668 is slightly different. The fluid chamber can communicate with exteriors through a communication hole 688 and a communication hole 690 whose openings are drain ports, respectively. To each of the drain ports, the external communication passage 530 is connected. That is, the external communication passage 530 includes those communication holes and the fluid chamber. Therefore, the fluid chamber is always kept at the atmospheric pressure. Additionally, there is provided a communication hole 692 which allows the external communication passage 530 and the external communication passage 534 to communicate with each other.

In the electrical failure condition, the piston 662 is positioned rearward by a reaction force of the bias spring 664. Where the piston 662 is in this position, the communication hole 676 is not closed by the projection formed on the front end portion of the piston 662 and the communication hole 686 is closed by the projection formed on the rear end portion of the piston 662. That is, the external communication passage 518 is opened, whereby the first input chamber R3 is communicated with the reservoir 122, and the external communication passage 534 is closed, whereby the communication between the opposing chamber R4 and the reservoir 122 is shut off.

In the electrical failure condition, the cylinder device 650 will be actuated in a manner similar to that of the actuation of the cylinder device 570 of the first modified embodiment. That is, in accordance with the pressing operation of the brake pedal 150, the relief valve 654 is opened by the pressure of the brake fluid in the opposing chamber R4, that is, the communication state between the opposing chamber R4 and the reservoir 122 is switched from the opposing-chamber not-communication state to the opposing-chamber communication state. Additionally, when the seal 542R passes over the housing-side port P2, the internal chamber not-communication state is realized, and at the same time, the opposing-chamber communication state is realized by the volume dependent communication mechanism. Therefore, in the hydraulic brake system 640, the input piston 408 and the intermediate piston 406 are united and the operation-force dependent pressurizing state is realized in which the brake fluid in the first pressurizing chamber R1 and the second pressurizing chamber R2 is pressurized by the operation force which is applied to the brake pedal 150.

In the normal condition too, the cylinder device 650 will be actuated in a manner which is similar to that of the actuation of the cylinder device 570. That is, the pressure from the high-pressure-source device 118 is inputted into the first input chamber R3 before the operation amount of the brake pedal 150 exceeds the above described hydraulic-brake-beginning amount at the maximum regenerative brake. The first pressurizing piston 402 is moved forward depending on not the operation force applied to the brake pedal 150 and the operation amount but that pressure to pressurize the brake fluid in the pressurizing chamber R1. That is, there is realized a high-pressure-source-pressure dependent braking state in which the brake fluid in the first pressurizing chamber R1 and the second pressurizing chamber R2 is pressurized depending on the pressure from the high pressure source without depending on the forward movement of the input piston 408.

In the large-brake-force required case, the higher the controlled high-pressure-source pressure is in accordance with an increase of the operation amount, the smaller the pressure difference between the controlled high-pressure-source pressure and the high-pressure-source pressure becomes. Regarding the piston 662, the high-pressure-source pressure is applied to a front face of the center portion thereof and the controlled high-pressure-source pressure is applied to a rear face of the center portion and the front end portion thereof. Both of the high-pressure-source pressure and the controlled high-pressure-source pressure are introduced to the valve device 652 as pilot pressures. The valve device 652 is configured to be actuated by a difference between these pilot pressures. Therefore, the piston 662 is moved rearward where the pressure difference is small, while the piston 662 is moved forward where the pressure difference is large. Therefore, the opposing chamber R4 communicates with the reservoir 122 not depending on the relief valve 654, thereby allowing the forward movement of the intermediate piston 406. As a result, it becomes possible to move the intermediate piston 406 forward by the operation force of the driver in addition to the force depending on the controlled high-pressure-source pressure inputted into the second input pressure R5. That is, in the large-brake-force required case, there is realized the operation-force/high-pressure-source-pressure dependent braking state in which it is possible to move the intermediate piston 406 forward depending on both of the operation force of the driver and the pressure from the high-pressure-source device 118. Accordingly, the thus constructed cylinder device 650 is equipped with a mechanism including the valve device 652, namely, a cylinder-device-actuation switching mechanism which selectively realizes the high-pressure-source-pressure dependent braking state and the operation-force/high-pressure-source-pressure dependent braking state.

The valve device 652 of the hydraulic brake system 640 selectively realizes the high-pressure-source-pressure dependent braking state and the operation-force/high-pressure-source-pressure dependent braking state depending on a relative pressure between the high-pressure-source pressure and the controlled high-pressure-source pressure without depending on an absolute pressure of the controlled high-pressure-source pressure. Therefore, the hydraulic brake system 640 is configured to securely conduct the switch from the high-pressure-source-pressure dependent pressurizing state to the operation-force/high-pressure-source-pressure dependent pressurizing state when the controlled high-pressure-source pressure comes close to the maximum at a moment.

Other Modified Embodiment

In the hydraulic brake system 100 of the above first embodiment, when the difference between the input pressure $P_I$, that is, the controlled high-pressure-source pressure $P_C$ and the high-pressure-source pressure $P_H$ becomes the predetermined difference, the switch from the high-pressure-source-pressure dependent pressurizing state to the operation-force/high-pressure-source-pressure dependent pressurizing state is conducted. Instead of the above condition for the switch of the pressurizing state, the switch may be conducted when the controlled high-pressure-source pressure $P_C$ (input pressure $P_I$) or the output pressure $P_O$ exceeds a predetermined pressure. Moreover, the above switch may be conducted when the above operation limit has been realized in the above described input-piston-forward-movement permitting mechanism, namely, the stroke simulator. If this condition for switching the pressurizing state is employed, the switch may be conducted, when the operation force detected by the operation force sensor varies in a certain degree even though the operation amount of the brake pedal 150 detected by the operation amount sensor 156 does not vary. The switch of the pressurizing state on the basis of this condition makes operational feeling in the brake operation more favorable. Furthermore, in the hydraulic brake systems 560, 600, 640 of the modified embodiments, it can be employed a valve device which conducts the above switch on the basis of the output pressure $P_O$ which is introduced as the pilot pressure.

2. Second Embodiment

Figure 9:
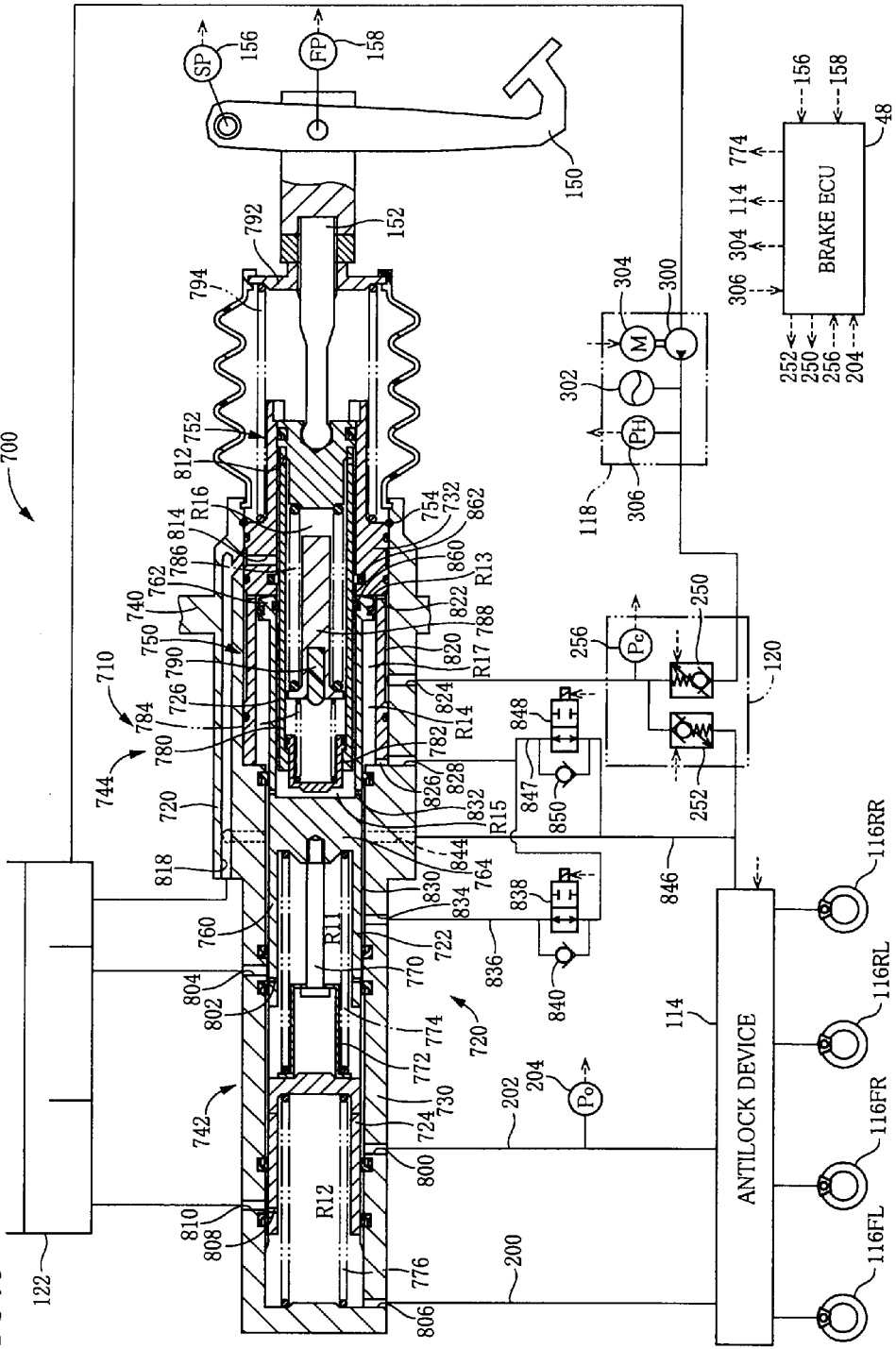
FIG. 9 is a view of a hydraulic brake system according to a second embodiment.

FIG. 9 shows a hydraulic brake system 700 of a second embodiment. The hydraulic brake system 700 employs a cylinder device 710 instead of the cylinder device 110 employed in the hydraulic brake system 100 of the first embodiment. As for the hydraulic brake system 700, constructions and actuations different from those of the first embodiment are explained below.

<<Construction of Cylinder Device>>

The cylinder device 710 includes a housing 720 which is a casing of the cylinder device 710, a first pressurizing piston 722 and a second pressurizing piston 724 which pressurize the brake fluid to be supplied to the brake devices 116, and an input piston 726 to which the operation of the driver is inputted through the operating device 112. Incidentally, FIG. 9 illustrates a state in which the cylinder device 710 is not under actuation, that is, the brake is not operated.

The housing 720 is constituted by mainly two members, concretely, a first housing member 730 and a second housing member 732. The first housing member 730 has, on the whole, a shape like a tube whose front end portion is closed and has a flange 740 formed on a circumference of a rear end portion thereof. The first housing member 730 is mounted on the body of the vehicle at the flange 740. The first housing member 730 is sectioned into two portions having mutually different inner diameters, concretely, a front small diameter portion 742 located in a front side and having a small inner diameter, and a rear large diameter portion 744 located in a rear side and having a large inner diameter.

The second housing member 732 has a shape like a tube that has a front large diameter portion 750 located in a front side and having a large inner diameter, and a rear small diameter portion 752 located in a rear side and having a small inner diameter. The second housing member 732 is fitted into the rear large diameter portion 744 of the first housing member 730 with a front end portion of the front large diameter portion 750 contacting with a stepping face formed between the front small diameter portion 742 and the rear large diameter portion 744. The first housing member 730 and the second housing member 732 are fastened with each other by a lock ring 754 which is embedded on an inner face of the rear end portion of the first housing portion 730.

The second pressurizing piston 724 has a shape like a tube whose rear end portion is closed and is slidably fitted into the front small diameter portion 742 of the first housing member 730. The first pressurizing piston 722 is formed so as to have a body portion 760 shaped like a tube and have a flange portion 762 provided on a rear end portion of the body portion 760. The first pressurizing piston 722 is disposed behind the second pressurizing piston 724. A front portion of the body portion 760 is slidably fitted into a rear portion of an inner face of the front small diameter portion 742 of the first housing member 730 and the flange portion 762 is slidably fitted into an inner face of the front large diameter portion 750 of the second housing member 732. An inside of the body portion 760 of the first pressurizing piston 722 is sectioned into two portions by a separation wall 764 which is provided in the middle of the body portion 760 in forward and rearward directions thereof. That is, the first pressurizing piston 722 is shaped so as to have two blind holes whose openings are on a front end and a rear end of the first pressurizing piston 722, respectively.

Between the first pressurizing piston 722 and the second pressurizing piston 724, there is defined a first pressurizing chamber R11 for pressurizing the brake fluid which is supplied to each of the brake devices 116RL, RR respectively provided for the two rear wheels, and in front of the second pressurizing piston 724, there is defined a second pressurizing chamber R12 for pressurizing the brake fluid which is supplied to each of the brake devices 116FL, FR respectively provided for the two front wheels. In addition, the distance that the first pressurizing piston 722 and the second pressurizing piston 724 are separated from each other is limited so as to fall within a predetermined range by a headed pin 770 screwed on the separation wall 764 of the first pressurizing piston 722 to extend forward and a pin-retaining tube 772 fixed on a rear end face of the second pressurizing piston 724. In the first pressurizing chamber R11 and the second pressurizing chamber R12, compression coil springs (hereinafter, referred to as a "return springs" where appropriate) 774, 776 are disposed, respectively. By the springs, the first pressurizing piston 722 and the second pressurizing piston 724 are biased in such a direction that the pistons 722, 724 separate away from each other and the second pressurizing piston 724 is biased in such a direction that it moves rearward.

Behind the first pressurizing piston 722, specifically, behind the flange portion 762 of the first pressurizing piston 722 and between the flange portion 762 and the second housing member 732, there is defined a fluid chamber R13 into which the brake fluid can be supplied from the high-pressure-source device 118, that is, the pressure can be inputted from the high-pressure-source device 118. Hereinafter, the fluid chamber R13 is referred to as a "input chamber R13" where appropriate. It is noted that the input chamber R13 is illustrated in an almost squeezed state in FIG. 9. There is also a space inside the housing 720 which is defined between an inner face of the second housing member 732 and an outer face of the body portion 760 of the first pressurizing piston 722. This space is defined by a front end face of the flange portion 762 of the first pressurizing piston 722 and by a stepping face formed between the front small diameter portion 742 and the rear large diameter portion of 744 of the first housing member 730, whereby there is formed a ring-shaped fluid chamber. This fluid chamber is an opposing chamber R14 which is opposed to the input chamber R13 with the flange portion 762 interposed therebetween.

The input piston 726 includes a body portion 780 shaped like a tube whose front end portion is opened and whose rear end portion is closed, an auxiliary piston 782 which is a front end member of the input piston 726, which is shaped like a tube having a bottom, and which can project from and retract into the body portion 780, a first reaction force spring 784 supporting the auxiliary piston 782, a second reaction force spring 786 disposed behind the first reaction force spring 784 in series, and a floating seat 788 shaped like a rod with a flange, sandwiched between these reaction force springs 784, 786 and floatingly supported by them. Incidentally, each of the first reaction force spring 784 and the second reaction force spring 786 is a compression coil spring. The input piston 726 is inserted into the housing 400 from a rear end side of the housing 720 while slidably contacting with an inner face of the rear small diameter portion 752 of the second housing member 732 and is inserted into the first pressurizing piston 722 while slidably contacting with an inner face thereof. There is defined a fluid chamber (hereinafter, referred to as an "inter-piston chamber" where appropriate) R15 between the first pressurizing piston 722 and the input piston 726 and in front of the input piston 726. Additionally, a fluid chamber (hereinafter, referred to as an "internal chamber" where appropriate) R16 defined in an inside of the input piston 726 is always kept at atmospheric pressure.

The first reaction force spring 784 is supported at a front end portion thereof by a front end portion of the auxiliary piston 782 and supported at a rear end portion thereof by a front seat face of the floating seat 788. The second reaction force spring 786 is supported at a rear end portion thereof by a rear end portion of the body portion 780 of the input piston 726 and supported at a rear end portion thereof by a rear seat face of the floating seat 788. Therefore, the first reaction force spring 784 and the second reaction force spring 786 bias the auxiliary piston 782 in a direction in which the auxiliary piston 782 projects from the body portion 780 of the input piston 726, and elastically support the auxiliary piston 782. Incidentally, it is limited that the auxiliary piston 782 projects forward out of the body portion 780 beyond some degree, because the auxiliary piston 782 is stopped by a stopper ring portion provided on a circumferential portion of a rear end of the auxiliary piston 782 by a step provided in an inside portion of a front end of the body portion 780 of the input piston 726. On the other hand, the distance that the auxiliary piston 782 and the floating seat 788 move close to each other is limited within a predetermined range.

The front end portion of the operation rod 152 is connected to a rear end portion of the input piston 726 so as to transmit, to the input piston 726, the operation force applied to the brake pedal 150 and so as to move the input piston 726 forward and rearward in accordance with the operation amount of the brake pedal 150. Incidentally, the rearward movement of the rear end portion of the input piston 726 is limited because the rear end portion thereof is stopped by a rear end portion of the rear small diameter portion 752 of the second housing member 732. In addition, a round-shaped spring seat 792 is fixed to the operation rod 152 and a compression coil spring (hereinafter, referred to as a "return spring" where appropriate) 794 is disposed between the spring seat 792 and the second housing member 732. The return spring 794 biases the operation rod 152 rearward. Incidentally, a boot 494 is provided between the spring seat 792 and the housing 720 so as to protect a rear portion of the cylinder device 710 from dust.

The first pressurizing chamber R11 communicates with the fluid passage 202 connected to the antilock device 114 via a communication hole 800 whose opening is an output port while it is allowed for the first pressurizing chamber R11 to communicate with the reservoir 122 via a communication hole 802 provided on the first pressurizing piston 722 and a communication hole 804 whose opening functions as a drain port. On the other hand, the second pressurizing chamber R12 communicates with the fluid passage 200 connected to the antilock device 114 via a communication hole 806 whose opening is an output port while it is allowed for the second pressurizing chamber R12 to communicate with the reservoir 122 via a communication hole 808 provided on the second pressurizing piston 724 and a communication hole 810 whose opening is an drain port. By the way, the internal chamber R16 in the input piston 726 communicates with the reservoir 122 via a communication hole 812 provided on the first pressurizing piston 722, a communication hole 814 provided on the second housing member 732, and a communication hole 818 provided on the first housing member 730 whose opening is a drain port. A portion of the second housing member 732 which is located in a front side thereof has an outer diameter somewhat smaller than an inner diameter of the first housing member 730. Therefore, between the housing members 730 and 732, there is formed a fluid passage 820 having a certain cross section area through which the brake fluid can flow. The input chamber R13 communicates with the pressure-intensifying/reducing device 120 via the communication passage 820, a communication hole 822 provided on the second housing member 732, and a communication hole 824 whose opening is an input port.

The opposing chamber R14 can communicate with exteriors via a communication hole 826 provided on the second housing member 732 and a communication hole 828 whose opening is a connection port. The body portion 760 of the first pressurizing piston 722 has an outer diameter somewhat smaller than an inner diameter of the front small diameter portion 742 of the first housing member 730. Between the body portion 760 and the front small diameter portion 742, there is formed a fluid passage 830 having a certain cross section area through which the brake fluid can flow. The inter-piston chamber R15 can communicate with exteriors via the fluid passage 830, a communication hole 832 provided on the first pressurizing piston 722 and a communication hole 834 whose opening is a connection port. The connection port of the communication hole 828 and the connection port of the communication hole 834 communicate with each other via the external communication passage 836, whereby there is formed an inter-chamber communication passage for a communication between the opposing chamber R14 and the inter-piston chamber R15. That is, in the cylinder device 710, the opposing chamber R14 and the inter-piston chamber R15 are considered as an integrated fluid chamber (hereinafter, referred to as a "reaction force chamber" where appropriate) R17 by the inter-chamber communication passage. In addition, an electromagnetic inter-chamber open/close valve 838 and a check valve 840 are provided on the inter-chamber communication passage.

In accordance with the relative movement of the first pressurizing piston 722 and the input piston 726, a volume of the inter-piston chamber R15 increases and decreases while a volume of the opposing chamber R14 decreases and increases. The above inter-chamber communication passage has a function that the volume change of one of the fluid chambers absorbs the volume change of the other of the fluid chambers and vice versa. Incidentally, the cross section area of the opposing chamber R14 is almost equal to that of the inter-piston chamber R15, whereby the first pressurizing piston 722 is allowed to move relative to the housing 720 while the input piston 726 is not allowed to move relative to the housing 720.

Inside the first housing member 730, there is provided a communication hole 844 whose opening is a connection port. The communication hole 844 is connected to the communication hole 818 inside the first housing member 730. Additionally, one end of the external communication passage 846 is connected to the connection port of the communication hole 844 and the other end of the external communication passage 846 is connected to the pressure-reducing linear valve 252 of the pressure-intensifying/reducing device 120.

Therefore, an external communication passage 847 separating from the external communication passage 846 is connected to the external communication passage 836. Accordingly, the opposing chamber R14 can communicate with the reservoir 122 via the external communication passages 836, 846, 847. In addition, there is provided an electromagnetic opposing-chamber open/close valve 848 on the external communication passage 847. The external communication passage 847 is opened or closed by this opposing-chamber open/close valve 848. The cylinder device 710 having such a construction is equipped with a mechanism including the external communication passage 847 and the opposing-chamber open/close valve 848, namely, a first communication-state switching mechanism which selectively realizes an opposing-chamber communication state in which the opposing chamber R14 and the reservoir 122 communicate with each other and an opposing-chamber not-communication state in which they do not communicate with each other. In addition, a check valve 850 is provided on the external communication passage 847 so as to prevent a pressure of the brake fluid in the opposing chamber R14 from decreasing below the atmospheric pressure.

<<Actuation of Cylinder Device>>

An actuation of the cylinder device 710 in the electrical failure condition is explained. In the electrical failure condition, the pressure-intensifying linear valve 250 and the pressure-reducing linear valve 252 are in the close state and the open state, respectively. The inter-chamber open/close valve 838 is also in an open state, whereby the opposing chamber R14 and the inter-piston chamber R15 communicate with each other via the inter-chamber communication passage. The opposing-chamber open/close valve 848 is in an open state too, that is, there is realized, by the first communication-state switching mechanism, the opposing-chamber communication state in which the opposing chamber R14 and the reservoir 122 communicate with each other. Therefore, the reaction force chamber R17 communicates with the reservoir 122 so as to be at the atmospheric pressure.

In the failure condition, when the driver starts pressing the brake pedal 150, because the reaction force chamber R17 is at the atmospheric pressure, the input piston 726 can freely move forward after a moment at the start of pressing. As a result, the front end of the input piston 726 may come into abutting contact with the separation wall 764 of the first pressurizing piston 722 at an early stage of the movement of the input piston 726. Furthermore, when the body portion 780 of the input piston 726 comes into abutting contact with the first pressurizing piston 722, the operation force applied to the brake pedal 150 is directly transmitted to the first pressurizing piston 722. Therefore, the driver can push the first pressurizing piston 722 by the driver's own force. Thus, there is realized an operation-force dependent pressurizing state in which the brake fluid in the first pressurizing chamber R11 and the second pressurizing chamber R12 is pressurized by the operation force applied to the brake pedal 150, whereby a pressure depending on the operation force of the driver is inputted to the brake device 116.

When the driver stops the brake operation, that is, the application of the operation force to the brake pedal 150 is released, the first pressurizing piston 722 and the second pressurizing piston 724 are respectively returned to their initial positions (positions illustrated in FIG. 9, that is, positions in a state in which the flange portion 762 abuts on a stepping face formed between the front large diameter portion 750 and the rear small diameter portion 752 of the second housing member 732) by the return springs 774, 776. On the other hand, the input piston 726, together with the operation rod 152, is returned to an initial position (a position illustrated in FIG. 9, that is, a position in which the rear end of the input piston 726 is stopped by the rear end portion of the rear small diameter portion 752 of the second housing member 732) by the first reaction force spring 784 and the second reaction force spring 786.

An actuation in the normal condition is explained below. In the normal condition, the maximum current is supplied to the pressure-reducing linear valve 252, whereby it is put in the close state. The inter-chamber open/close valve R14 is in the open state, whereby the opposing chamber R14 and the inter-piston chamber R15 communicate with each other via the inter-piston communication passage. The opposing-chamber open/close valve 848 is in the close state, whereby the opposing-chamber not-communication state is realized by the first communication-state switching mechanism. Therefore, the opposing chamber R14, that is, the reaction force chamber R17 is hermetically closed.

When the driver starts pressing the brake pedal 150, the body portion 780 of the input piston 726 starts moving forward. Because there is realized a state in which a change of the volume of the reaction force chamber R17 is prohibited, the auxiliary piston 782 is pushed into the body portion 780 by an increase of a pressure in the reaction force chamber R17, that is, the inter-piston chamber R15 while compressing the first reaction force spring 784 and the second reaction force spring 786. In other words, there is realized a state in which the au/ciliary piston 782 is retracted into the body portion 780 by an amount which is in accordance with the pressure in the reaction force chamber R17.

Amounts of elastic deformations of the first reaction force spring 784 and the second reaction force spring 786, namely, compression amounts depend on the increase of the pressure in the reaction force chamber R17. On the contrary, the fluid in the reaction force chamber R17 is pressurized in accordance with the elastic forces of the first reaction force spring 784 and the second reaction force spring 786, and an operation reaction force in accordance with the pressure in the reaction force chamber R17 is applied to the operation member via the input piston. In other words, the force by the pressurizations of the two reaction force springs 784, 786 functions as a resistance force against the forward movement of the input piston 726, that is, the operation reaction force against the operation of the brake pedal 150. The cylinder device 710 having such a construction is equipped with a mechanism including the auxiliary piston 782, the first reaction force spring 784, the second reaction spring 786, and the floating seat 788, namely, an elastic force dependent pressurizing mechanism which can pressurize the fluid in the reaction force chamber R17 depending on the elastic forces of the first reaction force spring 784 and the second reaction force spring 786.

The above operation reaction force depends on the forward movement of the input piston 726, that is, the operation amount of the brake pedal 150. In the cylinder device 710, a magnitude of the operation reaction force with respect to the operation amount of the brake pedal 150 becomes a magnitude according to the characteristic shown in FIG. 3. In the cylinder device 710, because the rear end face of the auxiliary piston 782 comes into abutting contact with the floating seat 788, the first reaction force spring 784 can not elastically deform, thereafter only the second reaction force spring 786 elastically deforms. Additionally, a spring constant of the first reaction force spring 784 is much smaller than that of the second reaction force spring 786. As a result, an incline of a change of the operation reaction force is small in a rather small operation amount and becomes considerably large when the operation amount exceeds the operation-reaction-force inclination change amount. When the brake pedal 150 is operated further, the rear end portion of the floating seat 788 comes into abutting contact with the rear end portion of the input piston 726, whereby the second reaction force spring 786 is not elastically deformed. That is, in the cylinder device 710, there is predetermined a predetermined forward movement distance at which the forward movement of the input piston 726 is prohibited, and there is predetermined an operation limit which is determined by the predetermined forward movement distance. Thus, the cylinder device 710 has a mechanism including the first reaction force spring 784, the second reaction force spring 786, and the floating seat 788, namely, an input-piston-forward-movement permitting mechanism which permits the forward movement of the input piston 408 within the predetermined forward movement distance against the elastic force.

When the opposing-chamber open/close valve 848 is opened in the middle of the brake operation, the forward movement of the first pressurizing piston 722 is permitted. Moreover, when the pressure generated by the high-pressure-source device 118 is inputted into the input chamber R13 in order to generate the hydraulic brake force, the first pressurizing piston 722 and the second pressurizing piston 724 are moved forward by the pressure so as to pressurize the brake fluid in the first pressurizing chamber R11 and the second pressurizing chamber R12. In the pressurization of the brake fluid on the basis of the pressure inputted into the input chamber R13, because the reaction force chamber R17 is hermetically closed, the front end of the input piston 726 does not come into abutting contact with the separation wall 764 of the first pressurizing piston 722, where the operation is conducted within the above hydraulic-brake-beginning amount at the maximum regenerative brake. In addition, because a pressurized area which is an area of a front end of the flange portion 762 of the first pressurizing piston 722 and to which a pressure is applied is almost equal to a pressurized area which is an area of the front end of the input piston 726 and to which a pressure is applied, the forward movement of the first pressurizing piston 722 does not affect the forward and rearward movements of the input piston 726, in other words, the hydraulic brake system 700 is configured such that the forward movement of the first pressurizing piston 722 does not affect the operation amount of the brake pedal 150 and the operation force.

When the brake fluid is pressurized depending on the pressure in the input chamber R13 by the above actuation, the first pressurizing piston 722 and the second pressurizing piston 724 are moved forward not depending on the operation force applied to the brake pedal 150 and the operation amount, whereby the brake fluid in the first pressurizing chamber R11 and the second pressurizing chamber R12 is pressurized. That is, there is realized a high-pressure-source-pressure dependent braking state in which the brake fluid in the first pressurizing chamber R11 and the second pressurizing chamber R12 is pressurized depending on the pressure from the high pressure source, irrespective of the forward movement of the input piston 726. The brake force depending on the cylinder device 710, namely, the hydraulic brake force is determined by the pressure of the inputted brake fluid. In the normal condition, the controlled high-pressure-source pressure is controlled by the pressure-intensifying/reducing device 120 and the pressure controlled at a required degree is inputted into the input chamber R13.

In the normal condition, the controlled-high-pressure-source pressure controlled by the pressure-intensifying/reducing device 120 may be inputted into the input chamber R13 so as to generate the hydraulic brake force whose magnitude corresponds to the magnitude obtained by subtracting the regenerative brake force from the target brake force. In many cases, the hydraulic brake force may be generated after a time point when the target brake force exceeds the available-maximum-regenerative brake force. Incidentally, there is an instance in which the hydraulic brake force is required due to an amount of charge of the battery 26 etc. even when the target brake force is not above the available-maximum-regenerative brake force. In this instance, the pressure from the high-pressure-source device 118 may be inputted into the input chamber R13 before the operation amount reaches the hydraulic-brake-beginning amount at the maximum regenerative brake.

As explained above, in the vehicle, the hydraulic brake system 700 may generate the hydraulic brake force whose magnitude corresponds to a magnitude obtained by subtracting the regenerative brake force from the target brake force. In an extreme sense, as long as the regenerative brake force can meet the target brake force, the hydraulic brake force to be generated by the hydraulic brake system 700 is not required. The cylinder device 710 is configured to generate, in the normal condition, the operation reaction force in accordance with the operation amount of the brake pedal 150 without depending on the generated hydraulic brake force. In an extreme sense, the cylinder device 710 has a function of permitting the operation of the brake pedal 150 under a state in which the brake fluid is not pressurized by the first pressurizing piston 722 and the second pressurizing piston 724. Therefore, the cylinder device 710 has a favorable stroke simulator for the hybrid vehicle.

When the brake fluid in the first pressurizing chamber R11 and the second pressurizing chamber R12 is pressurized by the first pressurizing piston 722 and the second pressurizing piston 724, respectively, so as to generate the hydraulic brake force in the middle of the brake operation, a pressure generated by the high-pressure-source device 118 may be inputted into the input chamber R13. To be more specific, the controlled high-pressure-source pressure controlled by the pressure intensifying/reducing device 120 may be inputted into the input chamber R13 so as to generate the hydraulic brake force whose magnitude corresponds to the magnitude obtained by subtracting the regenerative brake force from the target brake force. Here, the maximum regenerative brake force which can be generated by the regenerative brake of the vehicle is defined as the available-maximum-regenerative brake force. Where it is assumed that the hydraulic brake force is generated after a time point when the target brake force exceeds the available-maximum-regenerative brake force, the operation amount of the brake pedal at the beginning of the generation of the hydraulic brake force is generally equal to the hydraulic-brake-beginning amount at the maximum regenerative brake in FIG. 3. In the hydraulic brake system 700, the hydraulic-brake-beginning amount at the maximum regenerative brake is predetermined to be a slightly larger than the operation-reaction-force inclination change amount described above. Incidentally, there is an instance in which the hydraulic brake force is required due to an amount of charge of the battery 26 etc. even though the target brake force does not exceed the available-maximum-regenerative brake force. In this instance, the pressure from the high-pressure-source device 118 may be inputted into the input chamber R13 before the operation amount reaches the hydraulic-brake-beginning amount at the maximum regenerative brake.

When the pressure is inputted into the input chamber R13, the first pressurizing piston 722 is moved forward by the pressure without depending on the operation force applied to the brake pedal 150 and without depending on the operation amount. Consequently, the brake fluid in the first pressurizing chamber R11 is pressurized. According to that, the brake fluid in the second pressurizing chamber R12 is also pressurized by the second pressurizing piston 724. That is, there is realized a high-pressure-source-pressure dependent pressurizing state, that is, a high-pressure-source-pressure dependent braking state in which the brake fluid in the first pressurizing chamber R11 and the second pressurizing chamber R12 is pressurized by the pressure from the high pressure source, irrespective of the forward movement of the input piston 408. The brake force depending on the cylinder device 710, namely, the hydraulic brake force is determined by the pressure of the inputted brake fluid. The controlled high-pressure-source pressure is controlled by the high-pressure-source pressure control device and the pressure controlled at a required degree is inputted into the input chamber R13.

Even in the normal condition, when the operation of the brake is finished, the pressure-reducing linear valve 252 is put in the open state; the first pressurizing piston 722 and the second pressurizing piston 724 are respectively returned to their initial positions by the return springs 774, 776; the input piston 726 is returned to the initial position by the first reaction force spring 784 and the second reaction force spring 786. In the large-brake-force required case, the inter-piston open/close valve 838 is put in the close state and the opposing-chamber open/close valve 848 is put in the open state. That is, the inter-piston chamber R15 is hermetically closed to fix its volume, and the opposing-chamber communication state is realized by the first communication-state switching mechanism, whereby the opposing chamber R14 communicates with the reservoir 122. Therefore, it becomes possible to move the input piston 726 forward by the operation force of the driver in addition to a force depending on the controlled high-pressure-source pressure inputted into the input chamber R13. The forward movement of the input piston 726 pressurizes the brake fluid in the first pressurizing chamber R11 and the second pressurizing chamber R12 via the brake fluid confined in the inter-piston chamber R15. That is, in the large-brake-force required case, the operation-force/high-pressure-source-pressure dependent pressurizing state is realized in which the brake fluid in the first pressurizing chamber R11 and the second pressurizing chamber R12 is pressurized depending on both of the controlled high-pressure-source pressure and the operation force applied to the brake pedal 150. The pressurization in this state enables the output pressure from each of the first pressurizing chamber R11 and the second pressurizing chamber R12 to become higher than the output pressure in the case in which the input pressure that the high-pressure-source device 118 can generates at most is inputted into the first input chamber R13 in the above high-pressure-source-pressure dependent brake state.

That is, an operation-force/high-pressure-source-pressure dependent braking state is realized in which there can be obtained a brake force larger than the brake force in high-pressure-source-pressure dependent braking state. In other words, the thus constructed cylinder device 710 is equipped with a cylinder-device-actuation switching mechanism which selectively realizes the high-pressure-source-pressure dependent braking state and the operation-force/high-pressure-source-pressure dependent braking state by the control valve device including the inter-chamber open/close valve 838 and the opposing-chamber open/close valve 848.

In the high-pressure-source-pressure dependent pressurizing state, because the controlled high-pressure-source pressure $P_C$ is increased by the increase of the operation force F of the driver, the first pressurizing piston 722 is moved forward, thereby increasing the output pressure $P_O$. Therefore, in the hydraulic brake system 700, the output pressure $P_O$ can be considered as an operation-force indicating parameter which indicates the operation force F. Accordingly, when the output pressure $P_O$ is considered to be close to the high-pressure-source pressure $P_H$, that is, in a condition that the output pressure $P_O$ exceeds a predetermined threshold pressure $P_{TH}$, the switch from the high-pressure-source-pressure dependent braking state to the operation-force/high-pressure-source-pressure dependent braking state is conducted. On the contrary, in the hydraulic brake system 700, when the output pressure $P_O$ does not exceed the predetermined threshold pressure $P_{TH}$, that is, when the above condition is not satisfied, the switch from the operation-force/high-pressure-source-pressure dependent braking state to the high-pressure-source-pressure dependent braking state is conducted.

Figure 10:
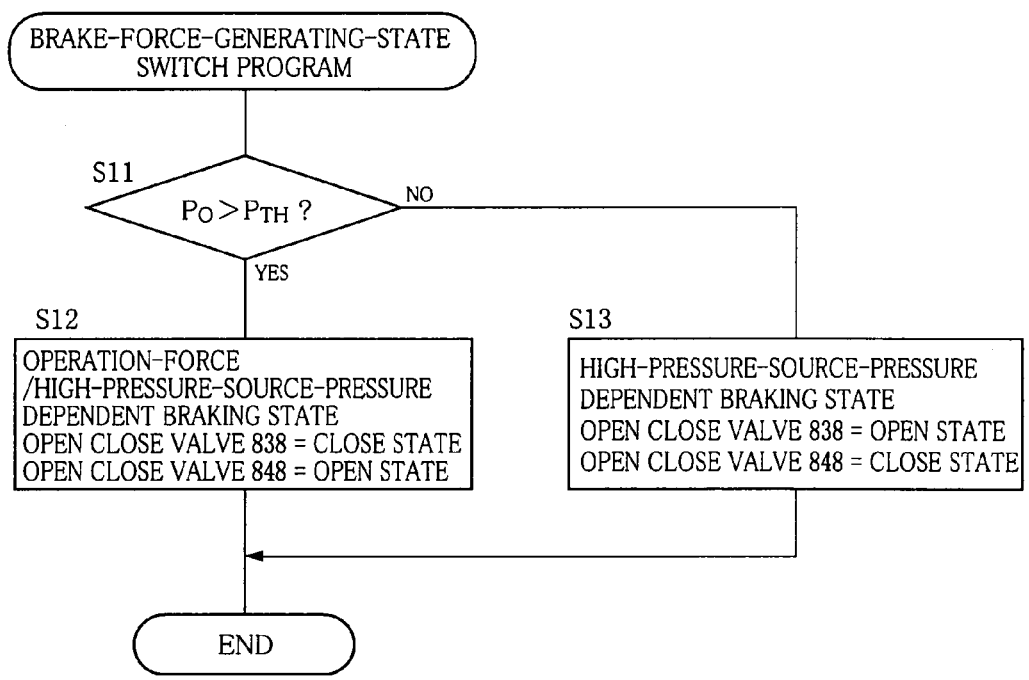
FIG. 10 is a flow chart of a control program which is executed in the hydraulic brake system according to the second embodiment and which is for a switch of a high-pressure-source-pressure dependent state and a operation-force/high-pressure-source-pressure dependent state.

To be concrete, in the hydraulic brake system 700, the switch of the braking state on the basis of the output pressure $P_O$ is conducted by executing, repeatedly at extremely short time intervals, a brake-force-generating-state switch program whose flow chart is indicated in FIG. 10. In the processes in accordance with the program, in S11, it is judged whether the above condition for the switch from the high-pressure-source-pressure dependent braking state to the operation-force/high-pressure-source-pressure dependent braking state is satisfied or not. Where the condition is satisfied, in S12, the open/close valve 838 is put in the close state and the open/close valve 848 is put in the open state so as to switch to the operation-force/high-pressure-source-pressure dependent braking state or keep the state. On the contrary, where the condition is not satisfied, in S13, the open/close valve 838 is put in the open state and the open/close valve 848 is put in the close state so as to switch to the high-pressure-source-pressure dependent braking state or keep the state.

<<Features of Hydraulic Brake System>>

The hydraulic brake system 700 switches an actuation state of the cylinder device from the high-pressure-source-pressure dependent pressurizing state to the operation-force/high-pressure-source-pressure dependent pressurizing state when the controlled high-pressure-source pressure $P_C$ in the high-pressure-source-pressure dependent pressurizing state is considered to be close to the high-pressure-source pressure $P_H$ in the generation of the high-pressure-source dependent maximum brake force.

In the cylinder device 710 of the hydraulic brake system 700, the input piston 726 is inserted in the blind hole provided on the first pressurizing piston 722. As a result, there are disposed two high pressure seals which have to be slidably contacted with the input piston 726 in order to define each of the above chambers. One of them is disposed between the inner face of the blind hole of the first pressurizing piston 722 and the outer face of the input piston 726. The other of them is disposed between the outer face of the input piston 726 and the second housing member 732. Namely, they are a seal 860 and a seal 862, respectively. Therefore, a friction resistance against the movement of the input piston 726 is relatively small, which reduces an influence that the friction resistance gives to operational feeling of the operation member, that is, an influence that is given to operational feeling in the brake operation.

Additionally, in the cylinder device 710, the stroke simulator includes the elastic force dependent pressurizing mechanism pressurizing the reaction force chamber R17. The first reaction force spring 784 and the second reaction force spring 786 constituting the stroke simulator are disposed inside the cylinder device 710, specifically, inside the input piston 726. Therefore, the cylinder device is compact.

Furthermore, in the cylinder device 710, one chamber, namely, the reaction force chamber R17 is formed by the communication between the inter-piston chamber R15 and the opposing chamber R14. Accordingly, the volume of the inter-piston chamber R15 is relatively small. In other words, a distance between the front end of the input piston 726 and a bottom of the blind hole of the first pressurizing piston 722 is relatively short. Therefore, a distance of the forward movement of the input piston 726 which is necessary for the input piston 726 to come into abutting contact with the first pressurizing piston 722 is short. Therefore, in the cylinder device 710, a play of the brake operation in the failure condition is small and operational feeling in the brake operation is favorable.

Modified Embodiment

Figure 11:
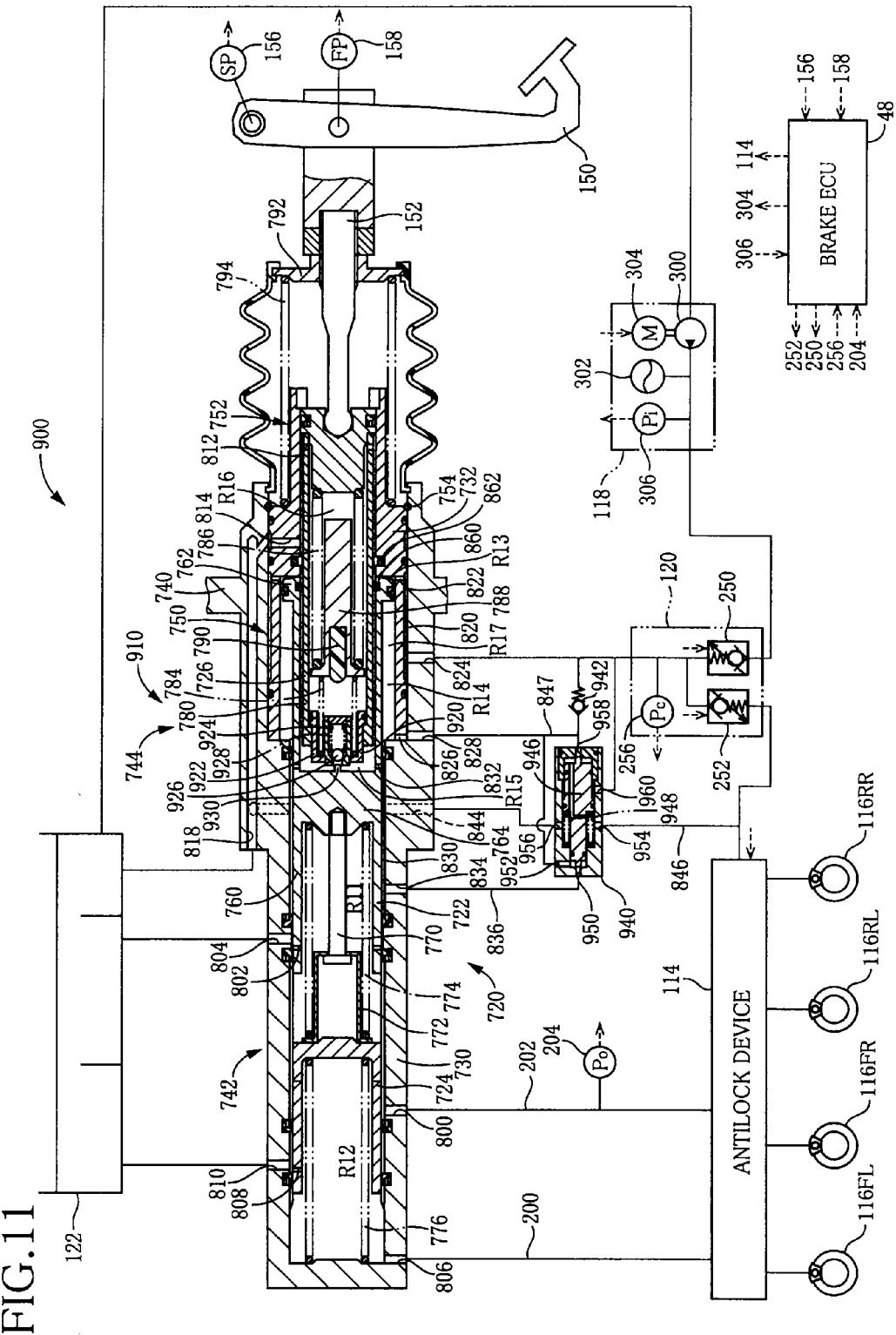
FIG. 11 is a view of a hydraulic brake system according to a modified embodiment of the second embodiment.

A hydraulic brake system 900 illustrated in FIG. 11 employs a cylinder device 910 instead of the cylinder device 710 of the hydraulic brake system 700 of the second embodiment. The cylinder device 910 has roughly the same construction as the cylinder device 710 of the second embodiment has. In the following explanation regarding the modified embodiment, constructions and actuations different from those of the second embodiment will be explained.

In the cylinder device 910, an auxiliary piston 920 is employed instead of the auxiliary piston 782 of the cylinder device 910 of the second embodiment. The auxiliary piston 920 includes an outer tube member 922 shaped like a tube whose front end face has a hole, an inner tube member 924 shaped like a tube and is fixedly fitted in the hole, and a ball 926 and a bias spring 928 which are contained inside the inner tube member 924. The inner tube member 924 has an opening on the front end face thereof. The ball 926 is pushed forward so as to close the opening by a reaction force of the bias spring 928 which is a compression coil spring. There is provided a pin 930 on the separation wall 764 positioning in front of the auxiliary piston 920. When the pin 930 is inserted into the opening of the inner tube member 924, the pin 930 can come into abutting contact with the ball 926. Therefore, when a distance between the auxiliary piston 920 and the separation wall 764 becomes smaller than a predetermined distance by the forward movement of the auxiliary piston 920, the pin 930 pushes the ball 926 rearward, whereby the opening of the inner tube member 924 is opened. Thus, in the auxiliary piston 920, there is provided an open/close valve which allows the inter-piston chamber R15 to communicate with the internal chamber R16 by the separation of the ball 926 from the opening of the inner tube member 924. Therefore, in the cylinder device 910, the internal chamber R16 of the input piston 726 constitutes a part of a communication passage extending from the reaction force chamber R17 to the reservoir 122. The communication passage is opened or closed by the open/close valve provided in the auxiliary piston 782.

In the cylinder device 910, instead of the inter-chamber open/close valve 838 and the opposing-chamber open/close valve 848 in the hydraulic brake system 700 of the second embodiment, there is employed a mechanical valve device 572 which is employed in the hydraulic brake system 560 that is the first modified embodiment of the hydraulic brake system 100 of the first embodiment. This valve device 572 can be considered as a valve device into which the above inter-chamber open/close valve 838 and the above opposing-chamber open/close valve 848 are integrated. Additionally, the valve device 572 constitutes a part of the communication passage 846 extending from the antilock device 114 to the reservoir 122. Besides, a relief valve 942 is provided on the external communication passage which branches from the external communication passage 847 and is connected to the pressure-intensifying/reducing device 120.

In the following, it will be explained a relation between each of the chambers formed inside the valve device 572 and each of the external communication passages connected to the valve device 572. The external communication passage 836 is connected to each of the connection ports of the communication hole 586 and the communication hole 588 formed on the housing 580 of the valve device 572. That is, the external communication passage 836 includes these communication holes and the fluid chamber which is defined in the front end of the housing 580 and by the front end portion of the piston 582 and the inner surface of the housing 580. The external communication passage 846 is connected to each of drain ports of the communication hole 590 and the communication hole 592. That is, the external communication passage 846 includes these communication holes and the fluid chamber in which the push spring 584 is disposed in a center portion of the housing 580. The external communication passage 847 is connected to the connection port of the communication hole 594. That is, the external communication passage 847 includes the communication hole 594 and the fluid chamber which is defined in the rear end of the housing 580 and by the rear end portion of the piston 582 and the housing 580. In addition, the external communication passage 846 is connected to this fluid chamber via the communication passage inside the piston 582. Therefore, the external communication passage 847 includes this communication passage and is connected to the external communication passage 846 via the valve device 572. A fluid chamber formed between the rear portion of the piston 582 and the center portion of the housing 580 is connected to the pressure-intensifying/reducing device 120 via the external communication passage connected to the connection port of the communication hole 596. That is, this fluid chamber is always kept at the controlled high-pressure-source pressure.

In the failure condition and the normal condition, the external communication passage 836 is in the open state, whereby the opposing chamber R14 and the inter-piston chamber R15 communicate with each other, and the external communication passage 847 is in the close state, whereby the communication between the opposing chamber R14 and the reservoir 122 is shut off.

In the failure condition, when the driver starts pressing the brake pedal 150, similarly to the brake system 700 of the second embodiment, the body portion 780 of the input piston 726 is moved forward and the auxiliary piston 782 is retracted into the body portion 780 while compressing the first reaction force spring 784 and the second reaction force spring 786 in accordance with the pressure in the reaction force chamber R17. Where the braking force applied to the brake pedal 150 is at a predetermined threshold operation force by an increase of the operation amount of the brake pedal 150, the relief valve 738 is opened, whereby a reaction force chamber communication state is realized in which the reaction force chamber R17 communicates with the reservoir 122 via the pressure-reducing linear valve 252 that is in the open state. That is, the cylinder device 910 is equipped with a mechanism by which the reaction force chamber R17 and the reservoir 122 can communicate with each other on the basis of a valve-opening pressure of the relief valve 738, namely, a pressure dependent communication mechanism.

As the operation of the brake pedal 150 proceeds in this state, the auxiliary piston 782 moves forward together with the input piston 726 to some extent. Where the distance between the auxiliary piston 920 and the separation wall 764 becomes smaller than the predetermined distance, the pin 930 provided on the separation wall 764 pushes rearward the ball 926 constituting the open/close valve provided in the auxiliary piston 920, whereby the reaction force chamber R17 communicates with the reservoir 122 via the internal chamber R16 in the input piston 726. The thus constructed cylinder device 910 is equipped with a mechanism which includes the auxiliary piston 782 and the communication passage extending from the reaction force chamber R17 to the reservoir 122, namely, a volume dependent communication mechanism which selectively realizes, on the basis of the volume of the reaction force chamber R17, a reaction force chamber communication state in which the reaction force chamber R17 and the reservoir 122 communicate with each other and a reaction force chamber not-communication state in which they do not communicate with each other. Incidentally, this communication passage is a communication passage for the volume dependent communication mechanism which allows the reaction force chamber R17 to communicate with reservoir 122.

When the reaction force chamber communication state is realized by the above volume dependent communication mechanism, the reaction force chamber R17 is at the atmospheric pressure, thereby allowing the input piston 726 to move forward relatively freely. Therefore, the input piston 726 comes into abutting contact with the separation wall 764 so as to directly push the first pressurizing piston 722. In this state, the operation force applied to the brake pedal 150 is directly transmitted to the first pressurizing piston 722. That is, an operation-force dependent pressurizing state is realized in which the brake fluid in the first pressurizing chamber R11 and the second pressurizing chamber R12 is pressurized by the operation force applied to the brake pedal 150. Accordingly, the pressure of the brake fluid in accordance with the driver's operation force is inputted into the brake device 116.

When the driver finishes the brake operation, that is, releases the application of the operation force to the brake pedal 150, the first pressurizing piston 722 and the second pressurizing piston 724 are respectively returned to their initial positions (positions illustrated in FIG. 11, that is, positions in a state in which the rear end of a first pressurizing piston 722 abuts on a rear end portion of the second housing member) by the return springs 774, 776. On the other hand, the input piston 726, together with the operation rod 152, is returned by the first reaction force spring 784 and the second reaction force spring 786 to an initial position (a position illustrated in FIG. 11, that is, a position in which the rear end of the input piston 726 is stopped by the rear end portion of the second housing member 732).

In the normal condition, the pressure from the high-pressure-source device 118 is inputted into the first input chamber R13 before the operation amount of the brake pedal 150 exceeds the above hydraulic-brake-beginning amount at the maximum regenerative brake. In this operation too, the opposing chamber R14 and the inter-piston chamber R15 communicate with each other through the valve device 572. Additionally, the relief valve 942 is in a close state, whereby the opposing-chamber not-communication state is realized. Therefore, where the pressure is inputted from the high-pressure-source device 118, the first pressurizing piston 722 moves forward not depending on the operation force applied to the brake pedal 150 and the operation amount, thereby pressurizing the brake fluid in the first pressurizing chamber R11. That is, there is realized a high-pressure-source-pressure dependent braking state in which the brake fluid in the first pressurizing chamber R11 and the second pressurizing chamber R12 is pressurized depending on the pressure from the high pressure source, irrespective of the forward movement of the input piston 726.

In the large-brake-force required case, that is, in a case in which the controlled high-pressure-source pressure exceeds the predetermined pressure by the increase of the operation amount, the inter-piston chamber R15 is hermetically closed by the valve device 572, and the opposing chamber R14 and the reservoir 122 communicate with each other not depending on the relief valve 942. In this state, it is possible to move the first pressurizing piston 722 forward depending on both of the operation force of the driver and the pressure from the high-pressure-source device 118. Accordingly, the operation-force/high-pressure-source-pressure dependent braking state is realized in which there can be obtained a brake force larger than the maximum brake force in high-pressure-source-pressure dependent braking state. Therefore, the cylinder device 900 is equipped with a mechanism including the valve device 572, namely, a cylinder-device-actuation switching mechanism which selectively realizes the high-pressure-source-pressure dependent braking state and the operation-force/high-pressure-source-pressure dependent braking state.

The cylinder device 910 employed in the hydraulic brake system 900 of the modified embodiment is equipped with, in addition to the above pressure dependent communication mechanism, the above volume dependent communication mechanism as the mechanism which allows the reaction force chamber R17 to communicate with the reservoir 122. Therefore, the hydraulic brake system 900 is, similarly to the hydraulic brake system 560 of the modified embodiment of the hydraulic brake system of the first embodiment, configured to decrease a loss in the brake operation force which is caused by a pressure which remains in the reaction force chamber R17 in the operation-force dependent pressurizing state.

As other modified embodiments, the hydraulic brake system may also be configured as follows. The hydraulic brake system 700 of the second embodiment is configured to conduct the switch from the operation-force dependent pressurizing state to the operation-force/high-pressure-source-pressure dependent pressurizing state on the basis of the output pressure $P_O$. Instead, the hydraulic brake system may be configured to conduct the above switch when the controlled high-pressure-source pressure $P_C$ exceeds a predetermined pressure. Moreover, the hydraulic system may also be configured to conduct the above switch when a difference between the high-pressure-source pressure $P_H$ and the controlled high-pressure-source pressure $P_C$ decreases below a predetermined difference. Furthermore, the hydraulic system may also be configured to conduct the above switch where the above input-piston-forward-movement permitting mechanism, namely, the stroke simulator is at the above operation limit.

In the hydraulic brake system 900 of the above modified embodiment, the valve device 572 may be employed which uses the controlled high-pressure-source pressure $P_C$ as the pilot pressure. Instead, a valve device may be employed which uses the output pressure $P_O$ as the pilot pressure. Moreover, the valve device 652 may be employed in the hydraulic brake system 640 of the third modified embodiment of the hydraulic brake system 100 of the first embodiment. That is, a mechanical valve device may be employed which introduces both the high-pressure-source pressure $P_H$ and the controlled high-pressure-source pressure $P_C$ as the pilot pressures and which actuates on the basis of the difference between those pressures.

3. Third Embodiment

Figure 12:
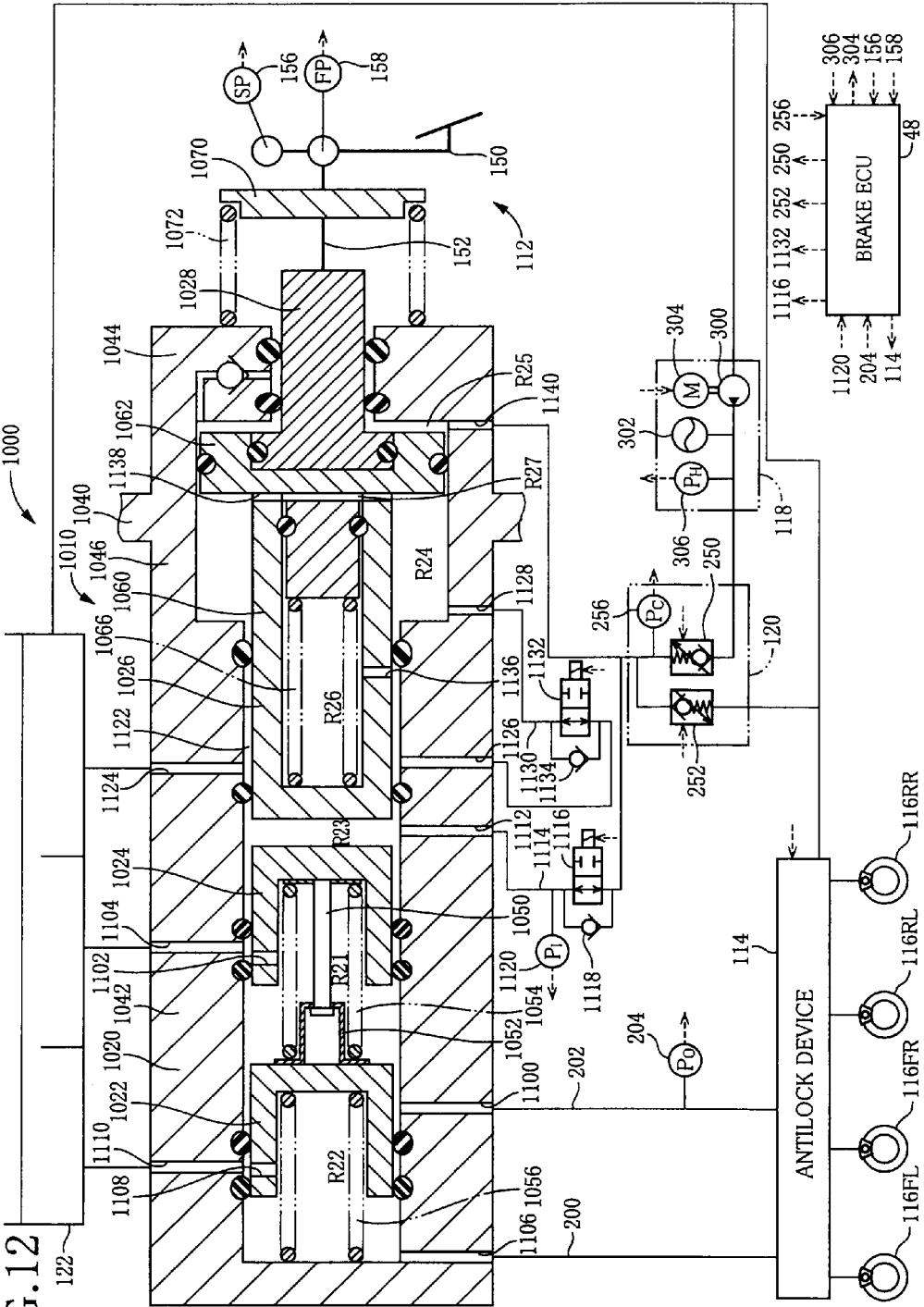
FIG. 12 is a view of a hydraulic brake system according to a third embodiment.

FIG. 12 shows a hydraulic brake system 1000 of a third embodiment. The hydraulic brake system 1000 employs a cylinder device 1010. Besides the cylinder device 1010, the hydraulic brake system 1000 is constructed almost the same as the hydraulic brake system 100 of the first embodiment which employs the cylinder device 110. Therefore, an explanation of the hydraulic brake system 1000 will be conducted only regarding the cylinder device 1010.

<<Construction of Cylinder Device>>

The cylinder device 1010 comprises a housing 1020 which is a casing of the cylinder device 1010, a first pressurizing piston 1022 and a second pressurizing piston 1024 which pressurize the brake fluid to be supplied to the brake devices 116, and an input piston 1026 which is moved forward by the pressure inputted from the external high-pressure-source device 118 and to which the operation of the driver is inputted through the operating device 112. Incidentally, FIG. 12 illustrates a state in which the cylinder device 1010 is not under actuation, that is, the brake is not operated.

The housing 1020 has a shape like a tube whose front end portion is closed and has a flange 1040 formed on a circumference of a rear end portion thereof. The housing 1020 is mounted on the body of the vehicle at the flange 1040. The housing 1020 is sectioned in three portions, concretely, a front portion 1042 located in a front side, a rear portion 1044 located in a rear side, and an intermediate portion 1046 located between the front portion 1042 and the rear portion 1044. These three portions have mutually different inner diameters, specifically, the inner diameter of the rear portion 1044 is the smallest one, the inner diameter of the intermediate portion 1046 is the largest one, and the inner diameter of the front portion 1042 is an intermediate one between that of the rear portion 1044 and that of the intermediate portion 1046.

Each of the first pressurizing piston 1022 and the second pressurizing piston 1024 has a shape like a tube whose rear end portion is closed. In addition, each of the first pressurizing piston 1022 and the second pressurizing piston 1024 is slidably fitted into the front portion 1042 of the housing 1020. The first pressurizing piston 1022 is disposed behind the second pressurizing piston 1024. Between the first pressurizing piston 1022 and the second pressurizing piston 1024, there is defined a first pressurizing chamber R21 for pressurizing the brake fluid which is supplied to each of the brake devices 116RL, RR respectively provided for the two rear wheels, and in front of the second pressurizing piston 1024, there is defined a second pressurizing chamber R22 for pressurizing the brake fluid which is supplied to each of the brake devices 116FL, FR respectively provided for the two front wheels. In addition, a distance that the first pressurizing piston 1022 and the second pressurizing piston 1024 are separated from each other is limited so as to fall within a predetermined range by a headed pin 1050 mounted on a rear end portion of the first pressurizing piston 1022 to extend forward and a pin-retaining tube 1052 fixed on a rear end face of the second pressurizing piston 1024. In the first pressurizing chamber R21 and the second pressurizing chamber R22, compression coil springs (hereinafter, referred to as a "return springs" where appropriate) 1054, 1056 are disposed, respectively. By the springs, the first pressurizing piston 1022 and the second pressurizing piston 1024 are biased in such a direction that the pistons 1022, 1024 separate away from each other and the second pressurizing piston 1024 is biased such a direction that it moves rearward.

The input piston 1026 has a first piston member 1058 and a second piston member 1059 fitted into a rear end of the first piston member 1058, and is constituted by that these two members are united. The input piston 1026 is formed into a shape having a body portion 1060 almost shaped like a tube and a flange portion 1062 provided on a circumferential of the body portion 1060. The input piston 1026 is disposed behind the first pressurizing piston 1022 such that the front portion of the body portion 1060 is slidably fitted into a rear side of an inner face of the front portion 1042 of the housing 1020, such that the flange portion 1062 is slidably fitted into an inner face of the intermediate portion 1046 of the housing 1020, and such that the rear portion of the body portion 1060 is slidably fitted into the rear portion 1044 of the housing 1020. Incidentally, the rearward movement of the input piston 1026 is limited by an abutting contact of the input piston 1026 with a stepping face formed between the rear portion 1044 and the intermediate portion 1046.

In front of the input piston 1026 and between the input piston 1026 and the rear end face of the first pressurizing piston 1022, there is defined a fluid chamber R23 into which the brake fluid can be supplied from the high-pressure-source device 118, that is, a pressure can be inputted from the high-pressure-source device 118. Hereinafter, the fluid chamber R23 is referred to as a "first input chamber R23" where appropriate. Between a rear end face of the flange portion 1062 and a stepping face formed between the rear portion 1044 and the intermediate portion 1046 of the housing 1020, there is defined another fluid chamber R24 whose volume increases in accordance with the forward movement of the input piston 1026, and into which the pressure is inputted from the high-pressure-source device 118. Hereinafter, the fluid chamber R24 is referred to as a "second input chamber R24" where appropriate. In addition, between a front end face of the flange portion 1062 and a stepping face formed between the front portion 1042 of the housing 1020 and the intermediate portion 1046, there is defined a fluid chamber R25 which is opposed to the second input chamber R24 with the flange portion 1062 interposed therebetween. Hereinafter, the fluid chamber R25 is referred to as an "opposing chamber R25" where appropriate. It is noted that the second input chamber R24 is illustrated in an almost squeezed state in FIG. 12.

There is formed a space inside the body portion 1060 of the input piston 1026. In the space, there is disposed an auxiliary piston 1064 which can move relatively to the input piston 1026 while sliding on the input piston 1026. A chamber which is defined by the auxiliary piston 1064 and which is located in front of the auxiliary piston 1064 is a liquid chamber R26 always kept at the atmospheric pressure. Hereinafter, the liquid chamber R26 is referred to as an "atmospheric pressure chamber R26" where appropriate. A chamber which is defined by the auxiliary piston 1064 and which is located behind the auxiliary piston 1064 is a liquid chamber (hereinafter, referred to as an "internal chamber" where appropriate) R27 communicating with the above opposing chamber R25. It is noted that the internal chamber R27 is illustrated in an almost squeezed state in FIG. 12.

In the atmospheric pressure chamber R26, there is disposed a reaction force spring 1066 which is a compression coil spring. The auxiliary piston 1064 is floatingly supported and is biased rearward by the reaction force spring 1066. The cylinder device 1010 is equipped with an elastic force dependent pressurizing mechanism constituted by the reaction force spring 1066, that is, a mechanism which pressurizes the fluid in the internal chamber R27 by applying, to the auxiliary piston 1064, a force in a direction in which a volume of the internal chamber R27 decreases.

The front end portion of the operation rod 152 is connected to a rear end portion of the input piston 1026, more specifically, to a rear end portion of the body portion 1060. A round-shaped spring seat 1070 is fixed to the operation rod 152 and a compression coil spring (hereinafter, referred to as a "return spring" where appropriate) 1072 is disposed between the spring seat 1070 and the housing 1020. The operation rod 152 is biased rearward by the return spring 1072.

The first pressurizing chamber R21 communicates with the fluid passage 202 connected to the antilock device 114 via a communication hole 1100 whose opening is an output port while the first pressurizing chamber R21 communicates with the reservoir 122 such that it is allowed for the first pressurizing chamber R21 not to communicate with the reservoir 122 via a communication hole 1102 provided on the first pressurizing piston 1022 and a communication hole 1104 whose opening is a drain port. On the other hand, the second pressurizing chamber R22 communicates with the fluid passage 200 connected to the antilock device 114 via a communication hole 1106 whose opening is an output port while the second pressurizing chamber R22 communicates with the reservoir 122 such that it is allowed for the second pressurizing chamber R22 not to communicate with the reservoir 122 via a communication hole 1108 provided on the second pressurizing piston 1024 and a communication hole 1110 whose opening is an drain port.

The first input chamber R23 can communicate with exteriors via a communication hole 1112 whose opening is a connection port. The communication hole 1112 is connected with the pressure-intensifying/reducing device 120 via an external communication passage 1114. In addition, on the external communication passage 1114, there are provided an electromagnetic first input chamber open/close valve 1116 and a check valve 1118. A pressure sensor [PI] 1120 for detecting a pressure in the first input chamber R23 (hereinafter, referred to as an "input pressure" where appropriate) is also provided on the external communication passage 1114.

A portion which is a part of the body portion of the input piston 1026 and which is in front of the flange portion 1062 has a somewhat smaller outer diameter than an inner diameter of the front portion 1042 of the housing 1020. Between them, there is formed a fluid passage 1122 having a certain cross section area through which the brake fluid can flow. On the housing 1020, there is provided a communication hole 1124 whose one opening is a drain port connected to the reservoir 122. The communication hole 1124 communicates with the fluid passage 1122 at the other opening thereof. Additionally, on the housing 1020, there is provided a communication hole 1126 whose one opening is a connection port. The communication hole 1126 also communicates with the fluid passage 1122 at the other opening thereof. Therefore, the communication passage 1126 communicates with the reservoir 122 via the fluid passage 1122 and the communication hole 1124.

The opposing chamber R25 can communicate with exteriors through a communication hole 1128 whose opening is a connection port. To the connection port, one end of an external communication passage 1130 is connected while the other end thereof is connected to the connection port of the communication hole 1126. Accordingly, the external communication passage 1130 can communicate with the reservoir 122. In addition, on the external communication passage 1130, there is provided an electromagnetic opposing-chamber open/close valve 1132 which opens or closes the external communication passage 1130. The cylinder device 1010 having such a construction is equipped with a mechanism including the external communication passage 1130 and the opposing-chamber open/close valve 1132, namely, a first communication-state switching mechanism which selectively realizes a communication between the opposing chamber R25 and the reservoir 122 and non-communication therebetween. In addition, a check valve 1134 is provided on the external communication passage 1130 so as to prevent a pressure of the brake fluid in the opposing chamber R25 from decreasing below the atmospheric pressure.

On the body portion 1060 of the input piston 1026, there is provided a communication hole 1136 whereby the atmospheric pressure chamber R26 and the fluid communication passage 1122 communicate with each other. The communication between the atmospheric pressure chamber R26 and the reservoir 122 keeps the atmospheric pressure chamber R26 at the atmospheric pressure. On a boarder between the body portion 1060 of the input piston 1026 and the flange portion 1062, there is provided a communication hole 1138 whereby the opposing chamber R25 and the internal chamber R27 communicate with each other. Therefore, the communication hole 1138 forms an inter-chamber communication passage L1, which unites the opposing chamber R25 and the internal chamber R27 into one liquid chamber (hereinafter, referred to as a "reaction force chamber" where appropriate). In a state in which the reaction force chamber is hermetically closed, the forward movement of the input piston 1026 is restrained. Specifically, the forward movement of the input piston 1026 is allowed against a pressure in the reaction force chamber in the state in which the reaction force chamber is hermetically closed because the reaction force chamber is pressurized by the above elastic force dependent pressurizing mechanism.

The second input chamber R25 can communicate with exteriors via a communication hole 1140 whose opening is a connection port. To the connection port, one end of the external communication passage is connected while the other end thereof is connected to the pressure-intensifying/reducing device 120.

Even when the brake fluid of high pressure is supplied from the external high-pressure-source device 118 via the pressure-intensifying/reducing device 120 to the first input chamber R23 and the second input chamber R24, the input piston 1026 is not moved forward or rearward. More specifically, even though it is not illustrated exactly in FIG. 12, an area of a front end of the body portion 1060 which defines the first input chamber R23 and to which a pressure of the brake fluid in the first input chamber R23 is applied is almost equal to an area of a rear end of the flange portion 1062 which defines the second input chamber R24 and to which a pressure of the brake fluid in the second input chamber R24 is applied. Therefore, a force which depends on the pressure in the first input chamber R23 and moves the input piston 1026 rearward and a force which depends on the pressure in the second input chamber R24 and moves the input piston 1026 forward are in equilibrium, thereby preventing the input piston 1026 from moving forward or rearward.

<<Actuation of Cylinder Device>>

The following explanation is regarding actuations of the cylinder device 1010. For the sake of convenience, before an actuation in the normal condition is explained, an actuation in an electrical failure condition, that is, a condition in which a supply of electricity to the hydraulic brake system 1000 is cut off is explained. In the electrical failure condition, the pressure-intensifying linear valve 250 and the pressure-reducing linear valve 252 are in the close state and the open state, respectively. The first input chamber open/close valve 1116 is put in an open state, whereby the first input chamber R23 communicates with the reservoir 122 via the external communication passage 1114 and the pressure-reducing linear valve 252. The opposing-chamber open/close valve 1132 is also put in an open state, whereby the opposing chamber R25 communicates with the reservoir 122. In addition, the second input chamber R24 also communicates with the reservoir 122 via the pressure-reducing linear valve 252.

In the electrical failure condition, when the driver starts pressing the brake pedal 150, the input piston 1026 starts to move forward. The brake fluid in the first input chamber R23 and the second input chamber R25 outflows to the reservoir 122, whereby a volume of the first input chamber R23 is decreased. When the input piston 1026 comes into abutting contact with the first input pressurizing piston 1022, the input piston 1026 moves the first pressurizing piston 1022 forward while abutting on the first pressurizing piston 1022. Therefore, the operation force which is applied to the brake pedal 150 is directly transmitted to the first pressurizing piston 1022, whereby the driver can push the first pressurizing piston 1022 by the driver's own force. Thus, the first pressurizing piston 1022 is moved forward so as to shut off the communication between the first pressurizing chamber R21 and the reservoir 122, whereby the brake fluid in the first pressurizing piston R21 is pressurized by the operation force applied to the brake pedal 150. The second pressurizing piston 1024 is also moved forward in accordance with the pressurization in the first pressurizing chamber R21 so as to shut off the communication between the second pressurizing chamber R22 and the reservoir 122 in a manner similar to that of the first pressurizing chamber R21, whereby the brake fluid in the second pressurizing piston R22 is pressurized. Thus, an operation-force dependent pressurizing state is realized in which the brake fluid in the first pressurizing chamber R21 and the second pressurizing chamber R22 is pressurized by the operation force that is applied to the brake pedal 150, and a fluid pressure in accordance with the driver's operation force is inputted to the brake devices 116.

When the driver finishes the operation of the brake, that is, releases the application of the operation force to the brake pedal 150, the first pressurizing piston 1022 and the second pressurizing piston 1024 are respectively returned to their initial positions (positions which are illustrated in FIG. 12) by the return springs 1054, 1056. In addition, the input piston 1026 is returned, together with the operation rod 152, to an initial position (a position which is illustrated in FIG. 12) by the return spring 1070. Incidentally, the first pressurizing piston 1022 is prohibited, by a stopper which is not illustrated on the figure, from moving rearward beyond an initial position.

An actuation in a normal condition is explained below. In the normal condition, the opposing-chamber open/close valve 1132 is energized so as to be in a close state. Accordingly, the opposing chamber R25 and the reservoir 122 do not communicate with each other, whereby the opposing chamber R25 and the internal chamber R27, namely, the reaction force chamber is hermetically closed. Therefore, when the input piston 1026 moves forward, a volume of the opposing chamber R25 decreases while a volume of the internal chamber R27 increases. Due to the increase of the volume of the internal chamber R27, the auxiliary piston 1064 moves forward in the input piston 1026 while compressing the reaction force spring 1066. Therefore, the elastic force generated by the elastic-force dependent pressurizing mechanism, that is, by the reaction force spring 1066 is applied to the brake fluid in the reaction force chamber, whereby the pressure of the brake fluid in the reaction force chamber generated by the elastic force is applied to the input piston 1026 as a resistance force against the forward movement of the input piston 1026. That is, the elastic force functions as an operation reaction force against the operation of the brake pedal 150. By the way, because the elastic-force dependent pressurizing mechanism includes one resistance force spring, a characteristic of the operation reaction force is different from that illustrated in FIG. 3 and is almost proportional with respect to the operation amount.

In the light of the above actuation, the input piston 1026 is considered to be allowed to move forward under a restraint by the pressure in the reaction force chamber, and the above elastic-force dependent pressurizing mechanism has a function as a stroke simulator. Incidentally, not illustrated specifically in FIG. 12, where the reaction force spring 1066 reaches to a limit of the compression thereof (a state in which there is no space between wires of the coil spring) due to the increase of the volume of the internal chamber R27, the internal chamber R27 is prohibited from increasing more and the input piston 1026 is prohibited from moving forward more. This state is an operation limit at which it is impossible to increase the operation amount of the brake pedal 150. Because such a forward movement of the input piston 1026 is permitted, the cylinder device 1010 is considered having an input-piston-forward-movement permitting mechanism which permits the input piston 1026 moving forward against the elastic force within the predetermined forward movement distance.

In the normal condition, because the first input open/close valve 1116 is energized to be in an open state, the volume of the first input chamber R23 is decreased by the forward movement of the input piston 1026, whereby the brake fluid in the first input chamber R23 flows into the second input chamber R24 so as to increase a volume of the second input chamber R24. Because an area of the front end of the body portion 1060 which defines the first input chamber R23 and to which a pressure of the brake fluid of the first input chamber R23 is applied is almost equal to an area of the rear end of the flange portion 1062 which defines the second input chamber R25 and to which a pressure of the brake fluid of the second input chamber R25 is applied, the operation force applied to the brake pedal 150 does not function as a force which pressurizes the first input chamber R23. Accordingly, pressurizing the first pressurizing chamber R21 and the second pressurizing chamber R22 depending on the operation force by the first pressurizing piston 1022 and the second pressurizing piston 1024, respectively, are not conducted.

When the brake fluid in the first pressurizing chamber R21 and the second pressurizing chamber R22 is pressurized by the first pressurizing piston 1022 and the second pressurizing piston 1024, respectively, so as to generate the hydraulic brake force in the middle of the brake operation, a pressure generated by the high-pressure-source device 118 may be inputted into the first input chamber R23 and the second input chamber R24. To be more specific, the controlled high-pressure-source pressure controlled by the pressure-intensifying/reducing device 120 may be inputted into the first input chamber R23 so as to generate the hydraulic brake force whose magnitude corresponds to a magnitude obtained by subtracting the regenerative brake force from the target brake force. Here, a maximum regenerative brake force which can be generated by the regenerative brake of the vehicle is defined as an available-maximum-regenerative brake force. Where it is assumed that the generation of the hydraulic brake force is started after a time point when the target brake force exceeds the available-maximum-regenerative brake force, the operation amount of the brake pedal 150 at the beginning of the generation of the hydraulic brake force is generally equal to a hydraulic-brake-beginning amount at the maximum regenerative brake. Incidentally, even though the target brake force does not exceed the available-maximum-regenerative brake force, there is an instance in which the hydraulic brake force is required due to an amount of charge of the battery 26 etc. In this instance, the pressure from the high-pressure-source device 118 may be inputted into the first input chamber R23 and the second input chamber R24 before the operation amount reaches the hydraulic-brake-beginning amount at the maximum regenerative brake.

When the pressure is inputted into the first input chamber R23 and the second input chamber R24, the first pressurizing piston 1022 is moved forward without depending on the operation force applied to the brake pedal 150 and without depending on the operation amount. Consequently the brake fluid in the first pressurizing chamber R21 is pressurized. According to that, the brake fluid in the second pressurizing chamber R22 is pressurized by the second pressurizing piston 1024. That is, a high-pressure-source-pressure dependent braking state is realized in which the brake fluid in the first pressurizing chamber R21 and the second pressurizing chamber R22 is pressurized by the pressure from the high pressure source, irrespective of the forward movement of the input piston 1026. The brake force depending on the cylinder device 1010, namely, the hydraulic brake force is determined by the pressure of the inputted brake fluid. The controlled high-pressure-source pressure is controlled by the above high-pressure-source pressure control device and the pressure controlled at a required degree is inputted into the first input chamber R23.

Even in the normal condition, when the operation of the brake is finished, the pressure-reducing linear valve 252 is put in the open state; the first pressurizing piston 1022 and the second pressurizing piston 1024 are respectively returned to their initial positions by the return springs 1054, 1056; and the input piston 1026 is returned to the initial position by the return spring 1072.

In the large-brake-force required case, the first input chamber open/close valve 1116 is put in the close state and the opposing-chamber open/close valve 1132 is put in the open state, that is, the first input chamber R23 is hermetically closed, and the opposing-chamber communication state is realized by the first communication-state switching mechanism, whereby the opposing chamber R25 and the reservoir 122 communicate with each other. Therefore, it becomes possible to move the input piston 1026 forward by the operation force of the driver in addition to a force depending on the controlled high-pressure-source pressure inputted into the second input chamber R24. The forward movement of the input piston 1026 pressurizes the brake fluid in the first pressurizing chamber R21 and the second pressurizing chamber R22 via the brake fluid confined in the first input chamber R23. That is, in the large-brake-force required case, the brake fluid in the first pressurizing chamber R21 and the second pressurizing chamber R22 can be pressurized depending on both of the controlled high-pressure-source pressure and the operation force applied to the brake pedal 150. This pressurization enables the output pressure from each of the first pressurizing chamber R21 and the second pressurizing chamber R22 to become higher than the output pressure in a state in which the input pressure that the high-pressure-source device 118 can generate at most is inputted into the first input chamber R23 in the above high-pressure-source-pressure dependent brake state. That is, an operation-force/high-pressure-source-pressure dependent braking state is realized in which there can be obtained a brake force larger than the high-pressure-source dependent maximum brake force. In other words, the cylinder device 1010 having such a construction is equipped with a cylinder-device-actuation switching mechanism which selectively realizes the high-pressure-source-pressure dependent braking state and the operation-force/high-pressure-source-pressure dependent braking state by the control valve device including the first input chamber open/close valve 1116 and the opposing-chamber open/close valve 1132.

The hydraulic brake system 1000 having the cylinder device 1010 which is actuated as described above switches the brake state in a manner similar to that of the hydraulic brake system 700 of the second embodiment. In other words, the switch is conducted with processes in accordance with a program similar to the brake-force-generating-state switch program indicated in FIG. 10. In the hydraulic brake system 1000, the switch is conducted on the basis of the controlled high-pressure-source pressure $P_C$ contrary to, in the hydraulic brake system 700, the output pressure $P_O$ which is the pressure of the brake fluid outputted from the cylinder device 710.

<<Features of Hydraulic Brake System>>

The hydraulic brake system 1000 switches the actuation state of the cylinder device 1010 from the high-pressure-source-pressure dependent pressurizing state to the operation-force/high-pressure-source-pressure dependent pressurizing state on the basis of the controlled high-pressure-source pressure $P_C$ which is a kind of the operation-force indicating parameter, that is, when, in the high-pressure-source-pressure dependent pressurizing state, the controlled high-pressure-source pressure $P_C$ is considered close to the high-pressure-source pressure $P_H$ which is the pressure in the high-pressure-source dependent maximum brake force. Therefore, it is possible to effectively switch the actuation state of the cylinder device at around an upper limit of the controlled high-pressure-source pressure $P_C$.

In the cylinder device 1010 of the hydraulic brake system 1000, though it is difficult to understand in FIG. 12, an area of the input piston 1026 which defines the first input chamber R23 and to which a pressure of the brake fluid in the first input chamber R23 is applied is larger than an area of the first pressurizing piston 1022 which defines the first input chamber R23 and to which a pressure of the brake fluid in the first input chamber R23 is applied. In other words, an area of the front end of the input piston 1026 is larger than an area of the rear end of the first pressurizing piston 1022. Therefore, in the operation of the brake pedal 150 in the operation-force/high-pressure-source-pressure dependent pressurizing state, the distance of the forward movement of the first pressurizing piston 1022 is larger than that of the input piston 1026. As a result, the change of the output pressure $P_O$ with respect to the change of the operation amount of the brake pedal 150 in the operation-force/high-pressure-source-pressure dependent pressurizing state is comparatively large, thereby ensuring a larger pedal stroke.

Modified Embodiment

The hydraulic brake system 1000 may employ such a valve device that is used in the modified embodiment of the hydraulic brake system 100 of the first embodiment, that is, a mechanical valve device into which the above input chamber open/close valve 1116 and the above opposing-chamber open/close valve 1132 are integrated. In this case, a mechanical valve device may be employed which introduces the controlled high-pressure-source pressure $P_C$ or the output pressure $P_O$ as the pilot pressure, or a mechanical valve device may be employed to which both the high-pressure-source pressure $P_H$ and the controlled high-pressure-source pressure $P_C$ are introduced as the pilot pressures and which is actuated on the basis of a difference between those pressures.

4. Fourth Embodiment

Figure 13:
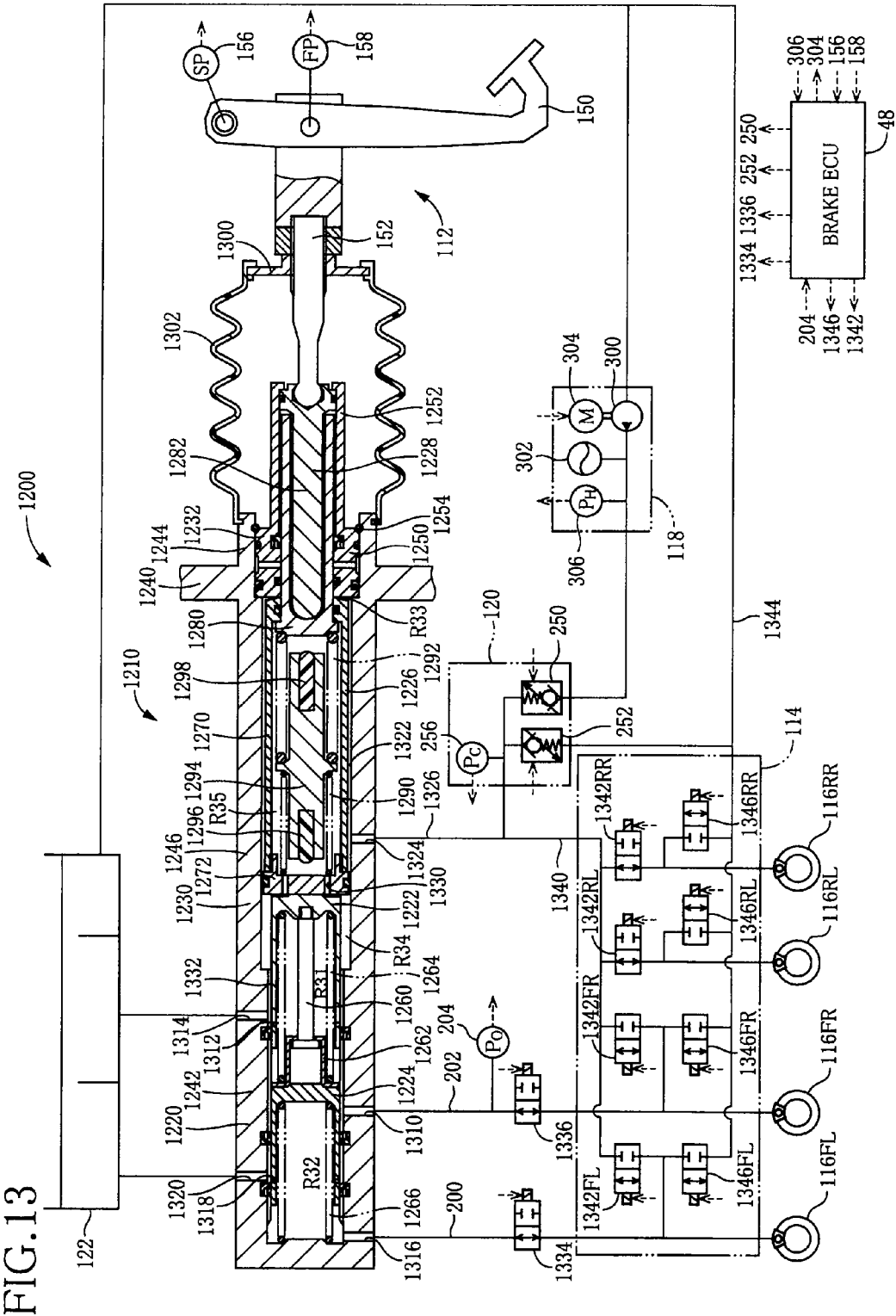
FIG. 13 is a view of a hydraulic brake system according to a fourth embodiment.

FIG. 13 shows a hydraulic brake system 1200 of a forth embodiment. It is noted that a cylinder device 1210 employed in the hydraulic brake system 1200 can supply the brake fluid only to the brake device 116FR provided on the front right wheel and the brake device 116 FL provided on the front left wheel. To the brake devices 116RR, RL provided on each of the rear wheels, the brake fluid is supplied only from the high-pressure-source device 118. The hydraulic brake system 1200 is configured similarly to the brake system 100 of the first embodiment except for a configuration of the cylinder device 1210 and fluid passages regarding the cylinder device 1210. Considering that, a following explanation of the hydraulic brake system 1200 is conducted mainly on the cylinder device 1210.

<<Configuration of Cylinder Device and Fluid Passages Regarding Cylinder Device>>

The cylinder device 1210 includes a housing 1220 which is a casing of the cylinder device 1210, a first pressurizing piston 1222 and a second pressurizing piston 1224 which pressurize the brake fluid to be supplied to the brake devices 116, an intermediate piston 1226 which is moved forward by the pressure inputted from the external high-pressure-source device 118, and an input piston 1228 to which the operation of the driver is inputted via the operating device 112. Incidentally, FIG. 13 illustrates a state in which the cylinder device 1210 is not under actuation, that is, the operation of the brake is not conducted.

The housing 1220 is constituted by mainly two members, concretely, a first housing member 1230 and a second housing member 1232. The first housing member 1230 has a shape like a tube whose front end portion is closed and has a flange 1240 formed on a circumference of a rear end portion thereof. The first housing member 1230 is mounted on the body of the vehicle at the flange 1240. The first housing member 1230 is sectioned into three portions having mutually different inner diameters, specifically, a front small-diameter portion 1242 located in a front side and having the smallest inner diameter, a rear large-diameter portion 1244 located in a rear side and having the largest inner diameter, and a intermediate portion 1246 located between the front small-diameter portion 1242 and the rear large-diameter portion 1244 and having an intermediate inner diameter of those inner diameters.

The second housing member 1232 is shaped like a tube that has: a front large-diameter portion 1250 located in a front side and having a large outer diameter; and a rear small-diameter portion 1252 located in a rear side and having a small outer diameter. The second housing member 1232 is fitted into the rear large-diameter portion 1244 of the first housing member 1230 such that a front end portion of the front large-diameter portion 1250 is in contact with a stepping face which is formed between the intermediate portion 1246 and the rear large-diameter portion 1244. The first housing member 1230 and the second housing member 1232 are fastened with each other by a lock ring 1254 which is embedded on an inner face of the rear end portion of the first housing portion 1230.

Each of the first pressurizing piston 1222 and the second pressurizing piston 1224 has a shape like a tube whose rear end portion is closed and is slidably fitted into the front small-diameter portion 1242 of the first housing member 1230. The first pressurizing piston 1222 is disposed behind the second pressurizing piston 1224. Between the first pressurizing piston 1222 and the second pressurizing piston 1224, there is defined a first pressurizing chamber R31 for pressurizing the brake fluid which is supplied to the brake device 116FR provided for the front right wheel. On a front side of the second pressurizing piston 1224, there is defined a second pressurizing chamber R32 for pressurizing the brake fluid which is supplied to the brake device 116FL provided for the front left wheel. In addition, the distance that the first pressurizing piston 1222 and the second pressurizing piston 1224 are separated from each other is limited so as to fall within a predetermined range by a headed pin 1260 mounted on a rear end portion of the first pressurizing piston 1222 to extend forward and a pin-retaining tube 1262 fixed on a rear end face of the second pressurizing piston 1224. In the first pressurizing chamber R31 and the second pressurizing chamber R32, compression coil springs (hereinafter, referred to as "return springs" where appropriate) 1264, 1266 are disposed, respectively. By the springs, the first pressurizing piston 1222 and the second pressurizing piston 1224 are biased in such a direction that the pistons 1222, 1224 separate away from each other and in such a direction that the pistons 1222, 1224 move rearward, whereby the first pressurizing piston 1222 abuts on a front end face of the intermediate piston 1226 which is described below.

The intermediate piston 1226 includes a body member 1270 shaped like a tube whose both ends are opened, and a cap member 1272 closing the front end of the body member 1270. The intermediate piston 1226, with a front end thereof abutting on the rear end of the first pressurizing piston 1222, is slidably fitted into an inner surface of the intermediate portion 1246 of the first housing member 1230. Behind the intermediate piston 1226 and between it and the second housing member 1232, there is defined a fluid chamber R33 into which the brake fluid can be supplied from the high-pressure-source device 118. Hereinafter, the fluid chamber R33 is referred to as an "input chamber R33" where appropriate. It is noted that the input chamber R33 is illustrated in an almost squeezed state in FIG. 13. In addition, inside the housing 1220, there is formed a space between an inner surface of the first housing member 1230 and an outer surface of the first pressurizing piston 1222. The space is defined by the front end face of the intermediate piston 1226 and a stepping face which is defined between the front small-diameter portion 1242 and the intermediate portion 1246 of the first housing member 1230, whereby there is formed a ring-shaped fluid chamber R34 which is always kept at the atmospheric pressure. Hereinafter, this chamber is referred to as an "atmospheric pressure chamber R34" where appropriate.

The input piston 1228 is constituted by mainly an outer tube member 1280 shaped like a tube whose front end is closed and whose rear end is opened, and a rod member 1282 shaped like a column on the whole. The input piston 1228 is constituted by that the rod member 1282 is inserted into the outer tube member 1280 from a rear end thereof. The input piston 1228 is inserted into the body member 1270 of the intermediate piston 1226 from a front end portion thereof and is configured to move forward and rearward with respect to the intermediate piston 1226, while held by the second housing member 1232. By the input piston 1228 and the intermediate piston 1226 which are thus constructed, there is defined a fluid chamber (hereinafter, referred to as an "internal chamber" where appropriate) R35 whose volume is changed by a relative movement of the intermediate piston 1226 and the input piston 1228. Incidentally, the rearward movement of the input piston 1228 is limited by an abutting contact of a flange portion formed in a front end portion of the outer tube member 1280 with a rear end portion of the body member 1270 of the intermediate piston 1226.

In the internal chamber R35, two compression coil springs, namely, a first reaction force spring 1290 and a second reaction force spring 1292 are disposed between an inner bottom face of the intermediate piston 1226 and the front end face of the input piston 1228. The first reaction force spring 1290 is disposed behind the second reaction force spring 1292 in a series. In addition, a floating seat 1294 which is shaped like a rod having a flange is sandwiched between those reaction force springs and floatingly supported by them. The first reaction force spring 1290 is supported at a front end portion thereof by the front end portion of the intermediate piston 1226 and supported at a rear end portion thereof by a front seat face of the floating seat 1294. The second reaction force spring 1292 is supported at a front end portion thereof by a rear seat face of the floating seat 1294 and supported at a rear end portion thereof by a front end portion of the input piston 1228. The thus disposed first reaction force spring 1290 and second reaction force spring 1292 bias the input piston 1228 and the intermediate piston 1226 in directions that the pistons 1226, 1228 separate away from each other, that is, in directions that a volume of the internal chamber R35 increase. Accordingly, the cylinder device 1210 is equipped with an elastic force applying mechanism which is constituted by the first reaction force spring 1290 and the second reaction force spring 1292, that is, a mechanism which applies, to the input piston 1228 and the intermediate piston 1226, an elastic force against a relative movement of the pistons 1226, 1228 in directions that the pistons 1226, 1228 approach each other by the reaction force of the springs 1290, 1292, that is, in directions that the volume of the internal chamber R35 decreases. A first cushion rubber 1296 and a second cushion rubber 1298 are embedded on a front end portion and a rear end portion of the floating seat 1294, respectively. Because the first cushion rubber 1296 comes into abutting contact with the front end face of the intermediate piston 1226 and the second cushion rubber 1298 comes into abutting contact with the front end face of the input piston 1228, the floating seat 1294 and the intermediate piston 1226 are limited so as not to move toward each other beyond a certain distance, and the floating seat 1294 and the input piston 1228 are limited so as not to move toward each other beyond a certain distance The front end portion of the operation rod 152 is connected to a rear end portion the rod member 1282 of the input piston 1228 so as to transmit, to the input piston 1228, the operation force applied to the brake pedal 150 and so as to move the input piston 1228 forward and rearward in accordance with the operation amount of the brake pedal 150. Incidentally, the rearward movement of the input piston 1228 is limited because the rear end portion of the rod member 1282 is stopped by a rear end portion of the second housing member 1232. In addition, a round-shaped support disc 1300 is fixed to the operation rod 152 and a boot 1302 is provided between the support disc 1300 and the housing 1220 so as to protect a rear portion of the cylinder device 1210 from dust.

The first pressurizing chamber R31 communicates with the fluid passage 202 connected to the brake device 116FR provided for the front right wheel via a communication hole 1310 whose opening is an output port while the first pressurizing chamber R31 communicates with the reservoir 122 such that it is allowed for the first pressurizing chamber R31 not to communicate with the reservoir 122 via a communication hole 1312 provided on the first pressurizing piston 1222 and a communication hole 1314 whose opening functions as a drain port. On the other hand, the second pressurizing chamber R32 communicates with the fluid passage 200 connected to the brake device 116FL provided for the front left wheel via a communication hole 1316 whose opening is an output port while the second pressurizing chamber R32 communicates with the reservoir 122 such that it is allowed for the second pressurizing chamber R32 not to communicate with the reservoir 122 via a communication hole 1318 provided on the second pressurizing piston 1224 and a communication hole 1320 whose opening functions as a drain port.

An outer diameter of the intermediate piston 1226 is somewhat smaller than an inner diameter of the intermediate portion 1246 of the first housing member 1230. Between the intermediate piston 1226 and the intermediate portion 1246, there is formed a fluid passage 1322 having a certain cross section area through which the brake fluid can flow. The input chamber R33 is allowed to communicate with exteriors through the fluid passage 1322 and a communication hole 1324 whose opening is a connection port. The communication hole 1324 is connected to the pressure-intensifying/reducing device 120 via a communication passage 1326.

On the intermediate piston 1226, there is provided, at the cap member 1272, a communication hole 1330 through which the atmospheric pressure chamber R34 and the internal chamber R35 communicate with each other. An outer diameter of the first pressurizing piston 1222 is somewhat smaller than an inner diameter of the intermediate portion 1246 of the first housing member 1230. Between the first pressurizing piston 1222 and the intermediate portion 1246, there is formed a fluid passage 1332 having a certain cross section area through which the brake fluid can flow. The atmospheric pressure chamber R34 communicates with the reservoir 122 via the fluid passage 1332 and the communication hole 1314. Therefore, the ring-shaped fluid chamber R34 and the internal chamber R35 are always kept at the atmospheric pressure and the brake fluid in those chambers is allowed to flow into and from the reservoir 122.

On the fluid passages 200, 202, there are provided electromagnetic open/close valves (hereinafter, referred to as "cylinder device cut valves" where appropriate) 1334, 1336, respectively, each of which opens in a not-energized state and closes in an energized state. The opening or closing each of those valves selectively realizes a state in which supplying, to the brake devices 116FL, FR, the brake fluid pressurized by the cylinder device 1210 is permitted and a state in which the supply is prohibited.

One end of a pressure-intensifying passage 1340 for supplying the brake fluid pressurized to the high-pressure-source pressure is connected to the pressure-intensifying/reducing device 120 and the other end thereof is connected to the antilock device 114. In the antilock device 114, the pressure-intensifying passage 1340 is branched into four passages. Each of those branched passages is connected to the corresponding brake device 116 provided for corresponding one of four wheels via corresponding one of four pressure-intensifying open/close valves 1342. Additionally, a pressure-reducing passage 1344 communicating with the reservoir 122 is also connected to the antilock device 114. The pressure-reducing passage 1344 is also branched into four passages in the antilock device 114. Each of those branched passages is connected to the corresponding brake devices 116 provided for corresponding one of four wheels via corresponding one of four pressure-reducing open/close valves 1346. Incidentally, among four pressure-intensifying open/close valves 1342, each of the pressure-intensifying open/close valves 1342RL, RR in the rear wheel side is an electromagnetic valve which opens in a not-energized state and closes in an energized state, and each of the pressure-intensifying open/close valves 1342FL, FR in the front wheel side and four pressure-reducing open/close valves 1346 is an electromagnetic valve which closes in a not-energized state and opens in an energized state.

<<Actuation of Cylinder Device>>

When the brake pedal 150 is operated by the driver, the input piston 1228 is moved forward by the operation force applied to the brake pedal 150, thereby compressing the two reaction force springs 1290, 1292. Elastic reaction forces generated by these reaction force springs 1290, 1292 move the intermediate piston 1226 forward, thereby moving the first pressurizing piston 1222 forward. In accordance with the forward movement of the first pressurizing piston 1222, the second pressurizing piston 1224 is moved forward, whereby the brake fluid in the first pressurizing chamber R31 and the second pressurizing chamber R32 is pressurized. On the other hand, when the controlled high-pressure-source pressure from the high-pressure-source device 118 is inputted into the input chamber R33, the intermediate piston 1226 is moved forward by the controlled high-pressure-source pressure, whereby the brake fluid in the first pressurizing chamber R31 and the second pressurizing chamber R32 is pressurized in the same manner. In the cylinder device 1210, pressurizing the brake fluid can be conducted by one of the operation force and the controlled high-pressure-source pressure. Where both of them are inputted to the cylinder device 1210, the cylinder device 1210 outputs the brake fluid which is pressurized depending on both of the operation force and the controlled high-pressure-source pressure. That is, the cylinder device 1210 is configured to be able to always supply, to the brake device 116, the brake fluid which is pressurized in accordance with both of the operation force and the controlled high-pressure-source pressure.

The reaction force against the operation of the brake pedal 150, namely, an operation reaction force is applied by the actuation of the elastic-force applying mechanism described above and has a characteristic similar to that illustrated in FIG. 3. More specifically, when an elastic deformation of the reaction force spring 1290 is prohibited due to an abutting contact of the floating seat 1294 to the intermediate piston 1226, the inclination of the operation reaction force becomes large. When the floating seat 1294 comes into abutting contact with the input piston 1228 due to further operation of the brake pedal 150, the relative movement of the input piston 1228 and the intermediate piston 1226 is prohibited, whereby an operation of the brake pedal 150 accompanied with further increase of the operation amount is prohibited. The elastic-force applying mechanism functions as a stroke simulator and functions as an input-piston-forward-movement permitting mechanism which permits the forward movement of the input piston 1228 within the predetermined forward movement distance against the elastic force.

An output pressure $P_O$ depends on both the operation force F and the controlled high-pressure-source pressure $P_C$. Providing that a pressurized area which is an area of a part of the intermediate piston 1226 and to which a pressure of the brake fluid in the input chamber R33 is applied (generally equal to an area of rear end face of the intermediate piston 1226) is $A_I$, and each of a pressurized area which is an area of a part of the first pressurizing piston 1222 and to which a pressure of the brake fluid in the input chamber R31 is applied and a pressurized area which is an area of a part of the second pressurizing piston 1224 and to which a pressure of the brake fluid in the input chamber R32 is applied (generally a cross section of the first pressurizing piston 1222 is equal to that of the second pressurizing piston 1224) is $A_O$, the output pressure $P_O$ is described as a following equation.

$$P_O = (F + A_I \times P_C)/A_O$$

To simplify an explanation, considering that the regenerative brake force is excluded and the controlled high-pressure-source pressure is determined by the operation force F, the controlled high-pressure-source pressure $P_C$ can be considered as a function relating to the operation force F. Therefore, the output pressure $P_O$ is described as a following equation.

$$P_O = \{F + A_I \times P_C(F)\}/A_O$$

As explained in the followings, in the cylinder device 1210, the area $A_I$ and $A_O$ are set such that $P_O$ is always not less than $P_C(F)$ in order to obtain high brake force depending on both of the high-pressure-source pressure and the operation force in the large-brake-force required case.

<<Actuation of Hydraulic Brake System>>

In the electrical failure condition, the cylinder device cut valves 1334, 1336 are put in the open states, respectively, and four pressure-intensifying open/close valves 1342 and four pressure-reducing open/close valves 1346 are in the close states, respectively. Therefore, there is realized a cylinder-device supplying state in which the supply of the brake fluid from the cylinder device 1210 to the brake devices 116FL, FR is permitted and in which the supply of the brake fluid from the high-pressure-source device 118 to the brake devices 116FL, FR is prohibited. In addition, the pressure-intensifying linear valve 250 and the pressure-reducing linear valve 252 are in the close state and the open state, respectively, and the high-pressure-source device 118 does not function. In this state, as a result, there is realized a state in which the brake fluid is pressurized depending on the operation force, namely, an operation-force dependent pressurizing state. Accordingly, there is realized a state in which the brake fluid pressurized by the operation force is supplied from the cylinder device 1210 to the brake devices 116FL, FR and the brake devices 116FL, FR generate the brake forces depending on the operation force, namely, an operation-force dependent braking state.

In the normal condition, the cylinder device cut valves 1334, 1336 are energized so as to be in the close states, respectively, and four pressure-intensifying open/close valves 1342 are also energized so as to be in the open states, respectively. It is noted that four pressure-reducing open/close valves 1346 are normally not energized to be kept in the close states, respectively. Therefore, in the normal condition, there is realized a state in which the supply of the brake fluid from the cylinder device 1210 to the brake devices 116FL, FR is prohibited and in which the supply of the brake fluid from the high-pressure-source device 118 to the four brake devices 116 is permitted, namely, a high-pressure-source-device supplying state. In this state, the brake fluid is supplied from the high-pressure-source device 118 to the four brake devices 116 via the pressure-intensifying/reducing device 120. As a result, there is realized a state in which the above controlled high-pressure-source pressure is inputted from the high-pressure-source 118 to the brake devices and the brake devices 116 generate the brake forces depending on the controlled high-pressure-source pressure, namely, a high-pressure-source-pressure dependent braking state. Incidentally, in this state, the cylinder device 1210 is, as described above, in a state in which it pressurizes the brake fluid depending on both of the operation force and the controlled high-pressure-source pressure, namely, an operation-force/high-pressure-source-pressure dependent pressurizing state. In other word, the cylinder device 1210 is in a state in which it outputs the above output pressure even though the brake fluid is not supplied to the brake devices 116FL, FR.

In the large-brake-force required case, the cylinder device cut valves 1334, 1336 are put in the open states, respectively, and two pressure-intensifying open/close valves 1342FL, FR of four pressure-intensifying open/close valves 1342 of the antilock device 114, which are corresponding to the front wheels, are put in the close states, respectively. As a result, the cylinder-device supplying state is realized for the two brake devices 116FL, FR corresponding to the front wheels. In this state, the brake fluid is supplied to the brake devices 116FL, FR from the cylinder device 1210 being in the operation-force/high-pressure-source-pressure dependent pressurizing state. That is, the above output pressure is inputted into the brake devices 116FL, FR. Therefore, there is realized the state in which the brake force is generated with a magnitude depending on both of the operation force and the controlled high-pressure-source pressure, namely, the operation-force/high-pressure-source-pressure dependent braking state.

In the operation-force/high-pressure-source-pressure dependent braking state, as described above, the output pressure supplied from the cylinder device 1210 is higher than the controlled high-pressure-source pressure at a moment. Therefore, even though the controlled high-pressure-source pressure is at the maximum pressure, that is, the pressure which can be generated in the high-pressure-source device 118, the brake device 116FL, FR can generate a brake force more than a brake force which can be generated by the high-pressure-source pressure. In other words, in the operation-force/high-pressure-source-pressure dependent braking state, it is possible to generate a brake force larger than the high-pressure-source dependent maximum brake force, which is the brake force that can be generated in the high-pressure-source pressure dependent braking state because the operation force applied to the brake pedal 150 is added. It is noted that this brake force becomes larger as the operation force becomes larger.

Figure 14:
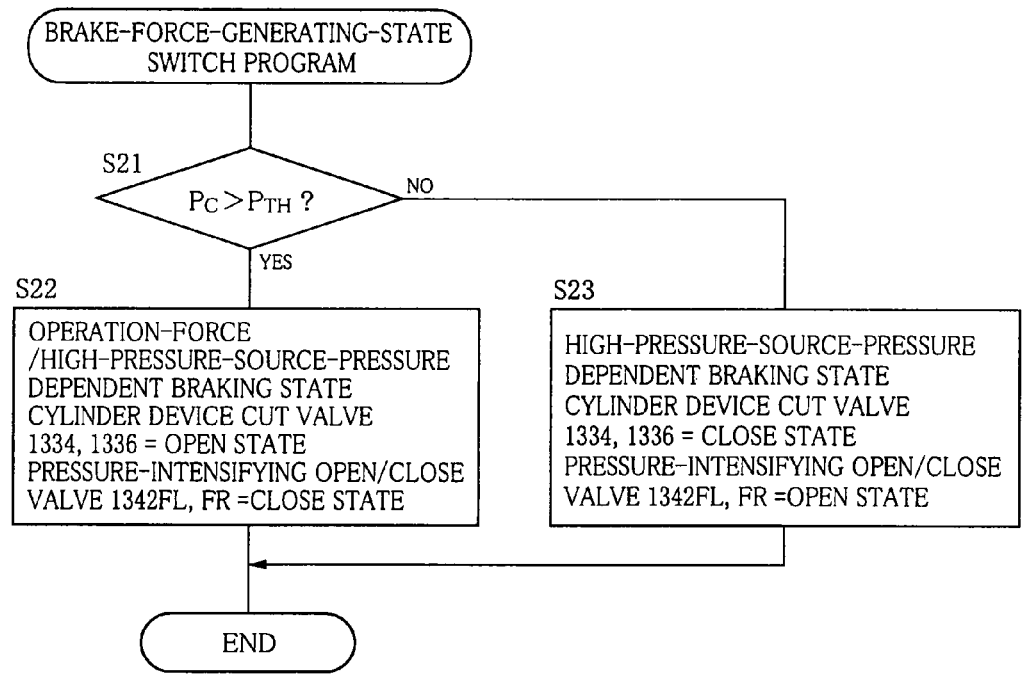
FIG. 14 is a flow chart of a control program which is executed in the hydraulic brake system according to the fourth embodiment and which is for a switch of a high-pressure-source-pressure dependent state and an operation-force/high-pressure-source-pressure dependent state.

In the hydraulic brake system 1200 which operates as above explained, the opens or closes of the cylinder device cut valves 1334, 1336 and the two pressure-intensifying open/close valves 1342FL, FR of the antilock device 114 switch a supply source of the brake fluid to the brake devices 116FL, FR. Therefore, it is considered that those electromagnetic open/close valves 1334, 1336, 1342FL, FR constitute a switching valve device which realizes the high-pressure-source-device supplying state in the high-pressure-source-pressure dependent braking state and which realizes the cylinder-device supplying state in the operation-force/high-pressure-source-pressure dependent braking state. The switch from the above high-pressure-source-pressure dependent braking state to the above operation-force/high-pressure-source-pressure dependent braking state is conducted by the brake ECU 48 repeatedly executing, in at quite short time intervals, a brake-force-generating-state switch program indicated in FIG. 14. This program is similar to that indicated in FIG. 10, so the detailed explanation is abbreviated here. Incidentally, according to the brake-force-generating-state switch program, the above switch is conducted on the basis of the controlled high-pressure-source pressure which is a sort of the operation-force indicating parameter, and is conducted when the controlled high-pressure-source pressure is above a predetermined threshold pressure.

<<Features of Hydraulic Brake System>>

In the hydraulic brake system 1200, there is obtained, by the easy means which is the switch of the supply source of the brake fluid for the brake devices 116FL, 116FR from the high-pressure-source device to the cylinder device and vise versa, the brake force which is larger than the maximum hydraulic brake force generated depending on the pressure of the brake fluid from the high-pressure-source device 118. Additionally, because the cylinder device 1210 is configured such that the output pressure which is the pressure of the brake fluid outputted from the pressurizing chambers R31, R32 is always kept at the controlled high-pressure-source pressure or more, the hydraulic brake force does not decrease and the brake force is sufficiently secured at a moment when the state of generation of the brake force is switched from the high-pressure-source-pressure dependent braking state to the operation-force/high-pressure-source-pressure dependent braking state. It is noted that if the cylinder device is configured such that the output pressure is equal to the controlled high-pressure-source pressure, a degree of the change of the hydraulic brake force at the above switch of the braking state becomes quite small, whereby the switch is conducted smoothly.

Modified Embodiment

In the hydraulic brake system 1200 of the above fourth embodiment, the brake system 1200 is configured to conduct, on the basis of the controlled high-pressure-source pressure, the switch from the high-pressure-source-pressure dependent braking state to the operation-force/high-pressure-source-pressure dependent braking state. Instead, the brake system may be configured to conduct the switch where the output pressure exceeds a predetermined threshold pressure. Moreover, the switch may be conducted when a difference of the high-pressure-source pressure and the controlled-high-pressure-source pressure becomes smaller than a predetermined pressure. Furthermore, the switch may also be conducted when the above operation limit has been realized in the above input-piston-forward-movement permitting mechanism, namely, the stroke simulator.

The hydraulic brake system 1200 of the above fourth embodiment is configured to conduct the switch from the high-pressure-source-pressure dependent braking state to the operation-force/high-pressure-source-pressure dependent braking state only in the brake devices 116FL, FR respectively provided for the two front wheels. Instead of such a construction, a brake system may be configured to conduct the switch from the high-pressure-source-pressure dependent braking state to the operation-force/high-pressure-source-pressure dependent braking state in all of the four brake devices 116 respectively provided for the four front/rear wheels by changing the liquid passages, the open/close valves, and the like.

REFERENCE SIGNS LIST

100: hydraulic brake system 110: cylinder device 116: brake device 118: external high-pressure-source device 122: reservoir 150: brake pedal (operation member) 400: housing 402: first pressurizing piston (pressurizing piston) 406: intermediate piston 408: input piston 480: first reaction force spring (elastic-force applying mechanism) 482: second reaction force spring (elastic-force applying mechanism) 520: first-input-chamber open/close valve 536: opposing-chamber open/close valve R1: first pressurizing chamber (pressurizing chamber) R2: second pressurizing chamber R3: first input chamber R4: opposing chamber R5: second input chamber R6: internal chamber 560: hydraulic brake system 570: cylinder device 572: valve device 574: relief valve 600: hydraulic brake system 610: cylinder device 612: open/close valve 640: hydraulic brake system 650: cylinder device 652: valve device 654: relief valve 700: hydraulic brake system 710: cylinder device 720: housing 722: first pressurizing piston (pressurizing piston) 726: input piston 780: body portion (main body) 782: auxiliary piston (front end body) 784: first reaction force spring (elastic-force dependent pressurizing mechanism) 786: second reaction force spring (elastic-force dependent pressurizing mechanism) 788: floating seat 836: external communication passage (external communication passage) 838: inter-chamber open/close valve 847: external communication passage 848: opposite-chamber open/close valve R11: first pressurizing chamber R12: second pressurizing chamber R13: input chamber R14: opposing chamber R15: inter-piston chamber R16: internal chamber R17: reaction force chamber 900: hydraulic brake system 910: cylinder device 920: auxiliary piston (front end body) 922: outer tube member 924: inner tube member 926: ball 928: bias spring 930: pin 1000: hydraulic brake system 1010: cylinder device 1020: housing 1022: first pressurizing piston (pressurizing piston) 1026: input piston 1066: reaction force spring (elastic-force dependent pressurizing mechanism) 1116: first input chamber open/close valve 1132: opposite-chamber open/close valve R21: first pressurizing chamber R22: second pressurizing chamber R23: first input chamber R24: second input chamber R25: opposing chamber R26: atmospheric pressure chamber R27: internal chamber 1200: hydraulic brake system 1210: cylinder device 1220: housing 1222: first pressurizing piston (pressurizing piston) 1226: intermediate piston 1228: input piston 1290: first reaction force spring (elastic-force applying mechanism) 1292: second reaction force spring (elastic-force applying mechanism) 1334: cylinder device cut valve (switching valve device) 1336: cylinder device cut valve (switching valve device) 1342: pressure-intensifying open/close valve (switching valve device) R31: first pressurizing chamber R32: second pressurizing chamber R33: input chamber R34: ring-shaped fluid chamber R35: internal chamber

The invention claimed is:

1. A hydraulic brake system comprising:
a brake device provided for a wheel:
a cylinder device operable to supply to the brake device a brake fluid which is pressurized;
a brake operating member which is operated by a driver;
a high-pressure-source device which supplies the brake fluid in high pressure;
a control device which controls a pressure of the brake fluid supplied from the high-pressure-source device on the basis of the operation of the brake operating member; and
a braking state switching device which is configured to switch between (a) a first braking state in which a brake force is generated with a magnitude that depends on a controlled pressure which is a pressure of the brake fluid pressurized by the high-pressure-source device and controlled by the control device; and (b) a second braking state in which, in addition to the brake force with the magnitude that depends on the controlled pressure, a brake force with a magnitude that depends on a brake operation force which is a driver's force applied to the brake operating member is generated, whereby a brake force with a magnitude that is larger than a magnitude of a maximum brake force generated when the controlled pressure becomes equal to the pressure of the brake fluid supplied from the high-pressure-source device, is generated.

2. The hydraulic brake system according to claim 1,
wherein the cylinder device includes:
- a housing having a shape like a tube whose front end portion is closed;
- a pressurizing piston disposed in the housing such that a pressurizing chamber in which the brake fluid to be supplied to the brake device is pressurized is defined on a front side of the pressurizing piston;
- an input piston disposed on a rear side of the pressurizing piston such that a rear end portion of the input piston is connected to the brake operating member;
- an input chamber which is disposed on a rear side of the pressurizing piston and to which the controlled pressure is applied; and
- a cylinder-device-actuation switching mechanism which functions as the braking state switching device and which is configured to switch between (a) a first pressurizing state, in the first braking state, in which a transmission of the brake operation force from the input piston to the pressurizing piston is prohibited and in which pressurization of the brake fluid in the pressurizing chamber in accordance with the controlled pressure is permitted; and (b) a second pressurizing state, in the second braking state, in which the transmission of the brake operation force from the input piston to the pressurizing piston is permitted and in which the pressurization of the brake fluid in the pressurizing chamber in accordance with both of the brake operation force and the high-pressure-source pressure is permitted.

3. The hydraulic brake system according to claim 2,
wherein the cylinder device includes an intermediate piston which has a main body and a flange formed on a circumference of the main body and which is disposed in the housing such that a first input chamber and a second input chamber each of which functions as the input chamber are defined on a front side of the main body and on a rear side of the flange respectively and such that there is defined an opposing chamber which is located on a front side of the flange with the flange interposed between the opposing chamber and the second input chamber and which is opposed to the second input chamber,
wherein the cylinder device is configured such that the input piston transmits the brake operation force to the intermediate piston from a rear side of the intermediate piston, and
wherein the cylinder-device-actuation switching mechanism is configured to effectuate (a) the first pressurizing state by prohibiting a forward movement of the intermediate piston as a result of hermetically closing the opposing chamber and by permitting application of the controlled pressure to the first input chamber; and effectuate (b) the second pressurizing state by permitting the forward movement of the intermediate piston as a result of establishing communication between the opposing chamber and a reservoir and by permitting application of the controlled pressure to the second input chamber while hermetically closing the first input chamber.

4. The hydraulic brake system according to claim 3,
wherein the cylinder-device-actuation switching mechanism includes i) an opposing chamber open/close valve provided on a passage through which the opposing chamber and the reservoir communicate with each other and ii) a first input chamber open/close valve provided on a passage through which the first input chamber and the high-pressure-source device communicate with each other, and
wherein the cylinder-device-actuation switching mechanism is configured to selectively effectuate the first pressurizing state and the second pressurizing state by operations of the opposing chamber open/close valve and the first input chamber open/close valve.

5. The hydraulic brake system according to claim 2,
wherein the pressurizing piston has a blind hole whose opening is on a rear end of the pressurizing piston, includes a main body and a flange formed on a circumference of the main body, and is disposed such that the pressurizing chamber and the input chamber are defined on a front side of the main body and on a rear side of the flange respectively and such that there is defined an opposing chamber which is located on a front side of the flange with the flange interposed between the opposing chamber and the input chamber and which is opposed to the input chamber,
wherein the input piston is fitted into the blind hole of the pressurizing piston such that an inter-piston chamber is defined on a front side of the input piston by the input piston and the pressurizing piston,
wherein the cylinder device includes a chamber communication passage which permits communication between the opposing chamber and the inter-piston chamber such that one of a volume change of the opposing chamber and a volume change of the inter-piston chamber which are caused by a forward and a rearward movement accommodates the other, and
wherein the cylinder-device-actuation switching mechanism is configured to effectuate (a) the first pressurizing state by permitting a relative movement of the pressurizing piston and the input piston as a result of opening the chamber communication passage and by permitting an application of the controlled pressure to the input chamber; and effectuate (b) the second pressurizing state by permitting the application of the controlled pressure to the input chamber and by permitting forward movements of the pressurizing piston and the input piston with restraining the relative movement thereof as a result of hermetically closing the inter-piston chamber by closing the chamber communication passage and establishing communication between the opposing chamber and a reservoir.

6. The hydraulic brake system according to claim 4,
wherein the cylinder-device-actuation switching mechanism includes i) an opposing chamber open/close valve provided on a passage through which the opposing chamber and the reservoir communicate with each other and ii) a chamber communication open/close valve provided on the chamber communication passage, and
wherein the cylinder-device-actuation switching mechanism is configured to selectively effectuate the first pressurizing state and the second pressurizing state by operations of the opposing chamber open/close valve and the chamber communication open/close valve.

7. The hydraulic brake system according to claim 2,
wherein the input piston includes a main body and a flange formed on a circumference of the main body, and the input piston is disposed such that a first input chamber and a second input chamber each of which functions as the input chamber are defined on a front side of the main body and on a rear side of the flange respectively and such that there is defined an opposing chamber which is located on a front side of the flange with the flange interposed between the opposing chamber and the second input chamber and which is opposed to the second input chamber, and
wherein the cylinder-device-actuation switching mechanism is configured to effectuate (a) the first pressurizing state by restraining a forward movement of the input piston as a result of hermetically closing the opposing chamber and by permitting application of the controlled pressure to the first input chamber and the second input chamber; and effectuate (b) the second pressurizing state by releasing the restraint of the forward movement of the input piston as a result of establishing communication between the opposing chamber and a reservoir and by hermetically closing the first input chamber while permitting application of the controlled pressure to the second input chamber.

8. The hydraulic brake system according to claim 7,
wherein the cylinder-device-actuation switching mechanism includes i) an opposing chamber open/close valve provided on a passage through which the opposing chamber and the reservoir communicate with each other and ii) a first input chamber open/close valve provided on a passage through which the first input chamber and the high-pressure-source device communicate with each other, and
wherein the cylinder-device-actuation switching mechanism is configured to selectively effectuate the first pressurizing state and the second pressurizing state by operations of the opposing chamber open/close valve and the first input chamber open/close valve.

9. The hydraulic brake system according to claim 2,
wherein the cylinder-device-actuation switching mechanism is configured to switch an actuation state of the cylinder device from the first pressurizing state to the second pressurizing state, when an operation-force indicating parameter which indicates the brake operation force has become larger than a predetermined threshold.

10. The hydraulic brake system according to claim 2,
wherein the cylinder-device-actuation switching mechanism is configured to switch an actuation state of the cylinder device from the first pressurizing state to the second pressurizing state, when one of the controlled pressure and an output pressure which is a pressure of the brake fluid outputted from the pressurizing chamber has become higher than a predetermined pressure.

11. The hydraulic brake system according to claim 2,
wherein the cylinder-device-actuation switching mechanism is configured to switch an actuation state of the cylinder device from the first pressurizing state to the second pressurizing state, when a difference between the controlled pressure and a high-pressure-source pressure which is a pressure of the brake fluid supplied by the high-pressure-source device has become smaller than a predetermined difference.

12. The hydraulic brake system according to claim 2,
wherein the cylinder device includes a movement permitting mechanism which permits, in the first pressurizing state, the input piston to move forward within a predetermined forward movement distance against an elastic force, and
wherein the cylinder-device-actuation switching mechanism is configured to switch an actuation state of the cylinder device from the first pressurizing state to the second pressurizing state, when the input piston has moved forward by the predetermined forward movement distance in the first pressurizing state.

13. The hydraulic brake system according to claim 1,
wherein the cylinder device is configured to be constantly able to supply, to the brake device, the brake fluid which is pressurized according to both of the brake operation force and the controlled pressure applied into the cylinder device, and the hydraulic brake system is configured to supply the brake fluid from the high-pressure-source device to the brake device via the control device not via the cylinder device, and
wherein the braking state switching device includes a switching valve device which effectuates (a) a first supplying state, in the first braking state, in which the supply of the brake fluid from the cylinder device to the brake device is shut and a supply of the brake fluid from the high-pressure-source device to the brake device is permitted; and effectuates (b) a second supplying state, in the second braking state, in which the supply of the brake fluid from the cylinder device to the brake device is permitted and the supply of the brake fluid from the high-pressure-source device to the brake device is prohibited.

14. The hydraulic brake system according to claim 13,
wherein the cylinder device includes:
a housing having a shape like a tube whose front end portion is closed;
a pressurizing piston disposed in the housing such that a pressurizing chamber in which the brake fluid to be supplied to the brake device is pressurized is defined on a front side of the pressurizing piston;
an input piston which is connected to the brake operating member at a rear end portion of the input piston and which is connected to the pressurizing piston so as to be constantly enabled to transmit the brake operation force to the pressurizing piston; and
an input chamber which is disposed on a rear side of the pressurizing piston and to which the controlled pressure is applied.

15. The hydraulic brake system according to claim 14,
wherein the cylinder device is configured such that an output pressure which is a pressure of the brake fluid outputted from the pressurizing chamber is not lower than the controlled pressure all the time.

* * * * *